(12) United States Patent
Smith et al.

(10) Patent No.: US 12,561,161 B2
(45) Date of Patent: Feb. 24, 2026

(54) SYSTEMS AND METHODS FOR NEXTG EDGE COMPUTING CAPACITY MANAGEMENT

(71) Applicant: Veea Inc., New York, NY (US)

(72) Inventors: Clint Smith, New York, NY (US);
Roger William Lucas, England (GB)

(73) Assignee: Veea Inc., New York, NY (US)

( * ) Notice: Subject to any disclaimer, the term of this patent is extended or adjusted under 35 U.S.C. 154(b) by 0 days.

(21) Appl. No.: 18/540,552

(22) Filed: Dec. 14, 2023

(65) Prior Publication Data

US 2024/0205165 A1 Jun. 20, 2024

Related U.S. Application Data

(60) Provisional application No. 63/433,029, filed on Dec. 16, 2022.

(51) Int. Cl.
*G06F 9/46* (2006.01)
*H04L 41/0663* (2022.01)
(Continued)

(52) U.S. Cl.
CPC .......... *G06F 9/465* (2013.01); *H04L 41/0663* (2013.01); *H04L 41/0806* (2013.01);
(Continued)

(58) Field of Classification Search
CPC .......... G06F 9/465; G06F 9/542; G06F 9/546; G06F 2209/509; G06F 9/5072;
(Continued)

(56) References Cited

U.S. PATENT DOCUMENTS 9,130,844 B1 9/2015 Malik et al.
9,548,918 B2 1/2017 Geiger
(Continued)

FOREIGN PATENT DOCUMENTS

WO 2022019676 A1 1/2022

OTHER PUBLICATIONS

Korean Intellectual Property Office, "International Search Report and Written Opinion of the International Searching Authority", issued in related International Patent Application No. PCT/US2023/084238, mailing date Apr. 16, 2024. (9 pages).
(Continued)

*Primary Examiner* — Tonia L Dollinger
*Assistant Examiner* — Mehulkumar J Shah
(74) *Attorney, Agent, or Firm* — The Marbury Law Group, PLLC

(57) ABSTRACT
Various methods and edge computing systems are disclosed that implement a versatile elastic edge compute (vEEC) system that includes a computing mesh including two or more edge computing nodes (ECNs). The ECNs may be configured to identify ECNs in the vEEC and their capabilities, determine resource requirements for one or more software applications or tasks within the vEEC system, dynamically scale network resources based on the determined requirements, resolve network congestion by redistributing tasks among ECNs based on network traffic analysis, implement failover to cloud resources for ECNs that face resource limitations, offload computational tasks from edge devices, monitor network performance and resource utilization for adjustments, and refine resource allocation models and system configurations based on feedback and performance metrics.

20 Claims, 37 Drawing Sheets

(51) Int. Cl.

| | |
|---|---|
| *H04L 41/0806* | (2022.01) |
| *H04L 47/70* | (2022.01) |
| *H04L 47/762* | (2022.01) |

(52) U.S. Cl.
CPC .......... *H04L 47/762* (2013.01); *H04L 47/822* (2013.01); *H04L 47/829* (2013.01)

(58) Field of Classification Search
CPC ..... G06F 9/46; G06F 9/54; G06F 9/50; H04L 41/0663; H04L 41/0806; H04L 47/762; H04L 47/822; H04L 47/829; H04L 41/0895; H04L 41/16; H04L 41/40; H04L 41/5009; H04L 41/5019; H04L 41/5025; H04L 43/0817; H04L 43/0852; H04L 43/0876; H04L 43/16; H04L 43/20; H04L 47/83; H04L 47/70
See application file for complete search history.

(56) References Cited

U.S. PATENT DOCUMENTS

| | | | |
|---|---|---|---|
| 10,382,992 | B2 | 8/2019 | Sahin et al. |
| 11,360,982 | B1 | 6/2022 | Liu et al. |
| 2009/0285124 | A1 | 11/2009 | Aguirre et al. |
| 2015/0288619 | A1 | 10/2015 | Fritsch |
| 2016/0094398 | A1 | 3/2016 | Choudhury et al. |
| 2018/0183855 | A1 | 6/2018 | Sabella et al. |
| 2020/0145337 | A1* | 5/2020 | Keating .............. H04L 47/2425 |
| 2021/0021619 | A1 | 1/2021 | Smith et al. |
| 2022/0124005 | A1* | 4/2022 | Doshi ................... H04L 47/821 |
| 2022/0197773 | A1* | 6/2022 | Butler .................... G06F 9/505 |
| 2022/0232423 | A1* | 7/2022 | Thyagaturu ........... H04W 28/10 |
| 2022/0321425 | A1 | 10/2022 | Decker et al. |
| 2022/0400085 | A1* | 12/2022 | Ananthanarayanan ...................... G06F 9/505 |
| 2023/0132992 | A1* | 5/2023 | Bernat ................... G06F 9/505 709/201 |
| 2023/0353504 | A1* | 11/2023 | Bose ................... H04L 12/1403 |
| 2024/0314058 | A1* | 9/2024 | Mueck ................... H04L 41/40 |

OTHER PUBLICATIONS

3GPP; TSG SA; 5G System Enhancements for Edge Computing; Stage 2 (Release 17), 3GPP TS 23.548 V17.4.0, Sep. 22, 2022, pp. 7-10. (56 pages).
U.S. Appl. No. 18/540,520, filed Dec. 14, 2023, 153 pages.
U.S. Appl. No. 18/540,552, filed Dec. 14, 2023, 151 pages.
U.S. Appl. No. 18/540,591, filed Dec. 14, 2023, 151 pages.
International Searching Authority; PCT; International Preliminary Report of Patentability; International Application No. PCT/US2023/084238; mailed Jun. 12, 2025; 6 pages.

* cited by examiner

| Supported | Tier 3 | Tier 2 | Tier 1 |
|---|---|---|---|
| Device Only | Primary | N/A | N/A |
| Edge Accelerated Cloud Native | N/A | Optional | Primary |
| Edge Enhanced Device Native | Primary | Optional | N/A |
| Edge Native | Primary | Primary | N/A |

FIG. 2

Figure 5:
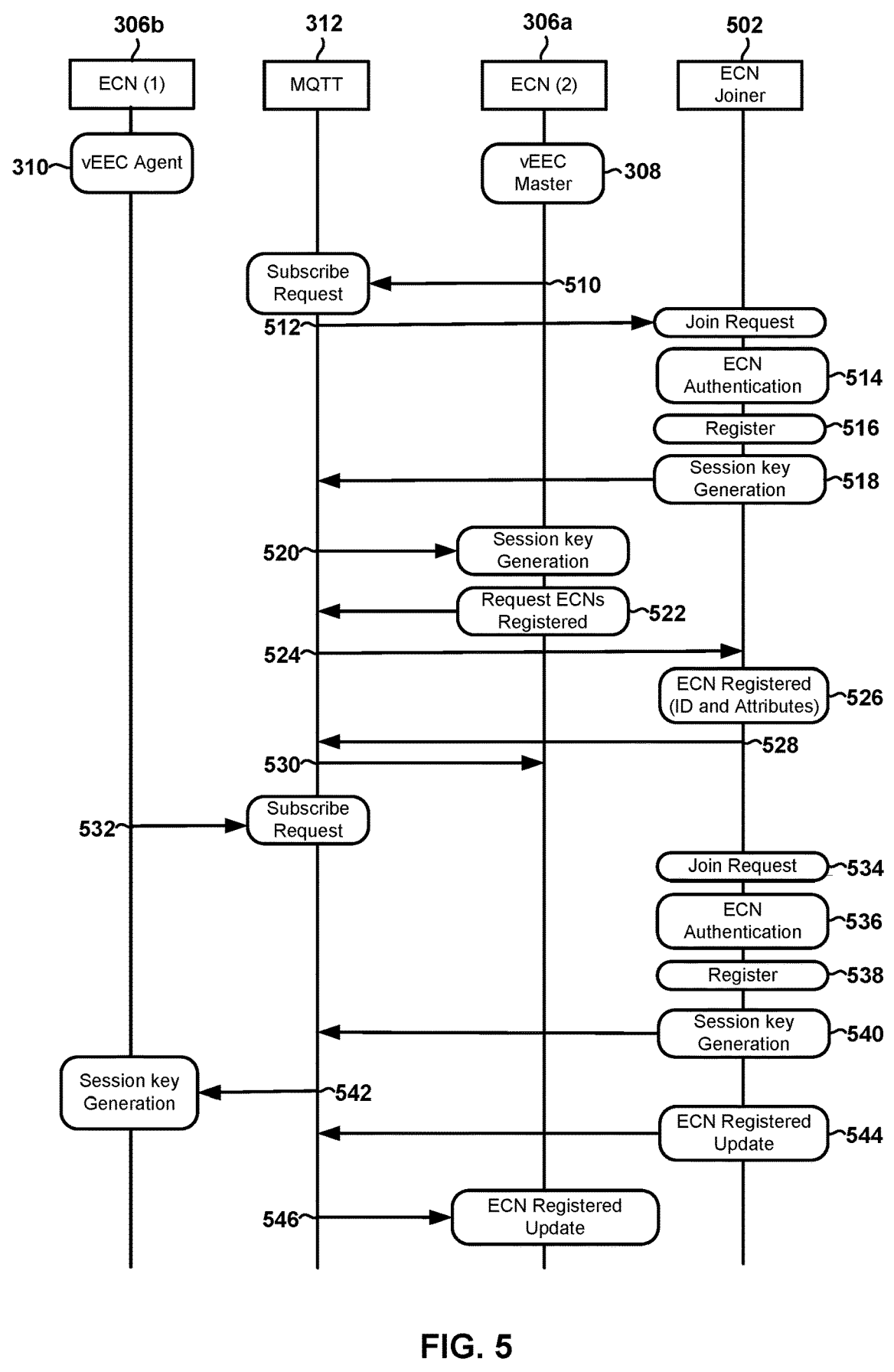

306b
ECN (1)

312
MQTT

306a
ECN (2)

502
ECN Joiner

310 — vEEC Agent vEEC Master — 308

Subscribe Request ◄— 510

512 — Join Request

ECN Authentication — 514

Register — 516

Session key Generation — 518

520 — Session key Generation

Request ECNs Registered — 522

524 —

ECN Registered (ID and Attributes) — 526

— 528

530 —

532 — Subscribe Request

Join Request — 534

ECN Authentication — 536

Register — 538

Session key Generation — 540

Session key Generation ◄— 542

ECN Registered Update — 544

546 — ECN Registered Update

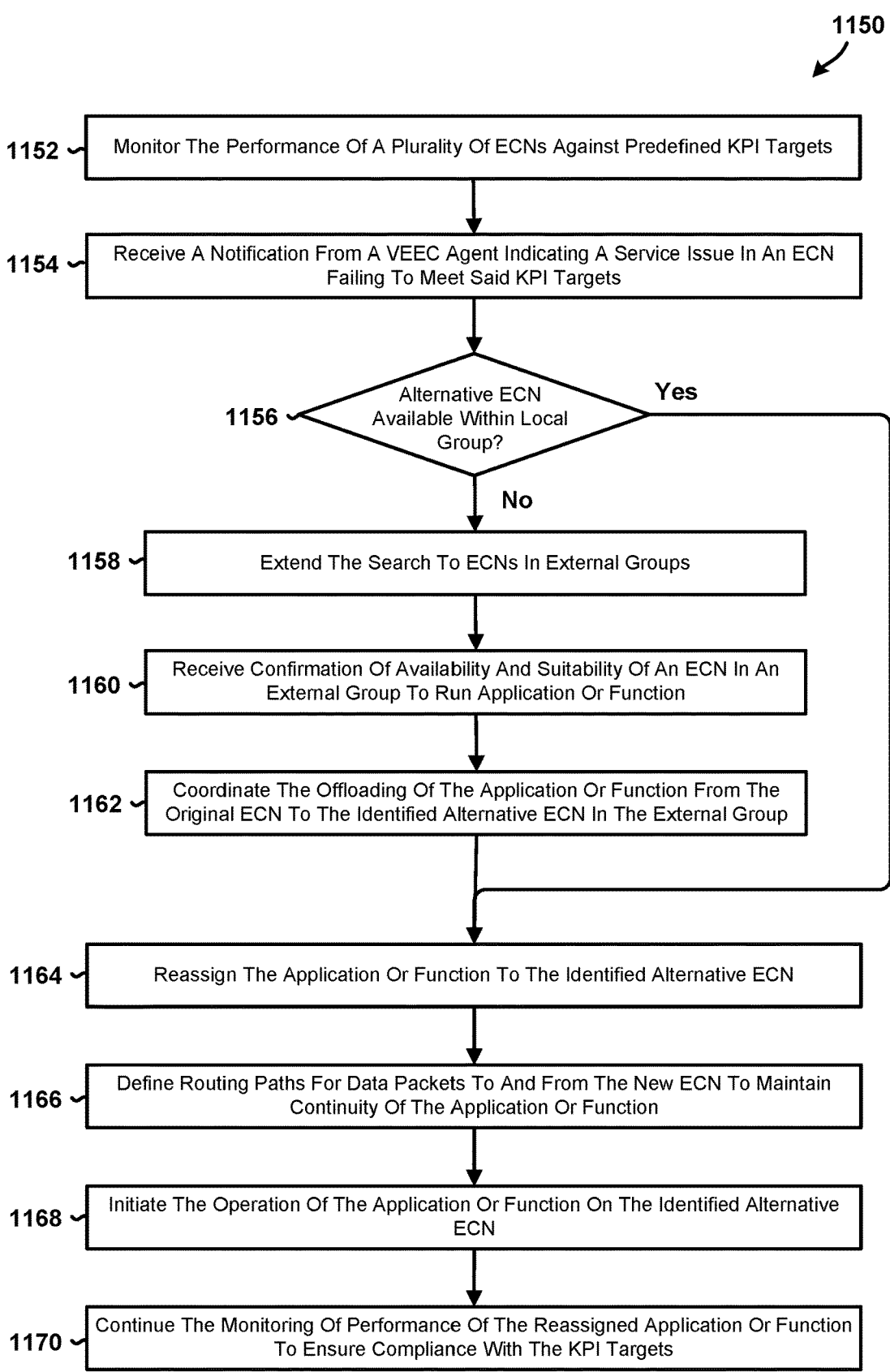

1150

1152 — Monitor The Performance Of A Plurality Of ECNs Against Predefined KPI Targets 1154 — Receive A Notification From A VEEC Agent Indicating A Service Issue In An ECN Failing To Meet Said KPI Targets 1156 — Alternative ECN Available Within Local Group?

Yes

No

1158 — Extend The Search To ECNs In External Groups

1160 — Receive Confirmation Of Availability And Suitability Of An ECN In An External Group To Run Application Or Function 1162 — Coordinate The Offloading Of The Application Or Function From The Original ECN To The Identified Alternative ECN In The External Group 1164 — Reassign The Application Or Function To The Identified Alternative ECN 1166 — Define Routing Paths For Data Packets To And From The New ECN To Maintain Continuity Of The Application Or Function 1168 — Initiate The Operation Of The Application Or Function On The Identified Alternative ECN 1170 — Continue The Monitoring Of Performance Of The Reassigned Application Or Function To Ensure Compliance With The KPI Targets

SC1 vEEC
Master/
Server

ECN

SE3 vEEC
Agent

ECN

SE1 vEEC
Agent

ECN

SE2

E
D

UC1

E
D

E
D

UC2

SC2 vEEC
Master/
Server

ECN

SE6 vEEC
Agent

ECN

SE4 vEEC
Agent

ECN

SE5

E
D

E
D

UC3

E
D

E
D

UC4

MS
C2

SC3 vEEC
Master/
Agent

ECN

SE7

E
D

UC5

E
D

E
D

UC6

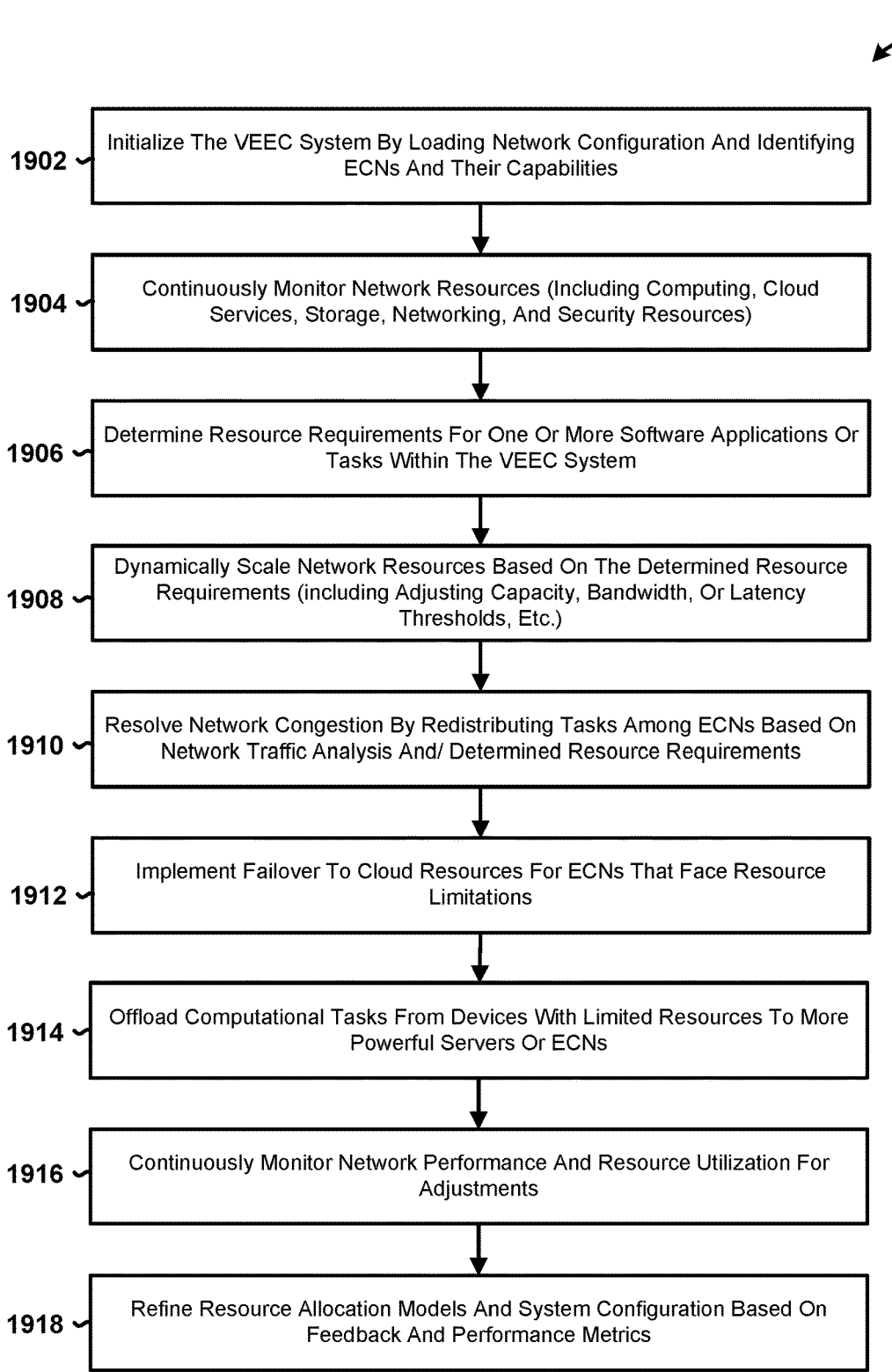

1900

1902 — Initialize The VEEC System By Loading Network Configuration And Identifying ECNs And Their Capabilities 1904 — Continuously Monitor Network Resources (Including Computing, Cloud Services, Storage, Networking, And Security Resources)

1906 — Determine Resource Requirements For One Or More Software Applications Or Tasks Within The VEEC System 1908 — Dynamically Scale Network Resources Based On The Determined Resource Requirements (including Adjusting Capacity, Bandwidth, Or Latency Thresholds, Etc.)

1910 — Resolve Network Congestion By Redistributing Tasks Among ECNs Based On Network Traffic Analysis And/ Determined Resource Requirements 1912 — Implement Failover To Cloud Resources For ECNs That Face Resource Limitations 1914 — Offload Computational Tasks From Devices With Limited Resources To More Powerful Servers Or ECNs 1916 — Continuously Monitor Network Performance And Resource Utilization For Adjustments 1918 — Refine Resource Allocation Models And System Configuration Based On Feedback And Performance Metrics

FIG. 19

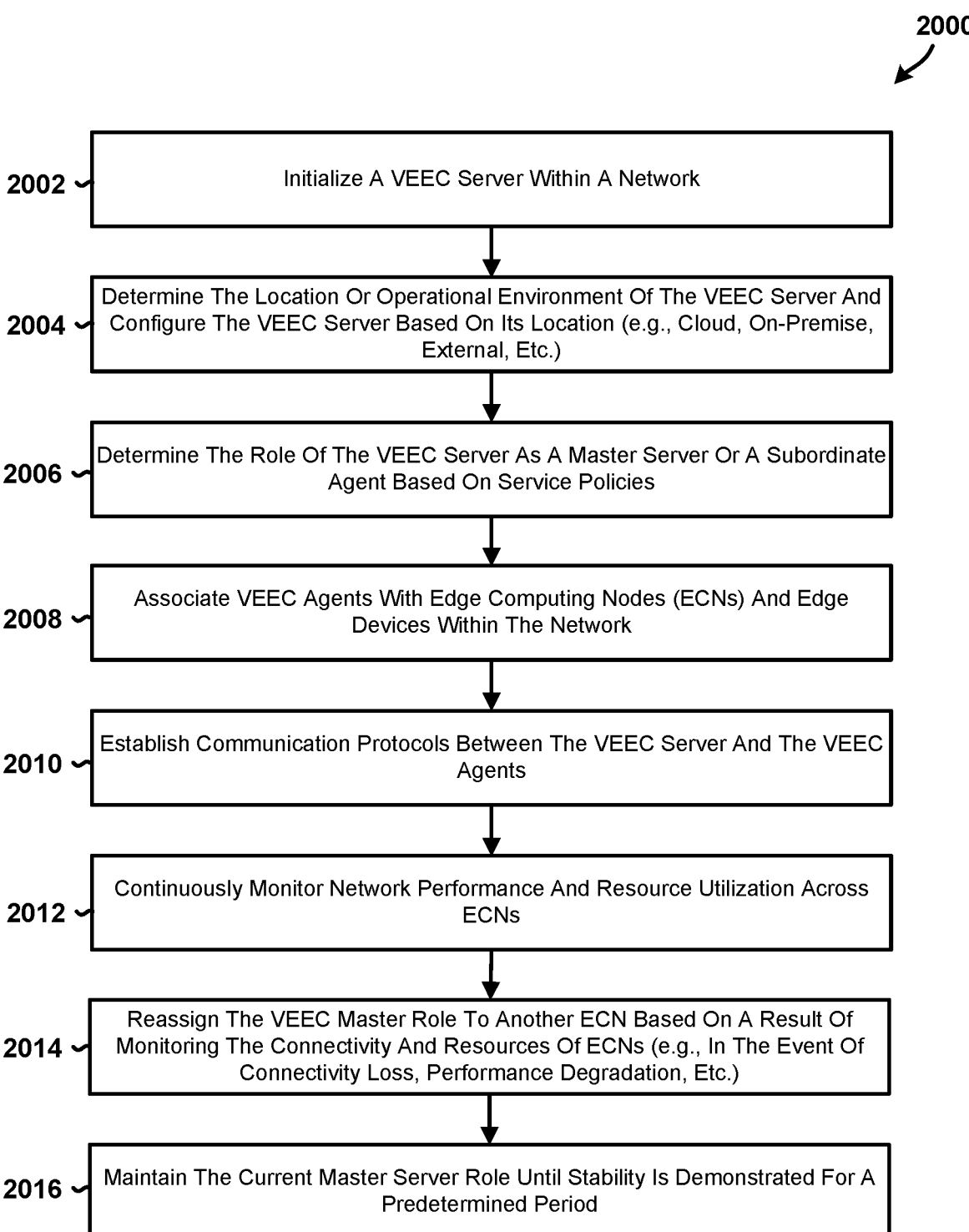

2000

2002 — Initialize A VEEC Server Within A Network

2004 — Determine The Location Or Operational Environment Of The VEEC Server And Configure The VEEC Server Based On Its Location (e.g., Cloud, On-Premise, External, Etc.)

2006 — Determine The Role Of The VEEC Server As A Master Server Or A Subordinate Agent Based On Service Policies 2008 — Associate VEEC Agents With Edge Computing Nodes (ECNs) And Edge Devices Within The Network 2010 — Establish Communication Protocols Between The VEEC Server And The VEEC Agents 2012 — Continuously Monitor Network Performance And Resource Utilization Across ECNs 2014 — Reassign The VEEC Master Role To Another ECN Based On A Result Of Monitoring The Connectivity And Resources Of ECNs (e.g., In The Event Of Connectivity Loss, Performance Degradation, Etc.)

2016 — Maintain The Current Master Server Role Until Stability Is Demonstrated For A Predetermined Period

FIG. 20

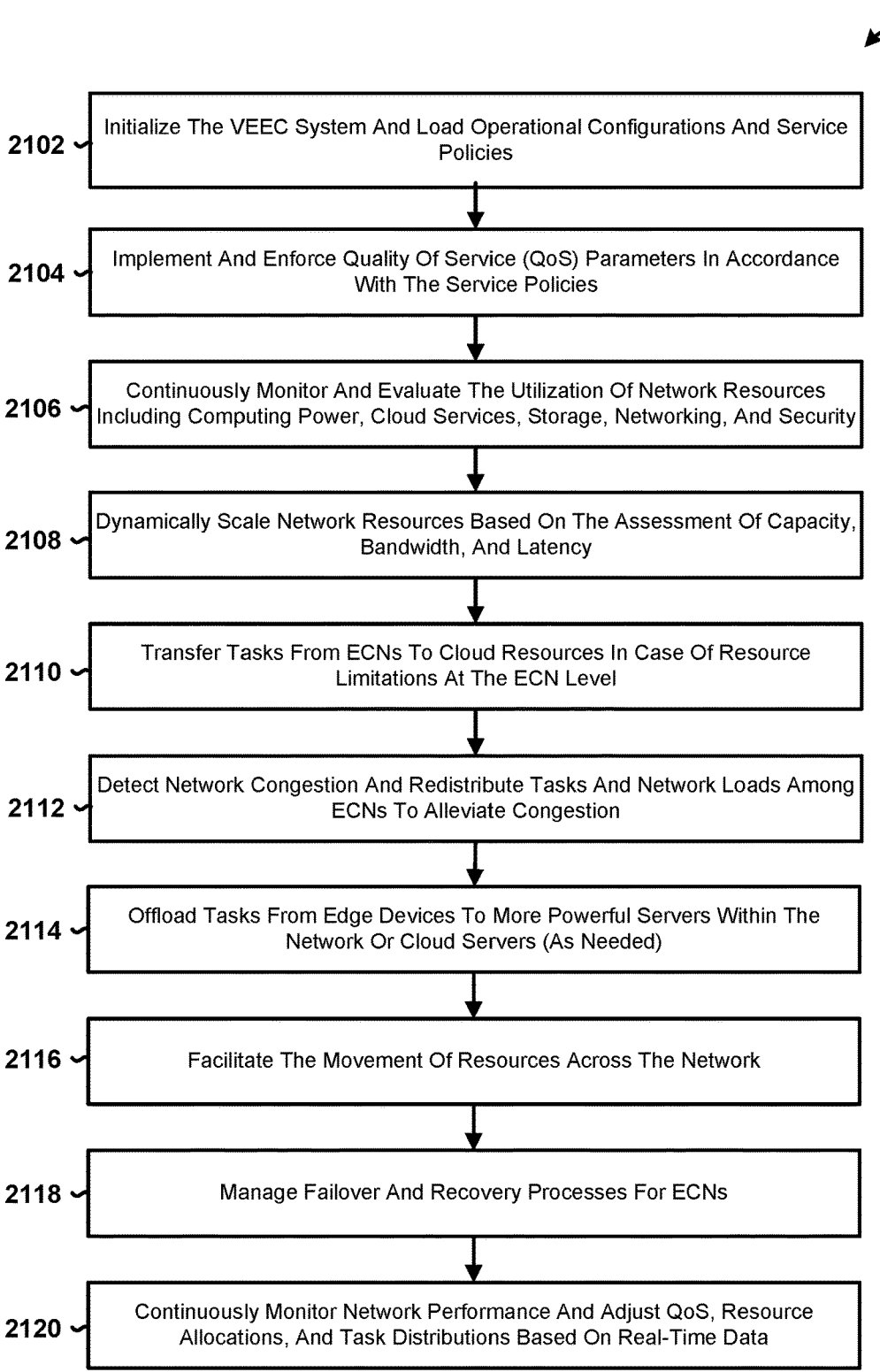

2100

2102 — Initialize The VEEC System And Load Operational Configurations And Service Policies 2104 — Implement And Enforce Quality Of Service (QoS) Parameters In Accordance With The Service Policies 2106 — Continuously Monitor And Evaluate The Utilization Of Network Resources Including Computing Power, Cloud Services, Storage, Networking, And Security 2108 — Dynamically Scale Network Resources Based On The Assessment Of Capacity, Bandwidth, And Latency 2110 — Transfer Tasks From ECNs To Cloud Resources In Case Of Resource Limitations At The ECN Level 2112 — Detect Network Congestion And Redistribute Tasks And Network Loads Among ECNs To Alleviate Congestion 2114 — Offload Tasks From Edge Devices To More Powerful Servers Within The Network Or Cloud Servers (As Needed)

2116 — Facilitate The Movement Of Resources Across The Network

2118 — Manage Failover And Recovery Processes For ECNs

2120 — Continuously Monitor Network Performance And Adjust QoS, Resource Allocations, And Task Distributions Based On Real-Time Data

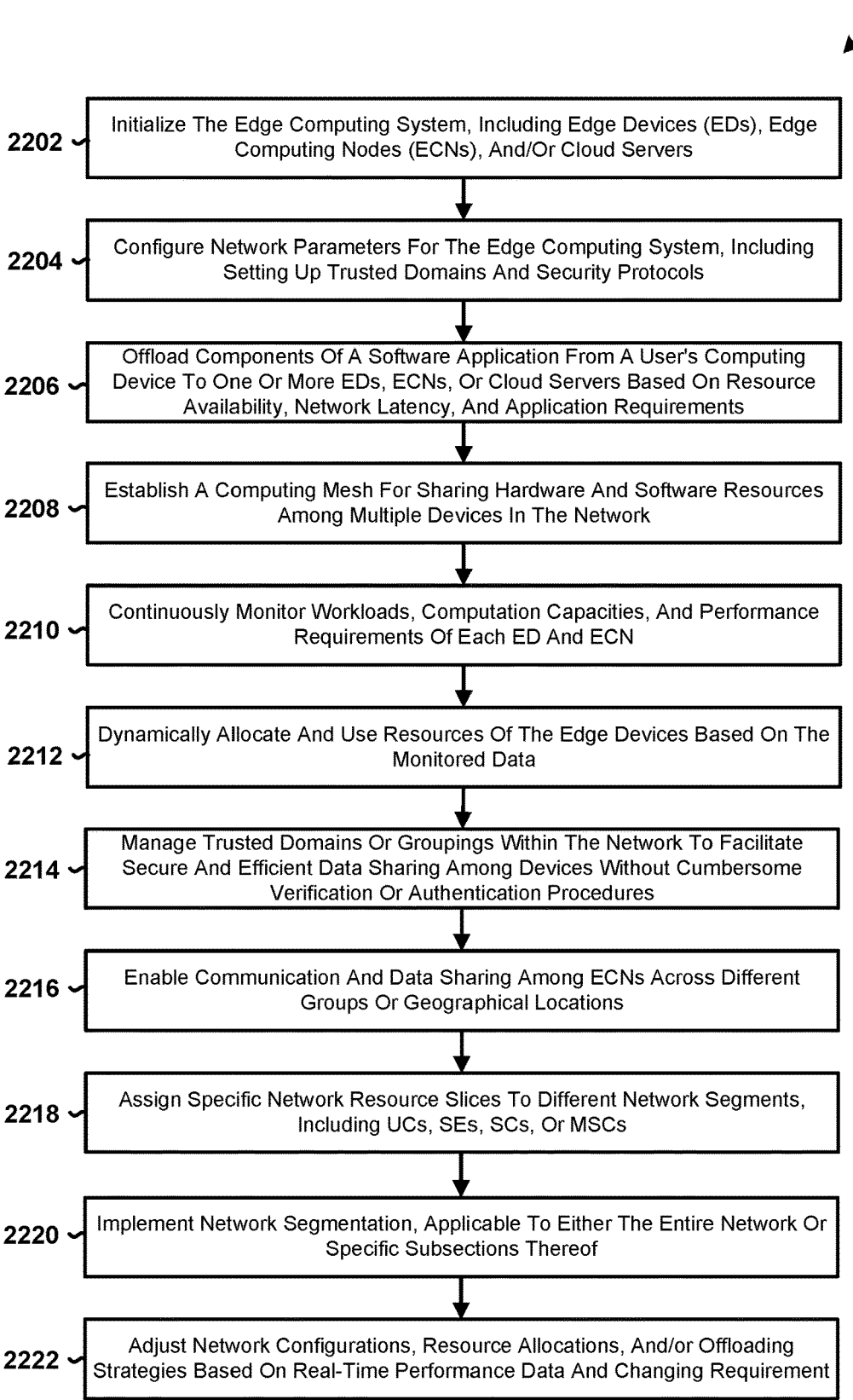

2202 — Initialize The Edge Computing System, Including Edge Devices (EDs), Edge Computing Nodes (ECNs), And/Or Cloud Servers 2204 — Configure Network Parameters For The Edge Computing System, Including Setting Up Trusted Domains And Security Protocols 2206 — Offload Components Of A Software Application From A User's Computing Device To One Or More EDs, ECNs, Or Cloud Servers Based On Resource Availability, Network Latency, And Application Requirements 2208 — Establish A Computing Mesh For Sharing Hardware And Software Resources Among Multiple Devices In The Network 2210 — Continuously Monitor Workloads, Computation Capacities, And Performance Requirements Of Each ED And ECN 2212 — Dynamically Allocate And Use Resources Of The Edge Devices Based On The Monitored Data 2214 — Manage Trusted Domains Or Groupings Within The Network To Facilitate Secure And Efficient Data Sharing Among Devices Without Cumbersome Verification Or Authentication Procedures 2216 — Enable Communication And Data Sharing Among ECNs Across Different Groups Or Geographical Locations 2218 — Assign Specific Network Resource Slices To Different Network Segments, Including UCs, SEs, SCs, Or MSCs 2220 — Implement Network Segmentation, Applicable To Either The Entire Network Or Specific Subsections Thereof 2222 — Adjust Network Configurations, Resource Allocations, And/Or Offloading Strategies Based On Real-Time Performance Data And Changing Requirement

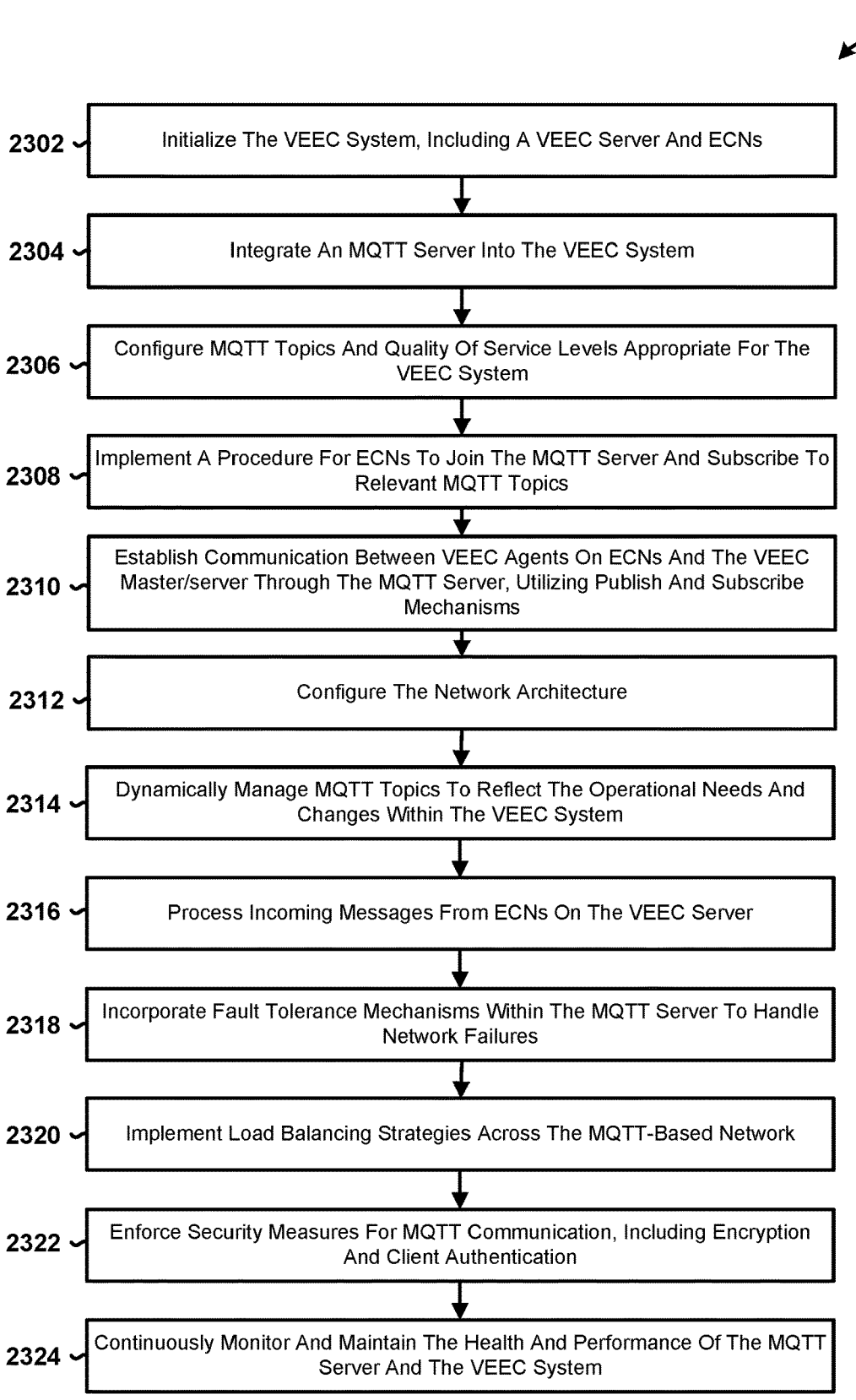

2302 — Initialize The VEEC System, Including A VEEC Server And ECNs

2304 — Integrate An MQTT Server Into The VEEC System

2306 — Configure MQTT Topics And Quality Of Service Levels Appropriate For The VEEC System 2308 — Implement A Procedure For ECNs To Join The MQTT Server And Subscribe To Relevant MQTT Topics 2310 — Establish Communication Between VEEC Agents On ECNs And The VEEC Master/server Through The MQTT Server, Utilizing Publish And Subscribe Mechanisms 2312 — Configure The Network Architecture 2314 — Dynamically Manage MQTT Topics To Reflect The Operational Needs And Changes Within The VEEC System 2316 — Process Incoming Messages From ECNs On The VEEC Server 2318 — Incorporate Fault Tolerance Mechanisms Within The MQTT Server To Handle Network Failures 2320 — Implement Load Balancing Strategies Across The MQTT-Based Network 2322 — Enforce Security Measures For MQTT Communication, Including Encryption And Client Authentication 2324 — Continuously Monitor And Maintain The Health And Performance Of The MQTT Server And The VEEC System

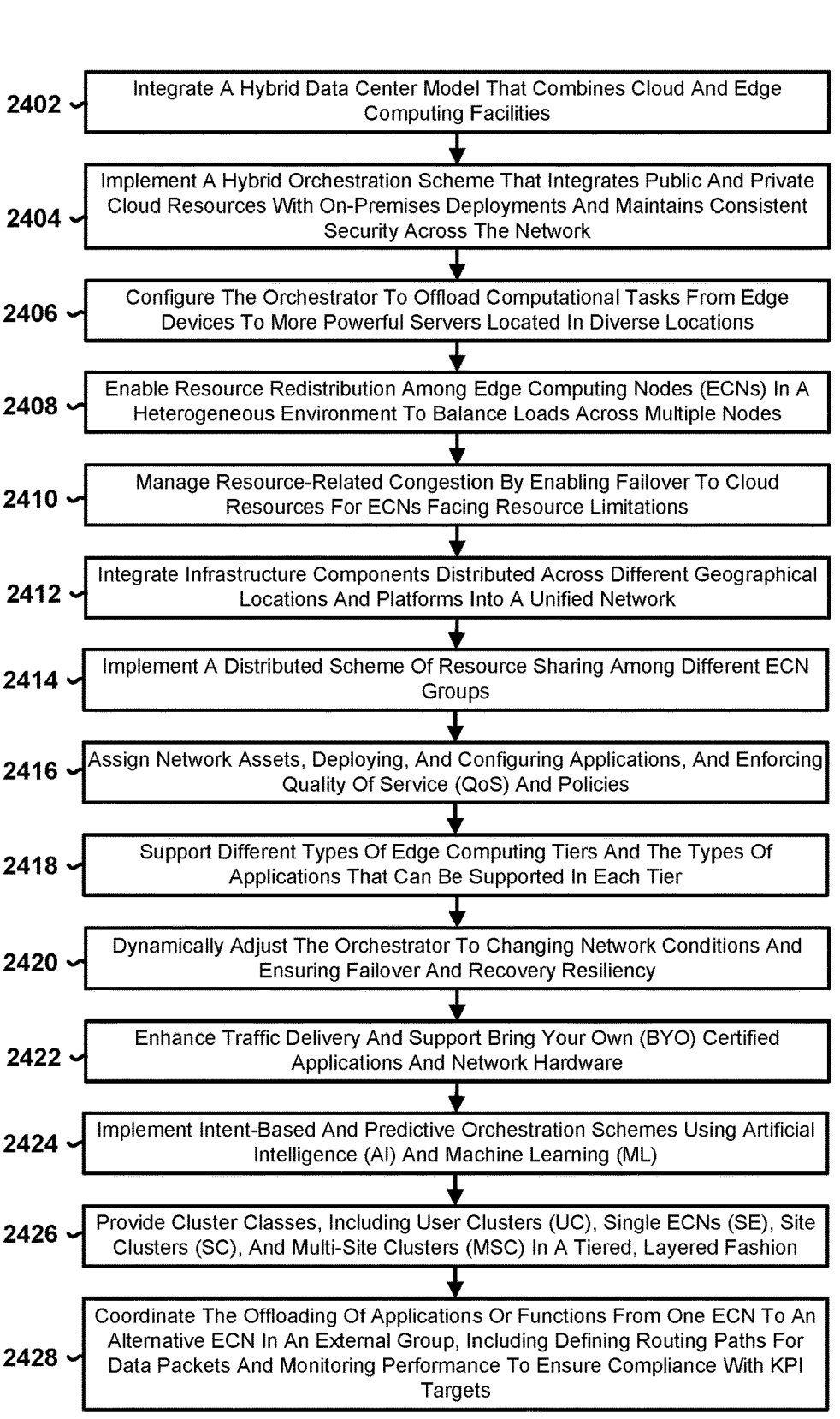

2402 — Integrate A Hybrid Data Center Model That Combines Cloud And Edge Computing Facilities 2404 — Implement A Hybrid Orchestration Scheme That Integrates Public And Private Cloud Resources With On-Premises Deployments And Maintains Consistent Security Across The Network 2406 — Configure The Orchestrator To Offload Computational Tasks From Edge Devices To More Powerful Servers Located In Diverse Locations 2408 — Enable Resource Redistribution Among Edge Computing Nodes (ECNs) In A Heterogeneous Environment To Balance Loads Across Multiple Nodes 2410 — Manage Resource-Related Congestion By Enabling Failover To Cloud Resources For ECNs Facing Resource Limitations 2412 — Integrate Infrastructure Components Distributed Across Different Geographical Locations And Platforms Into A Unified Network 2414 — Implement A Distributed Scheme Of Resource Sharing Among Different ECN Groups 2416 — Assign Network Assets, Deploying, And Configuring Applications, And Enforcing Quality Of Service (QoS) And Policies 2418 — Support Different Types Of Edge Computing Tiers And The Types Of Applications That Can Be Supported In Each Tier 2420 — Dynamically Adjust The Orchestrator To Changing Network Conditions And Ensuring Failover And Recovery Resiliency 2422 — Enhance Traffic Delivery And Support Bring Your Own (BYO) Certified Applications And Network Hardware 2424 — Implement Intent-Based And Predictive Orchestration Schemes Using Artificial Intelligence (AI) And Machine Learning (ML)

2426 — Provide Cluster Classes, Including User Clusters (UC), Single ECNs (SE), Site Clusters (SC), And Multi-Site Clusters (MSC) In A Tiered, Layered Fashion 2428 — Coordinate The Offloading Of Applications Or Functions From One ECN To An Alternative ECN In An External Group, Including Defining Routing Paths For Data Packets And Monitoring Performance To Ensure Compliance With KPI Targets

FIG. 24

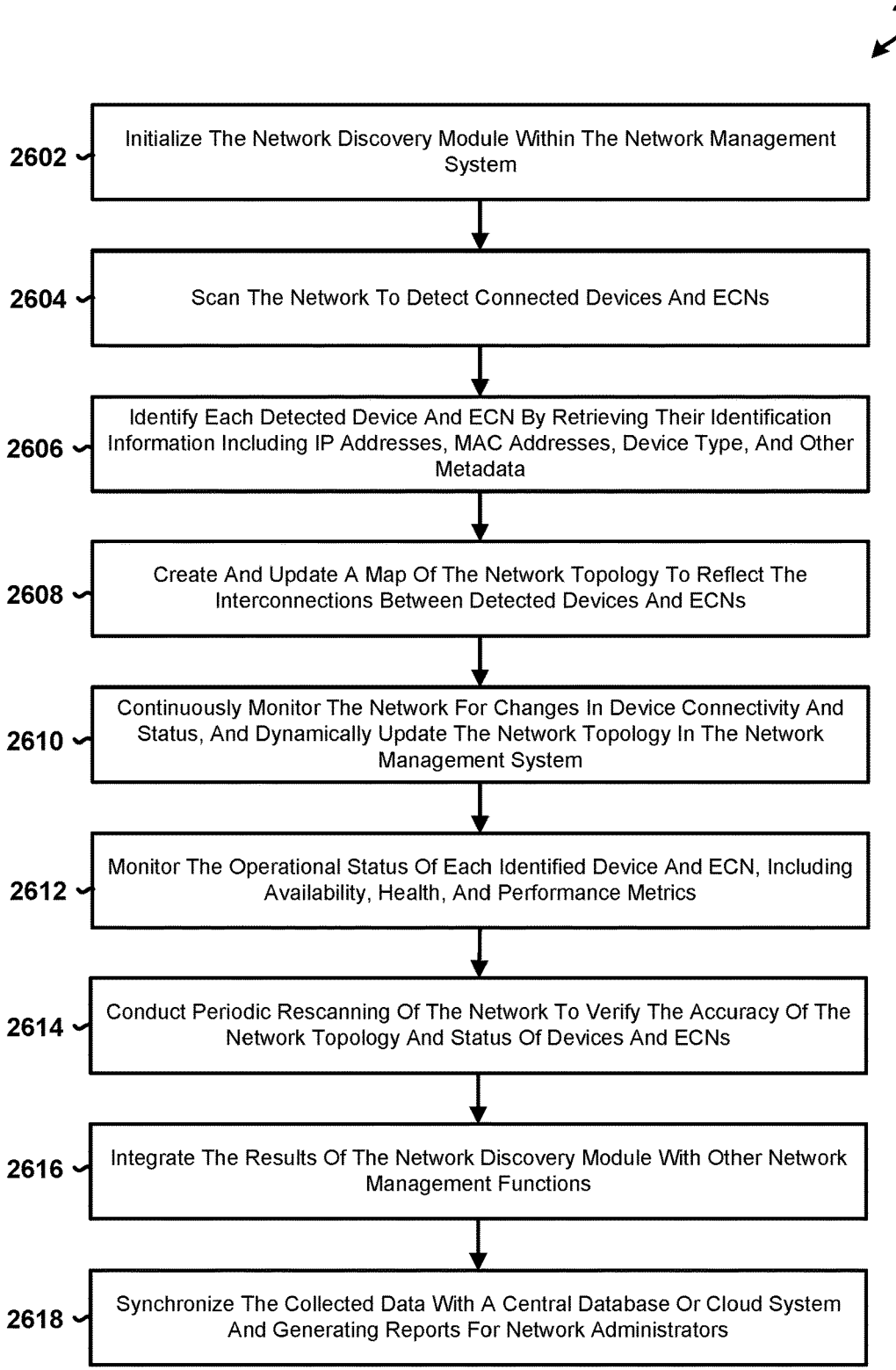

2600

2602 — Initialize The Network Discovery Module Within The Network Management System 2604 — Scan The Network To Detect Connected Devices And ECNs 2606 — Identify Each Detected Device And ECN By Retrieving Their Identification Information Including IP Addresses, MAC Addresses, Device Type, And Other Metadata 2608 — Create And Update A Map Of The Network Topology To Reflect The Interconnections Between Detected Devices And ECNs 2610 — Continuously Monitor The Network For Changes In Device Connectivity And Status, And Dynamically Update The Network Topology In The Network Management System 2612 — Monitor The Operational Status Of Each Identified Device And ECN, Including Availability, Health, And Performance Metrics 2614 — Conduct Periodic Rescanning Of The Network To Verify The Accuracy Of The Network Topology And Status Of Devices And ECNs 2616 — Integrate The Results Of The Network Discovery Module With Other Network Management Functions 2618 — Synchronize The Collected Data With A Central Database Or Cloud System And Generating Reports For Network Administrators

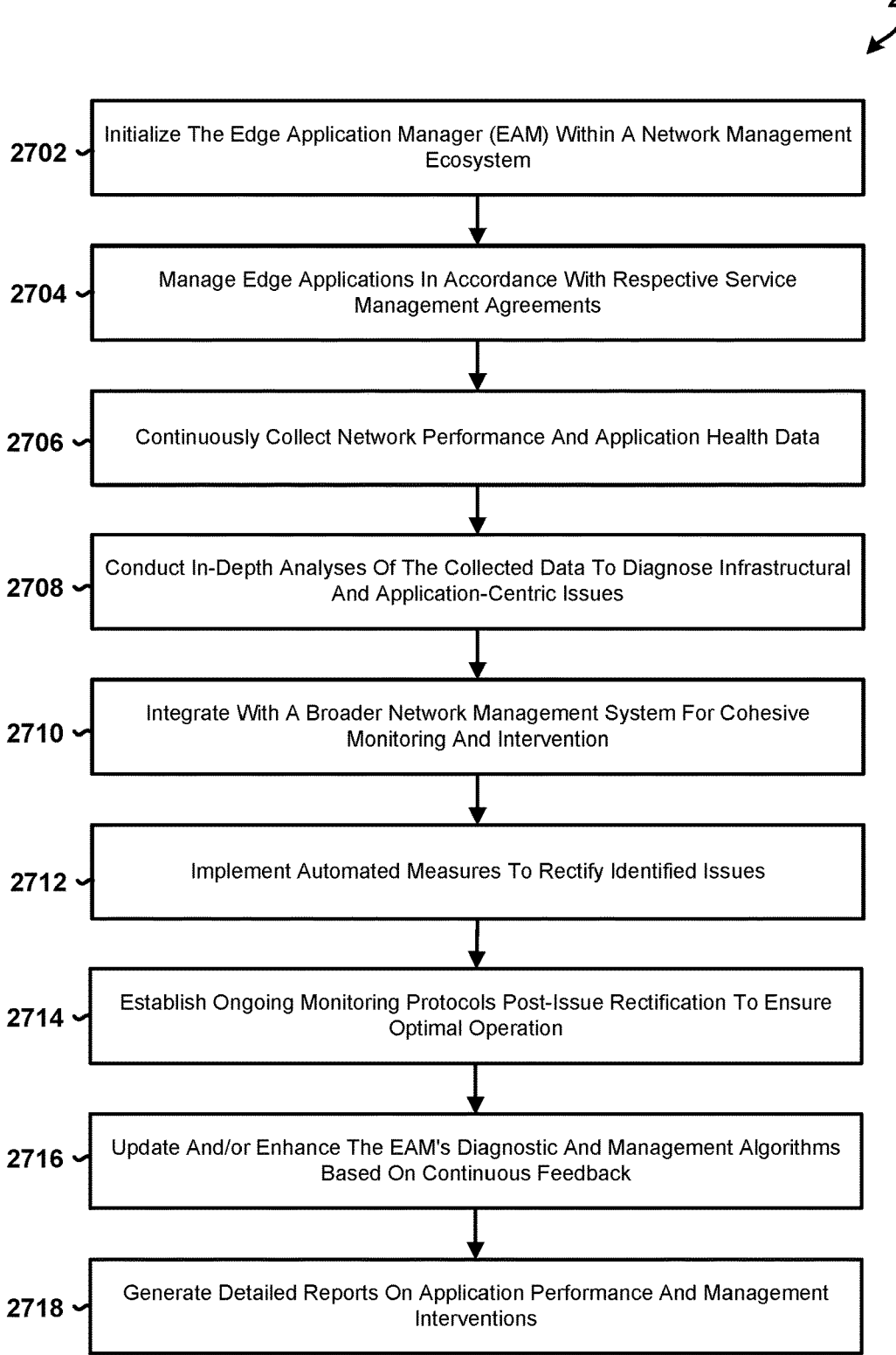

2702 — Initialize The Edge Application Manager (EAM) Within A Network Management Ecosystem 2704 — Manage Edge Applications In Accordance With Respective Service Management Agreements 2706 — Continuously Collect Network Performance And Application Health Data 2708 — Conduct In-Depth Analyses Of The Collected Data To Diagnose Infrastructural And Application-Centric Issues 2710 — Integrate With A Broader Network Management System For Cohesive Monitoring And Intervention 2712 — Implement Automated Measures To Rectify Identified Issues 2714 — Establish Ongoing Monitoring Protocols Post-Issue Rectification To Ensure Optimal Operation 2716 — Update And/or Enhance The EAM's Diagnostic And Management Algorithms Based On Continuous Feedback 2718 — Generate Detailed Reports On Application Performance And Management Interventions

FIG. 27

SYSTEMS AND METHODS FOR NEXTG EDGE COMPUTING CAPACITY MANAGEMENT

RELATED APPLICATIONS

This application claims the benefit of priority to U.S. Provisional Patent Application No. 63/433,029 entitled "Systems and Methods for 6G Edge Computing Orchestration," filed Dec. 16, 2022, the entire contents of which are hereby incorporated by reference for all purposes.

This application is also related to U.S. Non-Provisional patent application Ser. No. 18/540,520 entitled "Systems and Methods for Next G Edge Computing Orchestration," filed Dec. 14, 2023 and U.S. Non-Provisional patent application Ser. No. 18/540,591 entitled "Systems and Methods for NextG Edge Computing Network Segment Management," filed Dec. 14, 2023, the entire contents of which are hereby incorporated by reference for all purposes.

BACKGROUND

Wireless communication technologies have experienced significant growth in recent years, driven by advancements in communication hardware, expanding networks, and more efficient protocols. This growth has enabled wireless and Internet service providers to offer a broadening spectrum of features and services. To match these developments, user electronic devices (e.g., smartphones, smartwatches, and head-mounted displays (HMDs)) have evolved to become smaller, yet more powerful and complex. These devices now incorporate advanced processors, system-on-chips (SoCs), and memory, allowing for the execution of sophisticated software applications. Despite these advancements, they still face limitations in processing power, memory, and battery life.

In response, communications service providers (CSPs) globally have acknowledged the need to position compute, storage, and networking infrastructure proximate to application usage locations. Edge computing addresses this by enabling applications to operate at the network's edge, offering advantages such as lower latency, higher throughput, context awareness, reduced data backhaul, and enhanced security.

Edge Cloud Computing (ECC), as facilitated by 5G technology, aims to provide robust virtualization and multi-tenant capabilities. This includes network capacity partitioning among various tenants and offering dynamic, on-demand processing capabilities near end-users. 5G may be configured to deliver high-speed data at the network's edge, supporting a wide range of applications that fall into three primary categories: Enhanced Mobile Broadband (eMBB), Massive Machine Type Communications (mMTC), and Ultra-Reliable Low Latency Communication (uRRLC). In addition, advanced applications such as Vehicle-to-Every-thing (V2X) may integrate elements from all three categories.

The forthcoming 6G technology is anticipated to surpass 5G by integrating computing and artificial intelligence, merging communication and sensing, and incorporating energy harvesting devices. Research in 6G is broadly categorized into six areas: Connecting Intelligence, Network of Networks, Sustainability, Global Service Coverage, Extreme Experience, and Trustworthiness. 6G aims to improve network performance, both in Radio Access Network (RAN) and Core, to enhance service delivery to end-users at the network's edge. Consequently, the development of new and improved 6G edge computing orchestration solutions will be beneficial to communication networks, network service providers, and consumers of their services.

SUMMARY

Various aspects include methods of orchestrating network operations in a virtual Edge Enhanced Computing (vEEC) system, which may include initializing the vEEC system by loading network configuration and identifying edge computing nodes (ECNs) and their capabilities, monitoring network resources that include computing, cloud services, storage, networking, and security resources, determine resource requirements for one or more software applications or tasks within the vEEC system, dynamically scaling network resources based on the determined requirements, resolving network congestion by redistributing tasks among ECNs based on network traffic analysis, implementing failover to cloud resources for ECNs that face resource limitations, offloading computational tasks from edge devices with limited resources to more powerful servers or ECNs, monitoring network performance and resource utilization for adjustments, and refining resource allocation models and system configuration based on feedback and performance metrics.

In some aspects, initializing the vEEC system further may include establishing communication links with cloud resources. In some aspects, dynamically scaling network resources may include updating the resource allocations in real-time. In some aspects, dynamically scaling network resources may include modifying specific parameters for capacity, bandwidth, and latency. In some aspects, resolving network congestion by redistributing tasks among the ECNs based on the network traffic analysis further may include adjusting routing paths to alleviate traffic load. In some aspects, implementing failover to cloud resources for ECNs that face resource limitations may include implementing failover protocols and reducing service disruptions by redirecting tasks.

In some aspects, offloading computational tasks from edge devices with limited resources to more powerful servers or ECNs further may include balancing computational workloads across the network to enhance application capabilities. In some aspects, offloading computational tasks from edge devices with limited resources to more powerful servers or ECNs further may include migrating the computational tasks based on latency and performance characteristics. Some aspects may further include implementing artificial intelligence or machine learning algorithms for predictive analysis and proactive system adjustments.

Further aspects may include a computing device (edge computing device) having a processor configured with processor-executable instructions to perform various operations corresponding to the methods discussed above. Further aspects may include a computing device (edge computing device) having various means for performing functions corresponding to the method operations discussed above. Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIG. 2 is a table that illustrates the different types of edge computing tiers and the types of applications supported in each tier.

FIG. 5 is a process flow diagram illustrating another method for registering an ECN operating as a vEEC agent with an ECN operating as a vEEC master in accordance with some embodiments.

FIG. 11B is a process flow diagram illustrating a method of managing application offloading in a vEEC system in accordance with some embodiments.

FIG. 19 is a process flow diagram illustrating a method for orchestrating network operations in a virtual Edge Enhanced Computing (vEEC) system in accordance with some embodiments.

FIG. 20 is a process flow diagram illustrating a method for managing a vEEC system in accordance with some embodiments.

FIG. 21 is a process flow diagram illustrating a method for managing services and applications in a vEEC system in accordance with some embodiments.

FIG. 22 is a process flow diagram illustrating a method for managing an edge computing system in accordance with some embodiments.

FIG. 23 is a process flow diagram illustrating a method for managing communication in a vEEC system using MQTT in accordance with some embodiments.

FIG. 24 is a process flow diagram illustrating a method for managing a vEEC system with an orchestrator in accordance with some embodiments.

FIG. 26 is a process flow diagram illustrating a method for operating a network discovery module in a network management system in accordance with some embodiments.

FIG. 27 is a process flow diagram illustrating a method for managing applications in an edge computing environment using an Edge Application Manager (EAM) in accordance with some embodiments.

DETAILED DESCRIPTION

Figure 1A:
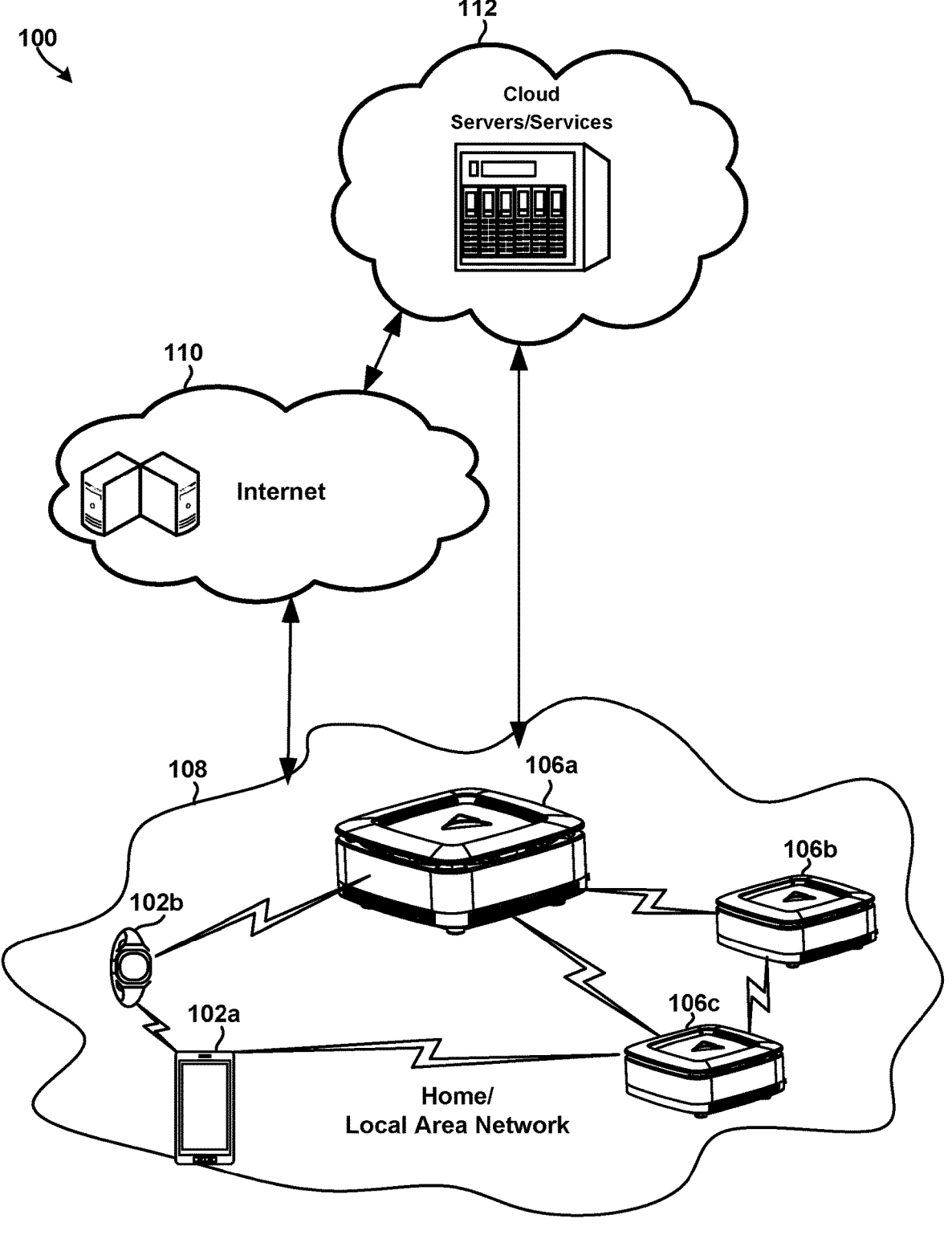
FIG. 1A is a component block diagram that illustrates an example edge computing system suitable for implementing the various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

The various embodiments may include, use, incorporate, implement, provide access to a variety of wired and wireless communication networks, technologies and standards that are currently available or contemplated in the future, including any or all of Bluetooth®, Bluetooth Low Energy, ZigBee, LoRa, Wireless HART, Weightless P, DASH7, RPMA, RFID, NFC, LwM2M, Adaptive Network Topology (ANT), Worldwide Interoperability for Microwave Access (WiMAX), WIFI, WiFi6, WIFI Protected Access I & II (WPA, WPA2), personal area networks (PAN), local area networks (LAN), metropolitan area networks (MAN), wide area networks (WAN), networks that implement the data over cable service interface specification (DOCSIS), networks that utilize asymmetric digital subscriber line (ADSL) technologies, third generation partnership project (3GPP), long term evolution (LTE) systems, LTE-Direct, third generation wireless mobile communication technology (3G), fourth generation wireless mobile communication technology (4G), fifth generation wireless mobile communication technology (5G), sixth generation wireless mobile communication technology (6G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), etc. Each of these wired and wireless technologies involves, for example, the transmission and reception of data, signaling and/or content messages. Any references to terminology and/or technical details related to an individual wired or wireless communications standard or technology are for illustrative purposes only, and not intended to limit the scope of the claims to a particular communication system or technology unless specifically recited in the claim language.

The term "computing device" may be used herein to refer to any one or all of quantum computing devices, edge devices, Internet access gateways, modems, routers, network switches, residential gateways, access points, integrated access devices (IAD), mobile convergence products, networking adapters, multiplexers, personal computers, laptop computers, tablet computers, user equipment (UE), user device (UD), smartphones, mobile devices, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., smartwatch, head-mounted display, fitness tracker, etc.), IoT devices (e.g., smart televisions, smart speakers, smart locks, lighting systems, smart switches, smart plugs, smart doorbells, smart doorbell cameras, smart air pollution/quality monitors, smart smoke alarms, security systems, smart thermostats, etc.), media players (e.g., DVD players, ROKU™, AppleTV™, etc.), digital video recorders (DVRs), automotive heads up displays, portable projectors, 3D holographic displays, and other similar devices that include a programmable processor and communications circuitry for providing the functionality described herein.

The term "mobile device" may be used herein to refer to any one or all of wireless devices, internet-of-things (IOT) devices, cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, smart cars, connected vehicles, wearable device (e.g., HMD, etc.) and similar electronic devices which include a programmable processor, a memory and circuitry for sending and/or receiving wireless communication signals. While various embodiments are particularly useful in wireless mobile devices, such as smartphones and tablets, the embodiments are generally useful in any electronic device that includes a programable processor suitable for executing extended reality software applications.

The term "system on chip" (SOC) may be used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent system-on-chips (SOCs) coupled together via high speed communication circuitry and packaged in close proximity, such as on a single backplane, single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, IP core, GPU core, etc.) configured to read and execute program instructions. A SOC may include multiple multicore processors, and each processor in a SOC may be referred to as a core. The term "multiprocessor" may be used herein to refer to a system or device that includes two or more processing units configured to read and execute program instructions.

The term "container" may be used herein to refer to a software component that supports virtualization technology, enables the abstraction (or virtualization) of computing resources, and/or separates software applications from their underlying infrastructure (thus making them infrastructure agnostic). For example, a container may be one of a plurality of isolated user-space instances operating on the kernel, each of which operates under the illusion of having full or exclusive access to the processors, peripherals, memory, and I/O of the computing system. Application programs running inside of a container may only see the container's contents and devices assigned to that container. In addition to these isolation mechanisms, a container or kernel may include resource-management features that limit the impact of one container's activities on other containers. In the various embodiments, the functions described herein may be run as a native program to the individual hardware elements, deployed as a virtual machine or machines, or deployed in containers.

The term "computing mesh" may be used herein to refer to any or a variety of techniques and technologies for distributing or linking various computing resources that are connected by wireless or wired communication links, but which are not otherwise connected to each other. This may include a software-defined network in which computing resources are located in one node/component and the data used for the program or application resides in another node/component as part of the computing mesh. A computing mesh typically utilizes a self-organizing network in which computing resources are shared between different nodes in a computing mesh environment.

The term "application mesh" may be used herein to refer to any or a variety of techniques and technologies used for running and executing applications across different physical devices. The devices may be connected via wireless or wired communication links or a combination thereof. An application mesh may include different components or processes of the application running on different nodes/components based on computing resources, sensors, or auxiliary devices attached to each node/component, enabling the application to utilize all the resources it needs to perform the functions of the application using different nodes/components concurrently.

The term "connectivity mesh" may be used herein to refer to any or a variety of techniques and technologies used for connecting different computing platforms for the ability to share computing resources, run and execute applications, or provide connectivity with other devices or systems. The connectivity mesh may also be a self-organizing network (SON) network, with the ability to adapt and provide the optimum connectivity based on node/component availability, latency, and other parameters necessary to sharing computing resources, performing application mesh techniques, or providing a self-healing backbone for delivering and receiving information.

The term "edge computing," may be used herein to refer to systems, techniques, or technologies that improve the user experience by offloading computation-intensive tasks to edge devices or servers deployed at the edge of the networks, thereby freeing up resources on the computing device and/or allowing the computing device to perform more computations or more resource-intensive tasks. Edge computing may be regarded as a new paradigm for overcoming resource shortages on resource-constrained computing devices.

The term "edge device" may be used herein to refer to a computing device that includes a programmable processor and communications circuitry for establishing communication links to consumer devices (e.g., smartphones, IoT devices, etc.) and/or to network components in a service provider, core, cloud, or enterprise network. For example, an edge device may include or implement functionality associated with any one or all of an access point, gateway, modem, router, network switch, residential gateway, mobile convergence product, networking adapter, customer premise device, multiplexer, and/or other similar devices. An edge device may also include various memories and an edge database. Some embodiments may include an edge computing system that includes one or more edge devices, any or all of which may be configured to perform or implement edge computing techniques or technologies.

An edge computing system may operate to combine the advantages of remote cloud servers and close-by edge devices to provide a powerful collaborative cloud and edge computing system that improves the performance, end-to-end latency, and/or energy consumption characteristics of user computing devices. For example, traditional cloud servers have robust computational and/or storage capacities but are deployed in remote geographical locations, and thus may suffer from long propagation delays when transmitting large volumes of information through the cloud resources. Edge devices, on the other hand, may not be subject to the same lengthy propagation delays as their cloud server counterparts, but often include much more limited computational and/or storage capacities than their cloud server counterparts. Thus, the storage and processing capabilities of an edge device may be much more limited than the storage and processing capabilities of a cloud server, but the access times and/or latency characteristics may be much better on an edge device than its cloud server counterpart. An edge computing system configured in accordance with the various embodiments may intelligently and efficiently balance these and other tradeoffs (e.g., between performance and latency).

In some embodiments, the edge computing system may be configured to balance these and other tradeoffs (e.g., between performance, latency, power consumption, etc.) by implementing and/or using a computing mesh, an application mesh, and/or a connectivity mesh. For example, the edge computing system may include several edge devices that are connected by wireless or wired communication links and configured to operate as a computing mesh in which the computing resources of each edge device are shared with one another. When several edge devices in a computing mesh are simultaneously served by the same cloud server, the edge computing system may intelligently and dynamically allocate the available cloud computational resource to each edge device based on their workload, local computation capacities, and performance requirements.

Some embodiments may include methods, and edge computing systems/devices configured to implement the methods, for orchestrating network operations in a virtual Edge Enhanced Computing (vEEC) system. In some embodiments, the methods may include providing a vEEC server or vEEC Master (which may be located in the cloud, on-premise, or outside the cloud), enabling the vEEC server to function as the master server based on service policies, associating several vEEC agents with edge computing nodes (ECNs) and edge devices (EDs), facilitating the seamless transition of master server role among ECNs in the event of connectivity loss (e.g., based on an algorithm that evaluates the ECNs' resources and connectivity status, etc.), managing network resources within an integrated system (including computing, cloud services, storage, networking, and security), and dynamically scaling resources according to specific requirements (e.g., capacity, bandwidth, and latency).

For example, a processor in a computing system (e.g., ECN, etc.) may be configured to configure and initialize the vEEC Server based on network requirements and scalability needs, enable the server to operate as a master server governed by service policies (e.g., by loading and enforcing the policies to guide network operations and decision-making processes), facilitate communication and coordination among vEEC agents associated with ECNs and edge devices (e.g., for synchronized network management, etc.), assess each ECN's resources and connectivity to determine which ECN should take over as the master server in case of connectivity issues, oversee the allocation and optimization of network resources (including computing power, storage, and security measures) to ensure efficient network operation, and continuously evaluate network demands and dynamically scale resources to optimizing for factors such as capacity, bandwidth, and latency.

In some embodiments, the methods may further include addressing network congestion by redistributing resources among ECNs in a heterogeneous environment, enabling failover to cloud resources for ECNs facing resource limitations, enhancing application capabilities of edge devices with limited resources through a compute distribution scheme, and offloading computational tasks from edge devices to more powerful servers located elsewhere. For example, a processor in a computing system (e.g., ECN, etc.) may be configured to redistribute resources among ECNs to mitigate congestion (particularly in environments with varied or heterogeneous network elements), enable automatic redirection of tasks to cloud resources when ECNs face resource limitations (e.g., to ensure continued network service), implement a compute distribution scheme that uses more powerful computing resources to enhance the capabilities of resource-limited edge devices and identify tasks that may be offloaded from edge devices to more powerful servers to improve performance and efficiency.

In some embodiments, the methods may further include standardizing configurations within clusters or points of distribution (PODs) for simplified subscriber management, creating a cohesive environment for workloads and resources facilitating resource movement for failover or performance optimization, integrating infrastructure components distributed across various locations and platforms, implementing a hybrid orchestration scheme for managing network infrastructures and services and maintaining consistent security across the network in diverse systems.

In some embodiments, the methods may further include configuring the vEEC orchestrator to support compatibility with a range of networks and devices from different vendors to avoid vendor lock-in, using network-as-a-service (NaaS) technologies for deploying and configuring applications across geographically distributed edge devices, providing visibility into the status and connectivity of devices, and dynamically adjusting to changing network conditions.

In some embodiments, the methods may further include using intent-based and predictive orchestration schemes to simplify network deployments and operations, implementing functionalities such as AI/ML-based orchestration, life cycle management, QoS and policy enforcement, and network slicing, ensuring failover and recovery resiliency, optimizing data and services in terms of capacity, latency, and delivery, and supporting adaptive monitoring, network and security configurations, traffic delivery optimization, and BYO-certified applications and network hardware.

For example, a processor in a computing system (e.g., ECN, etc.) may be configured to initialize a vEEC server, determine its location (cloud, on-premise, or outside the cloud), load service policies to determine the role of the vEEC server (master or subordinate agent), identify and associate vEEC agents with respective ECNs and edge devices, establish communication protocols between the vEEC server and agents, monitor connectivity and resources of ECNs, and reassign the master server role to the most suitable ECN (e.g., based on the algorithm's assessment) in case of connectivity loss. The processor may maintain the current master server role until a rejoined master demonstrates stability for a predetermined period. The processor may dynamically assess and scale network resources (computing, cloud services, storage, networking, security) based on capacity, bandwidth, and latency requirements.

The processor may repeatedly or continuously monitor network performance and resource utilization, detect and address network congestion by redistributing resources among ECNs, implement failover protocols to transfer tasks to cloud resources in case of resource limitations at the ECN level, enhance application capabilities on edge devices with limited resources through compute distribution schemes, and offload tasks from edge devices to more powerful servers when needed.

The processor may standardize configurations within clusters, groups, or PODS, create a cohesive environment for workloads and resources to facilitate resource movement, integrate infrastructure components across various locations and platforms, implement a hybrid orchestration scheme for network management, ensure consistent security across diverse network systems, configure the vEEC orchestrator for compatibility with various networks and devices to avoid vendor lock-in, utilize NAAS technologies for application deployment across edge devices, apply intent-based and predictive orchestration schemes, implement AI/ML-based orchestration, life cycle management, QoS, policy enforcement, and network slicing, manage failover and recovery processes, and support adaptive monitoring, optimize traffic delivery, and accommodate BYO-certified applications and hardware.

The processor may regularly monitor the status and connectivity of devices and dynamically adjust network configurations and resources in response to changing conditions and demands.

FIG. 1A illustrates an example edge computing system 100 suitable for implementing the various embodiments. In the example illustrated in FIG. 1A, the edge computing system 100 includes user computing devices 102a, 102b and edge devices 106a-106c, any or all of which may be included in a home or local area network 108 and linked to the internet 110 and cloud servers/services 112 via wired or wireless communication links. In various embodiments, any or all of the user computing devices 102 and/or edge devices 106a-106c may include one or more processors that may be configured to implement the functionality described with reference to the edge computing system 100.

The edge computing system 100 may be configured to overcome various limitations of conventional solutions, such as limitations related to resource shortages on resource-constrained user computing devices 102 that run complex software applications and/or for which the performance, end-to-end latency and/or energy consumption characteristics of user computing devices 102 may have a direct, significant and/or user-perceivable impact on the user experience.

For example, the edge computing system 100 may include or work in conjunction with a user computing device 102, a cloud server 112 and one or more edge devices 106a-106c to offload computationally intensive tasks from a user computing device 102 to the one or more edge devices 106a-106c and/or to one or more cloud servers 112. As another example, the edge computing system 100 may offload the main components of a software application from a user computing device 102 to one or more edge devices 106a-106c.

As another example, the edge computing system of 100 may offload components of a software application from a user computing device 102 to one of more edge devices 106a-106c.

As another example, the edge computing system of 100 may offload components of a software application from a user computing device 102 to one of more edge devices 106a-106c and or the cloud server 112.

In some embodiments, the edge computing system 100 may be configured to allow for the sharing of common resources (e.g., hardware resources, software resources, etc.) between multiple devices (e.g., edge devices 106a-106c). For example, the edge devices 106a-106c may be configured to operate as a computing mesh in which the computing resources of each of the edge devices 106a-106c are shared with one another. The edge computing system 100 may intelligently and dynamically utilize or allocate edge devices resources based on their workloads, local computation capacities, performance requirements, etc. The sharing of common resources may improve the performance and functioning of the edge computing system (e.g., by improving the performance of latency-sensitive edge-native applications, etc.).

In various embodiments, the edge devices 106a-106c may implement homogenous or heterogeneous computing architectures or environments. For example, the edge devices 106a-106c may be homogeneous in that they have the identical platforms and software versions. Similarly, the edge device 106a-106c may be heterogeneous in that they each include different operating systems, hardware architectures, processors, storage capabilities, wireless and wired capabilities, kernel capabilities, backhaul capabilities, software, or firmware versions, etc. In some embodiments, the edge devices 106a-106c may be included as part of a processor cluster architecture (e.g., a synchronous processor cluster architecture, an asynchronous or heterogeneous processor cluster architecture, etc.).

Figure 1B:
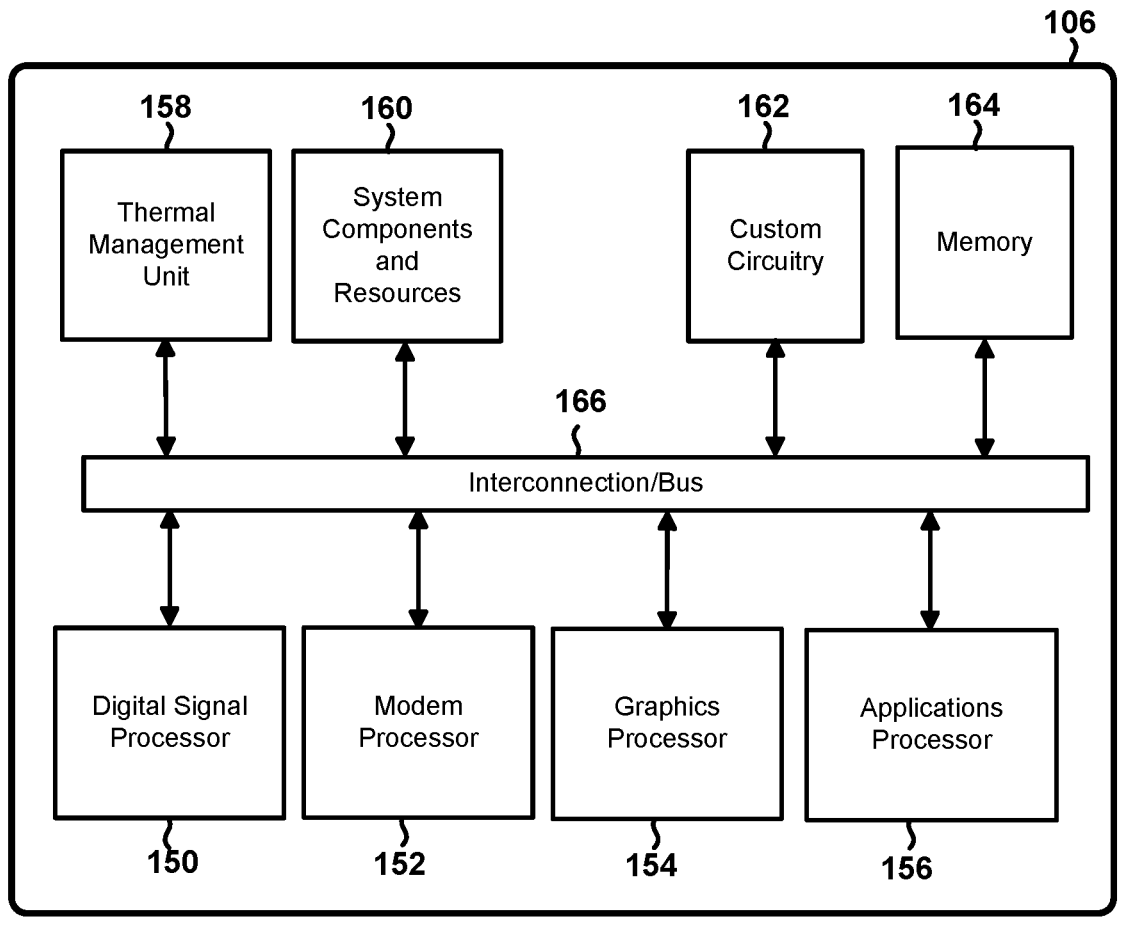
FIG. 1B is a component block diagram illustrating an example edge device that could be configured to implement an edge computing node (ECN) or other edge devices in accordance with some embodiments.

FIG. 1B illustrates components that could be included in an edge device 106 configured in accordance with some embodiments. In the example illustrated in FIG. 1B, the edge device 106 includes a digital signal processor (DSP) 150, a modem processor 152, a graphics processor 154, an application processor 156 connected to one or more of the processors, memory 164, custom circuitry 162, system components and resources 160, a thermal management unit 158, and an interconnection/bus module 166. The edge device 106 may operate as central processing unit (CPU) that carries out the instructions of software application programs by performing the arithmetic, logical, control and input/output (I/O) operations specified by the instructions.

Each processor 150, 152, 154, 156 may include one or more computing/processing cores, and each processor/core may perform operations independent of the other processors/cores. For example, the edge device 106 may include a processor that executes a first type of operating system (e.g., FreeBSD, LINUX, OS X, etc.) and a processor that executes a second type of operating system (e.g., MICROSOFT WINDOWS). In addition, any or all of the processors 150, 152, 154, 156 may be included as part of a processor cluster architecture (e.g., a synchronous processor cluster architecture, an asynchronous or heterogeneous processor cluster architecture, etc.).

The processors 150, 152, 154, 156 may be interconnected to one another and to the memory 162, system components and resources 160, and custom circuitry 162, and the thermal management unit 158 via the interconnection/bus module 166. The interconnection/bus module 166 may include an array of reconfigurable logic gates and/or implement a bus architecture (e.g., CoreConnect, AMBA, etc.). Communications may be provided by advanced interconnects, such as high-performance networks-on chip (NoCs).

The thermal management unit 158 may be configured to monitor and manage the device's junction temperature, surface/skin temperatures and/or the ongoing consumption of power by the active components that generate thermal energy in the device. The thermal management unit 158 may determine whether to throttle the performance of active processing components (e.g., CPU, GPU, LCD brightness), the processors that should be throttled, the level to which the frequency of the processors should be throttled when the throttling should occur, etc.

The system components and resources 160 and custom circuitry 162 may manage sensor data, analog-to-digital conversions, wireless data transmissions, and perform other specialized operations, such as decoding data packets and processing video signals. For example, the system components and resources 160 may include power amplifiers, voltage regulators, oscillators, phase-locked loops, peripheral bridges, temperature sensors (e.g., thermally sensitive resistors, negative temperature coefficient (NTC) thermistors, resistance temperature detectors (RTDs), thermocouples, etc.), semiconductor-based sensors, data controllers, memory controllers, system controllers, access ports, timers, and other similar components used to support the processors and software clients running on a device. The custom circuitry 162 may also include circuitry to interface with other computing systems and peripheral devices, such as wireless communication devices, external memory chips, etc.

The edge device 106 may further include an input/output module (not illustrated) for communicating with resources external to the SOC, such as a clock and a voltage regulator. Resources external to the SOC (e.g., clock, etc.) may be shared by two or more of the internal SOC processors/cores.

In addition to the edge device 106 discussed above, the various embodiments may include or may be implemented in a wide variety of computing systems, which may include SOCs, SIPs, a single processor, multiple processors, multicore processors, or any combination thereof.

Figure 1C:
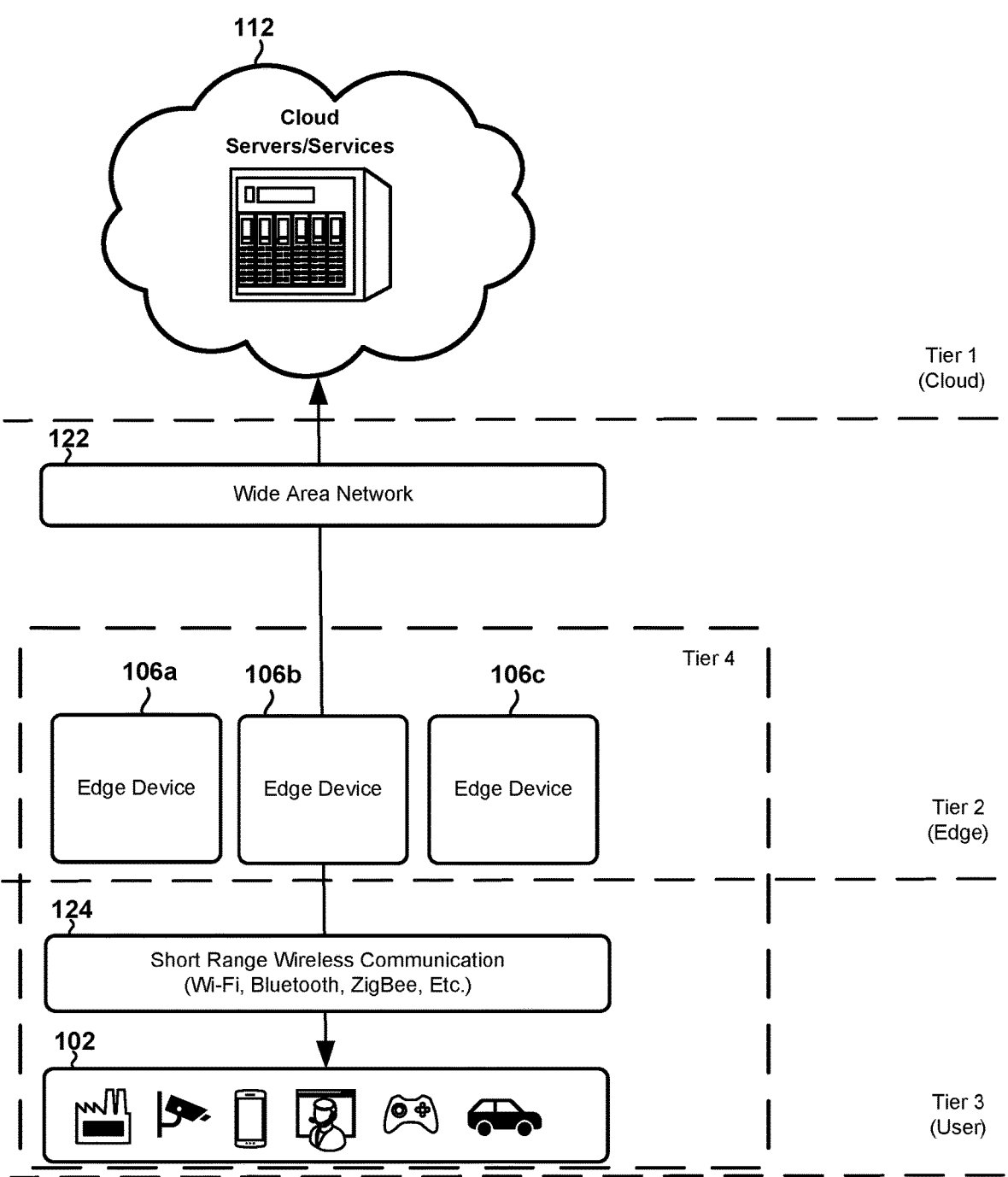
FIG. 1C is a component block diagram that illustrates an example edge computing system that is divided into tiers in accordance with some embodiments.

FIG. 1C illustrates an example edge computing system that is divided into tiers in accordance with some embodiments. The edge computing system 200 may include cloud servers/services 112 coupled to edge devices 106a-106c via a wide area network (WAN) 122. The edge devices 106a-106c may be coupled to the user devices 102 and/or each other via short range wireless communications 124, such as Wi-Fi, Bluetooth, ZigBee, etc. In some embodiments, the edge devices 106a-106c may be coupled to the user devices 102 via a physical wired connection (not shown) such as ethernet, etc.

The edge devices 106a-106c may be Edge Computing Nodes (ECNs) that are used to support edge computing, which involves the processing and analysis of data at the edge of a network, rather than in a centralized data center. ECNs may be equipped with both wired and wireless connectivity, which allows them to communicate with other devices, such as other edge devices 106a-106c that connect to them and other ECNs.

As mentioned above, the components illustrated in FIG. 1C are organized into divided into tiers. The cloud servers/services 112 may be included as part of a first tier (Tier 1). The edge devices 106a-106c may be included in the second tier (Tier 2). The user devices 102 may be included in a third tier (Tier 3). Some embodiments may include a fourth tier that straddles the second and third tiers (Tiers 2 and 3). The fourth tier may include a Dew computing node (not illustrated separately in FIG. 1C) and/or the versatile elastic edge compute architecture disclosed here. For example, in some embodiments, the vEEC system may be included in the fourth tier.

FIG. 2 is a table that illustrates the different types of edge computing tiers and types of applications which may be supported in each tier. For example, device only applications are primarily supported on third tier (Tier 3). Edge accelerated and/or cloud native applications are primarily supported on first tier (Tier 1) but could optionally be run on the second tier (Tier 2). Edge enhanced and/or device native applications are primarily supported on third tier (Tier 3) but could also optionally be run on the second tier (Tier 2). Edge native applications are primarily supported on both the second and third tiers (Tier 2 and Tier 3).

There may be technical challenges with low latency, mobility, and location awareness in a multi-tiered architecture in which applications are deployed from devices to the cloud. Yet, certain functions that may be performed by the edge hub/gateway and end device may not necessitate the involvement of higher layers (e.g., layer 3). Rather, these functions may be effectively managed with a two-tiered architecture.

FIGS. 3A-3G are component block diagrams that illustrate an example edge computing system 300 that could be configured to implement a Versatile Elastic Edge Compute/ Architecture (vEEC) system in accordance with some embodiments. In the example illustrated in FIG. 3A, the edge computing system 300 includes cloud servers/services 112, a WAN 122, and a plurality of edge computing nodes (ECNs) 306a-306c. ECN 306a may include a vEEC master/ Server component 308. ECNs 306b and 306c may each include a vEEC agent 310. Each of the ECNs 306a-306c may be an edge device (e.g., edge devices 106 illustrated in FIGS. 1A-1C). As such, the ECNs 306a-306c may be configured to implement or operate a vEEC system and/or otherwise support edge computing by processing and analyzing data at the edge of a network (network edge) instead of in a central data center or cloud 122. The ECNs 306a-306c may be equipped with both wired and/or wireless connectivity, which may allow them to communicate with other devices (e.g., user devices 102, other ECNs 306a-306c, etc.) in the system 300.

In some embodiments, each of the ECNs 306a-306c may be equipped with wireless access points (WAPs) with overlapping or distinct coverage areas, depending on the configuration of the network. Each ECN 306a-306c may also have its own service set identifiers (SSIDs) or several SSIDs so that it may operate as a local network or WAP.

Figure 3A:
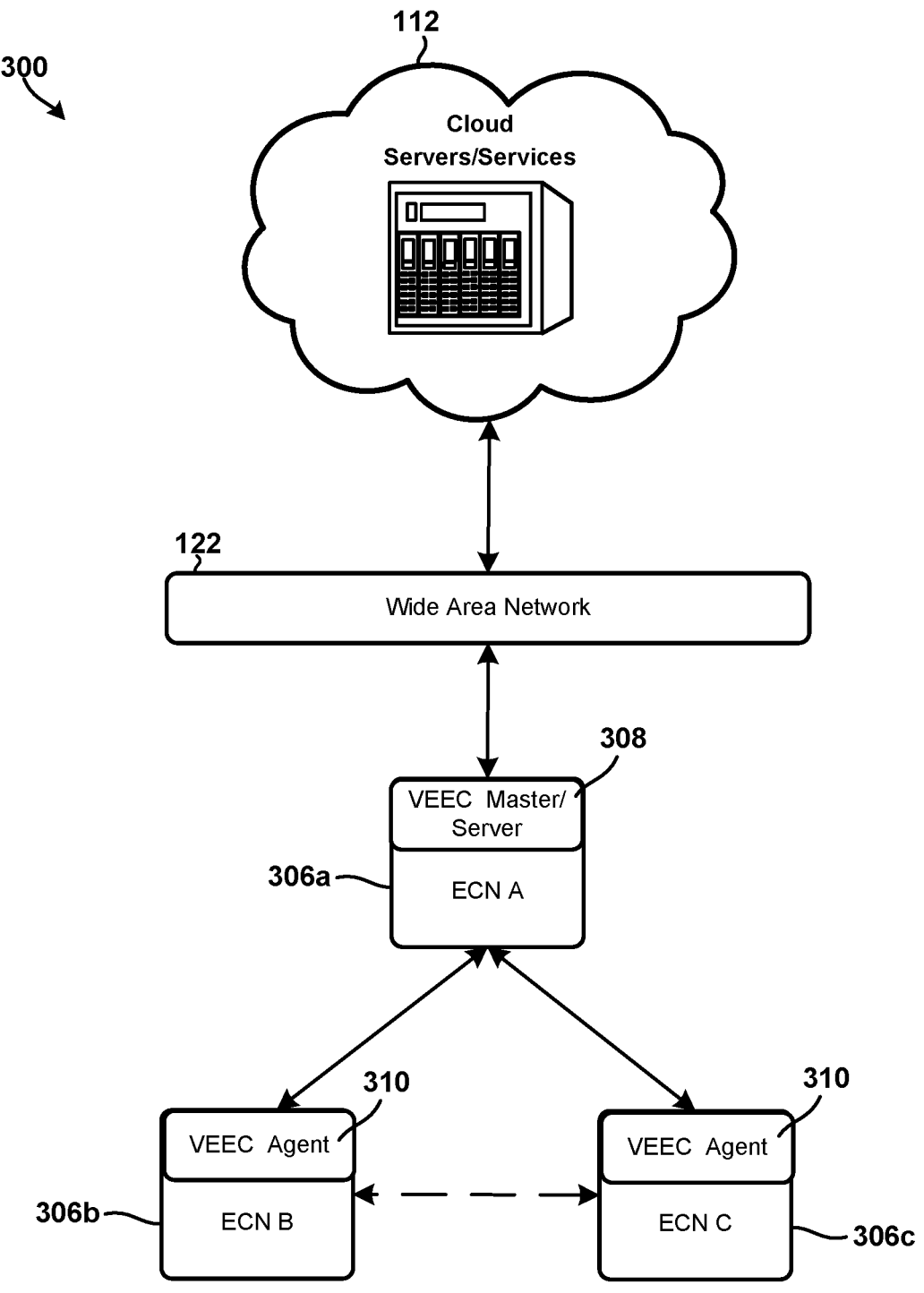
FIGS. 3A-3G are component block diagrams that illustrate example edge computing systems that could be configured to implement a versatile elastic edge compute/architecture (vEEC) system in accordance with various embodiments.

In the example illustrated in FIG. 3A, ECN A 306a provides the connectivity to the WAN 122 for ECN B 306b and ECN C 306c, both of which connect to ECN A 306a through a wired or wireless link. Such ECN-to-ECN connectivity may be configured in a variety of ways, such as in a star or mesh topology.

ECNs 306 that incorporate a WAP may be installed to work jointly, with each ECN 306 placed at regular or different physical intervals based on the effective coverage range of the wireless signal and/or the intended use of the devices. For example, a plurality of ECNs 306 might be installed in a warehouse to provide connectivity to a WAN 122 and/or to provide/support the monitoring and control of various systems and devices. Additional ECNs 306 may be added to the network or system 300, and the added ECNs 306 may reuse the same set of SSIDs that are part of the ECN network. This may extend the effective coverage of the local network independent of whether the ECNs 306 have direct wireless connectivity with each other.

Multiple devices (e.g., ECNs 306, user devices 102, etc.) may be related to a particular edge application deployment. Some embodiments may establish "trusted domains" or "groupings" to manage these devices and the application they are running. For example, some embodiments may group all the devices that are related to a particular edge application deployment into the same group or trusted domain. The embodiments may allow all devices that are grouped into the same trusted domain to communicate and share data with each other securely and efficiently, without cumbersome verification or authentication procedures. These groups may allow an edge application to operate in a distributed manner at the network edge on the devices that are best equipped or best suited for the specific tasks to which they are assigned.

Deploying applications at the network's edge may require distinct implementation and orchestration strategies, differing from those used in cloud or monolithic architectures. These edge applications may involve single or multiple related devices. As such, the relationship may require a trusted domain or grouping to effectively manage the application and its extensions. The various embodiments may deliver edge applications so as to enhance network functionality and performance of the network and its components.

The vEEC system exemplifies this approach because, for example, it may be used to run low-latency applications at the network's edge. The vEEC system may be configured to dynamically allocate resources to edge devices and/or adjust the resources available to deliver the services to the edge device. The vEEC system may include a distributed orchestrator component that may be configured to allow for flexible network configurations and management.

The vEEC Architecture depicted in FIG. 3A is shown with three ECNs 306a-306c that may be interconnected with each other through a mesh network that is wired, wireless, or a combination of both. The vEEC network in FIG. 3A is self-contained. The vEEC architecture has one of the ECNs (ECN A) operating as a Master/Server 308 and the other ECNs (ECN B, ECN C) as agents 310. This system is compatible with other orchestrators such as K8/K3s where K8/K3 operates as a container within the K8/K3 system or operates outside of the K8/K3 system.

The ECN 306a with the vEEC master 308 serves as the primary network orchestrator. In case of connectivity loss, another ECN 306b, 306c takes over as the vEEC master, a process determined by an algorithm considering the ECN's resources, connectivity status, and other factors. Should the original vEEC master ECN rejoin the network, the current master retains its role until the rejoined master demonstrates stability for a pre-determined period of time and is the best ECN in the group to perform the vEEC master role.

Figure 3B:
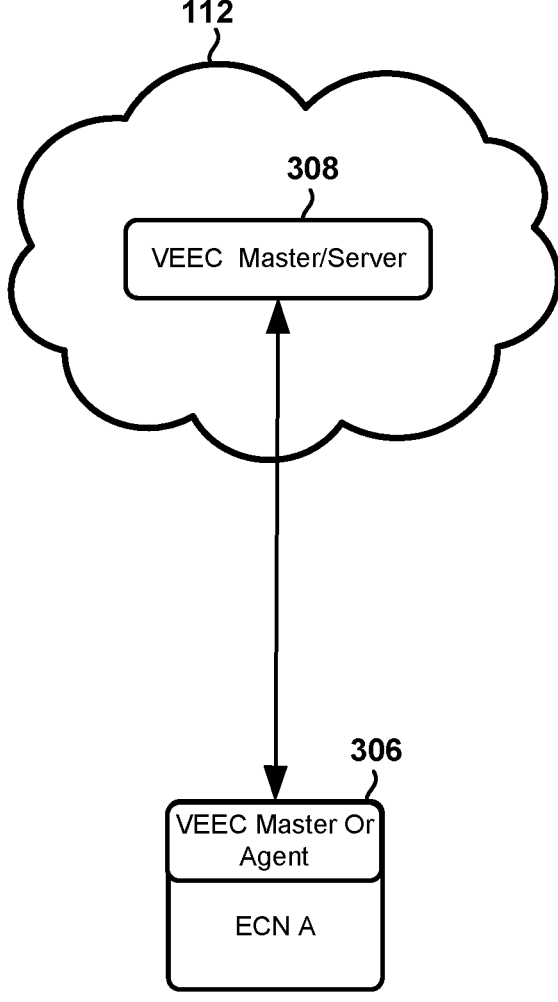

FIG. 3B illustrates another variant of the vEEC architecture that includes a cloud 112 environment in which the primary vEEC master 308 resides in the cloud 112. The ECN 306 may be a vEEC agent or a vEEC master/server with no other ECNs connected to it.

Figure 3C:
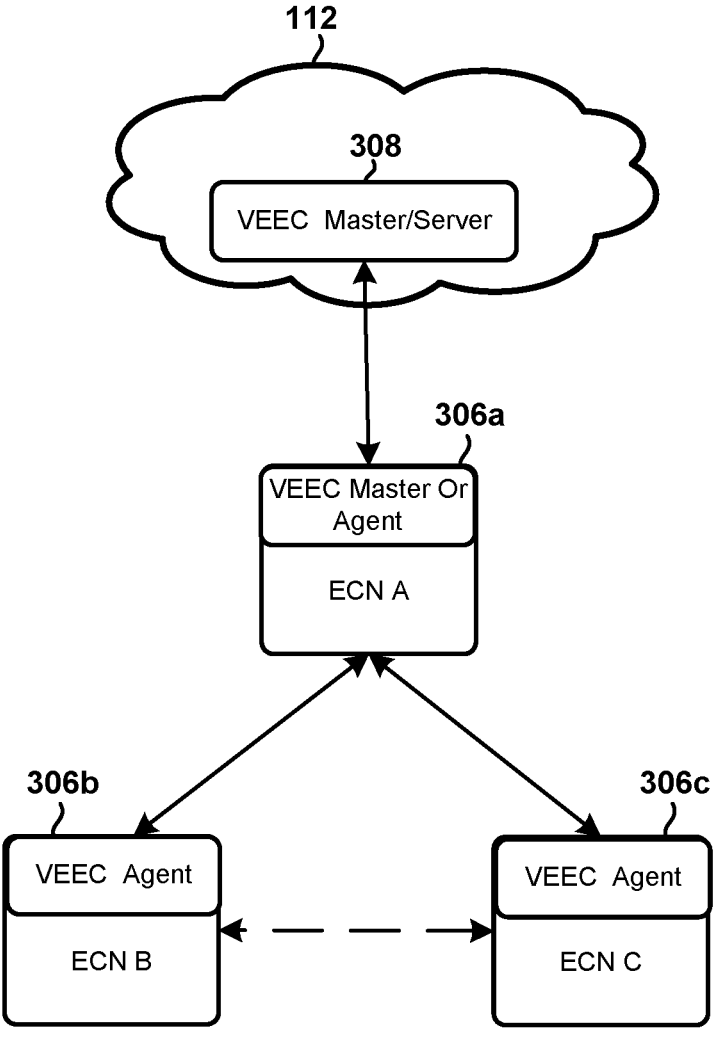

FIG. 3C illustrates a network configuration in which multiple edge computing nodes (ECNs), specifically ECNs 306b and 306c, are interconnected through an ECN 306a, which operates as the master in the vEEC system. The master ECN 306a may connect with a variable number of ECNs, contingent upon its capabilities and the resources it can offer. The resources provided by the master ECN 306a may include Wide Area Network (WAN) connectivity, as well as policy routing for both ingress and egress traffic. In addition, the master ECN 306a may facilitate policy routing among the ECNs 306 and may have access to local images and applications, which other ECNs 306 may utilize through the vEEC agent. The connectivity between the ECNs 306 and the master vEEC ECN 306a may be established via wired, wireless, or a combination of these methods. The ECNs 306b, 306c serving as vEEC agents may also communicate amongst themselves in a wired or wireless mesh network. Additionally, the ECN with the master vEEC can connect to the master vEEC cloud through either wired or wireless means. The vEEC cloud 112 may be equipped with extra computational resources to aid in delivering, offloading, or processing various applications running on the ECNs 306. Moreover, the depicted ECNs 306 may have edge devices or user end devices connected to them, enhancing their functional capabilities.

Figure 3D:
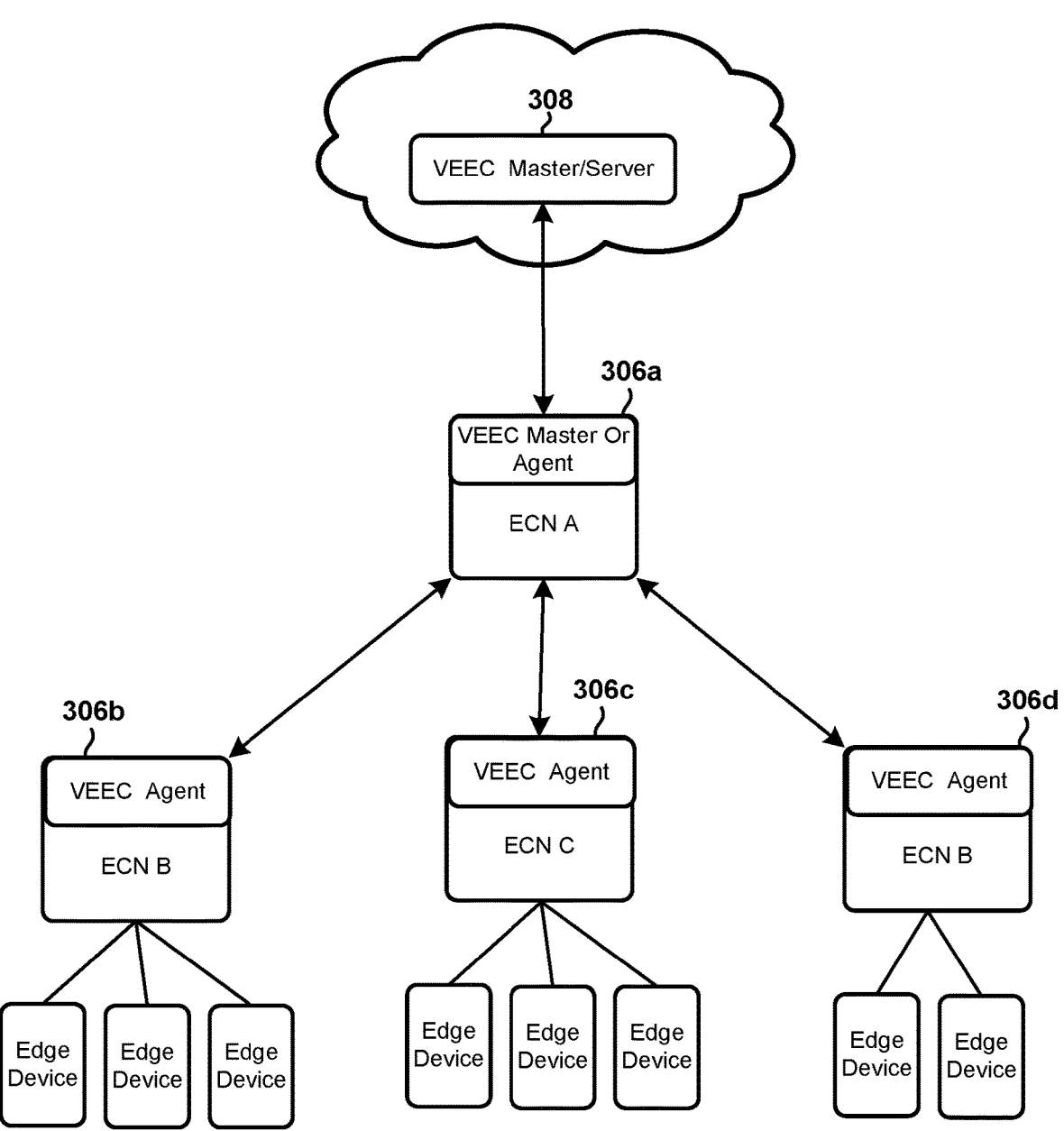

FIG. 3D illustrates a more distributed architecture vEEC architecture in which ECNs 306b, 306c and 306d each have one or more edge devices connected to them. This configuration exemplifies a distributed approach in the vEEC system. In the examples illustrated in FIG. 3D the ECNs 306 form a star network configuration in which each ECN 306b, 306c, 306d operating as a vEEC agent is connected directly to the vEEC master 306a. However other network topology configurations with ECNs in FIG. 3D are possible. The vEEC agents in FIG. 3D may operate as standalone nodes without direct connectivity to other ECN nodes, except for the master ECN 306a, which serves as the vEEC master. The vEEC master 306a may facilitate communication between ECN nodes 306b, 306c, 306d based on various factors such as policy, application, resiliency scheme, or other considerations. In addition, each ECN 306b, 306c, 306d operating as a vEEC agent may also be connected to a WAN or a cloud environment featuring a vEEC master 308 for orchestration.

Figure 3E:
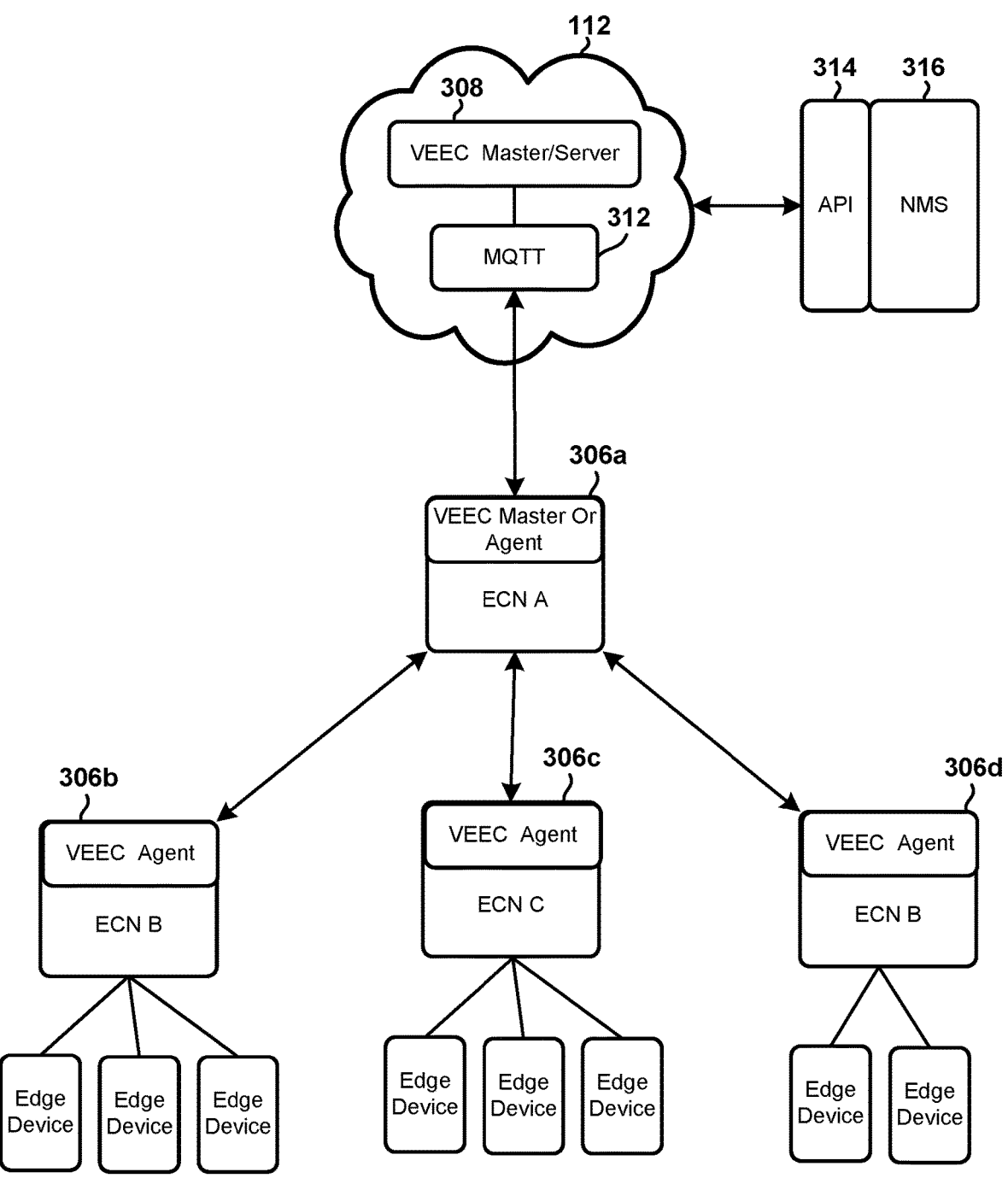
Figure 3F:
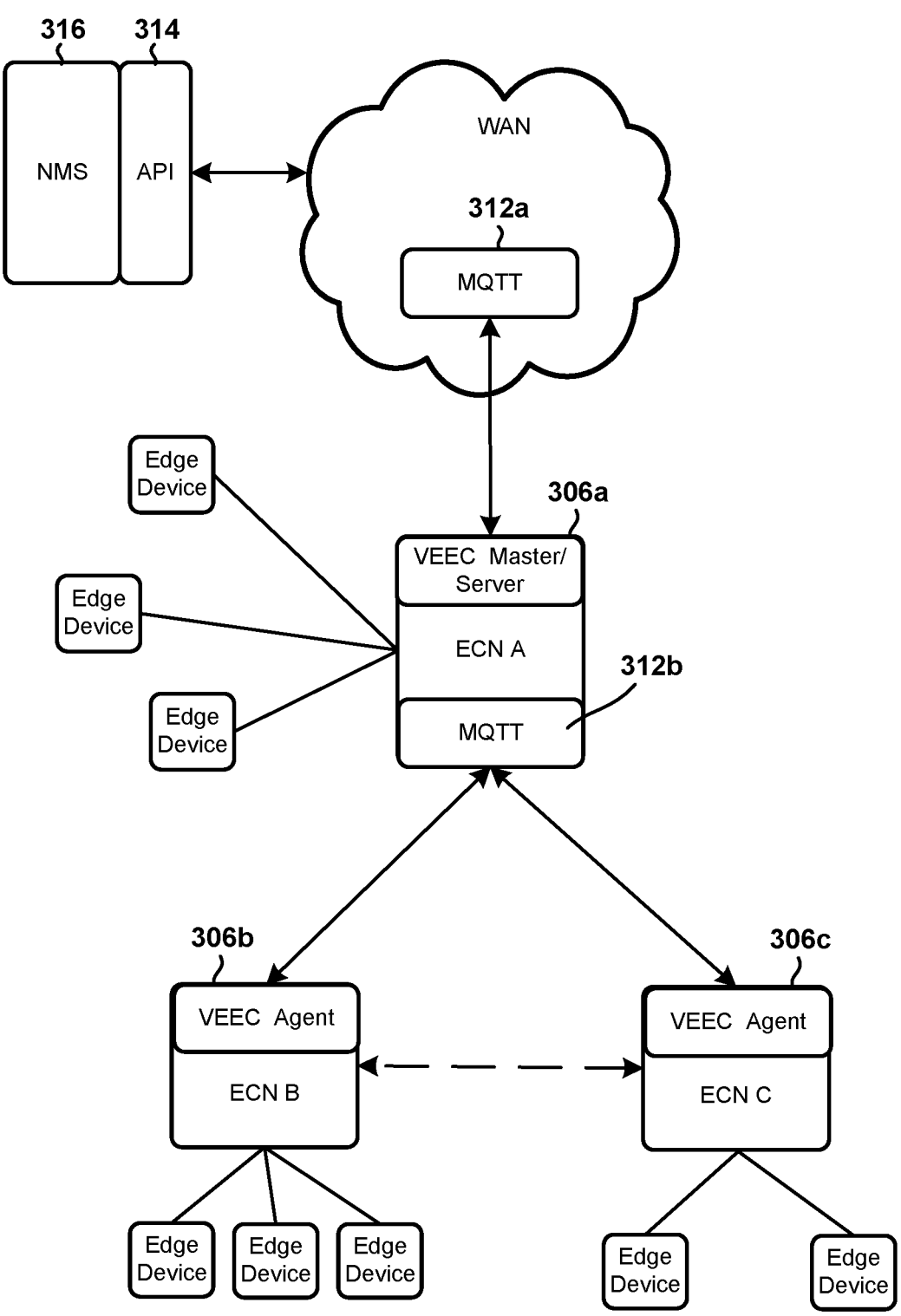
Figure 3G:
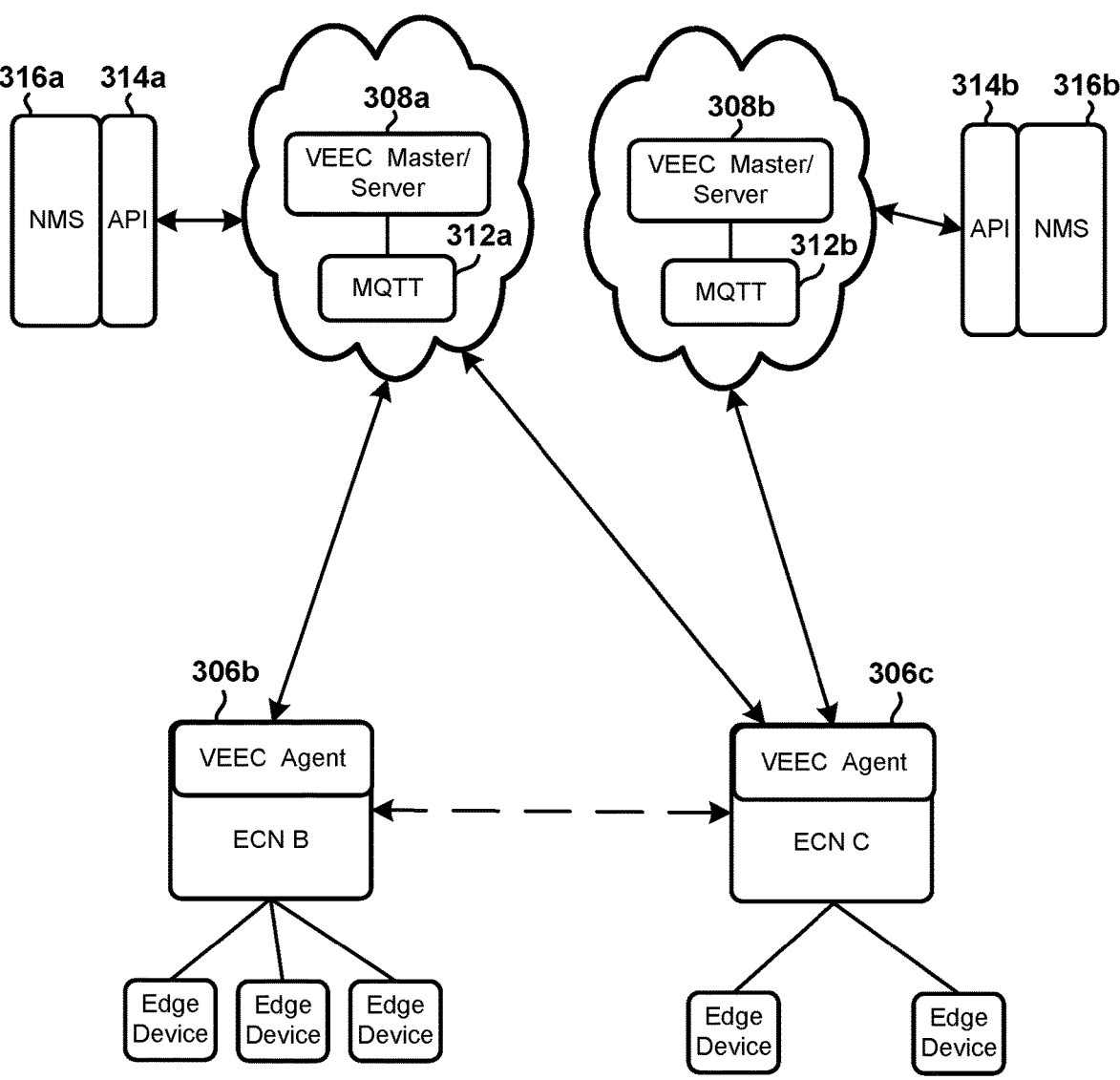

FIGS. 3E, 3F, and 3G collectively illustrate a range of possible configurations within the vEEC system. In the examples illustrated in FIGS. 3E, 3F, and 3G, the system includes an vEEC Message Queuing Telemetry Transport (MQTT) server 312, an application programing interface (API) 314, and network management system (NMS) 316. The ECNs 306 illustrated in FIGS. 3E, 3F and 3G may be interconnected, forming a mesh network. The mesh network may be wired, wireless, or a hybrid of both. Edge devices may connect to the ECNs 306 using either wired or wireless methods and may each communicate with one or more ECNs 306. In addition, these edge devices themselves may be interconnected, either through wired or wireless connections, forming another layer of mesh network or a sub-network. This may add another dimension of connectivity and flexibility to the overall architecture.

FIG. 3E illustrates a specific adaptation of the vEEC architecture that may be configured to integrate with the vEEC MQTT. MQTT is a protocol optimized for efficient, lightweight machine-to-machine (M2M) communication using a publish-subscribe model. In this example, vEEC agents communicate with a vEEC master/server through the MQTT server 312, enabling a scalable, flat network architecture for edge computing. Although this example uses a single MQTT server 312 connected to a vEEC master 308 within a cloud environment, it should be understood that the MQTT server 312 may be integrated with or located separately from the vEEC master/server 308.

FIG. 3F extends the publish-subscribe method for edge computing introduced in FIG. 3E. In the example illustrated in FIG. 3F, vEEC master/server 306a leverages an MQTT server 312b specifically for the publish and subscribe mechanism with the ECNs operating as vEEC agents 306a, 306c within the local edge network. The publish/subscribe scheme illustrated in FIG. 3F may facilitate refined scalability that enables the seamless addition and removal of ECNs 306 from the network. This flexibility may be an important and valuable attribute of the vEEC system that enhances its adaptability and efficiency in managing network configurations.

FIG. 3G illustrates an example in which an ECN 306c operating as a vEEC agent is capable of communicating with multiple vEEC masters 308a, 308b through a publish and subscribe scheme in the network topology. This configuration may allow a vEEC agent to subscribe to and publish with various vEECs, utilizing their wide-area network (WAN) connectivity, applications, computational resources, and other ECNs 306b connected to a different vEEC master 308a in a different cluster. While the vEEC master is depicted within a cloud environment in FIG. 3G, it should be understood that a vEEC master could also be situated locally or non-locally to the vEEC agent. This flexibility in the placement of the vEEC masters 308a, 308b may enhance the adaptability of the network. FIG. 3G also illustrates the ECN utilizing different ECNs that are in different groups or in diverse locations through a distributed scheme of resource sharing.

Figure 4:
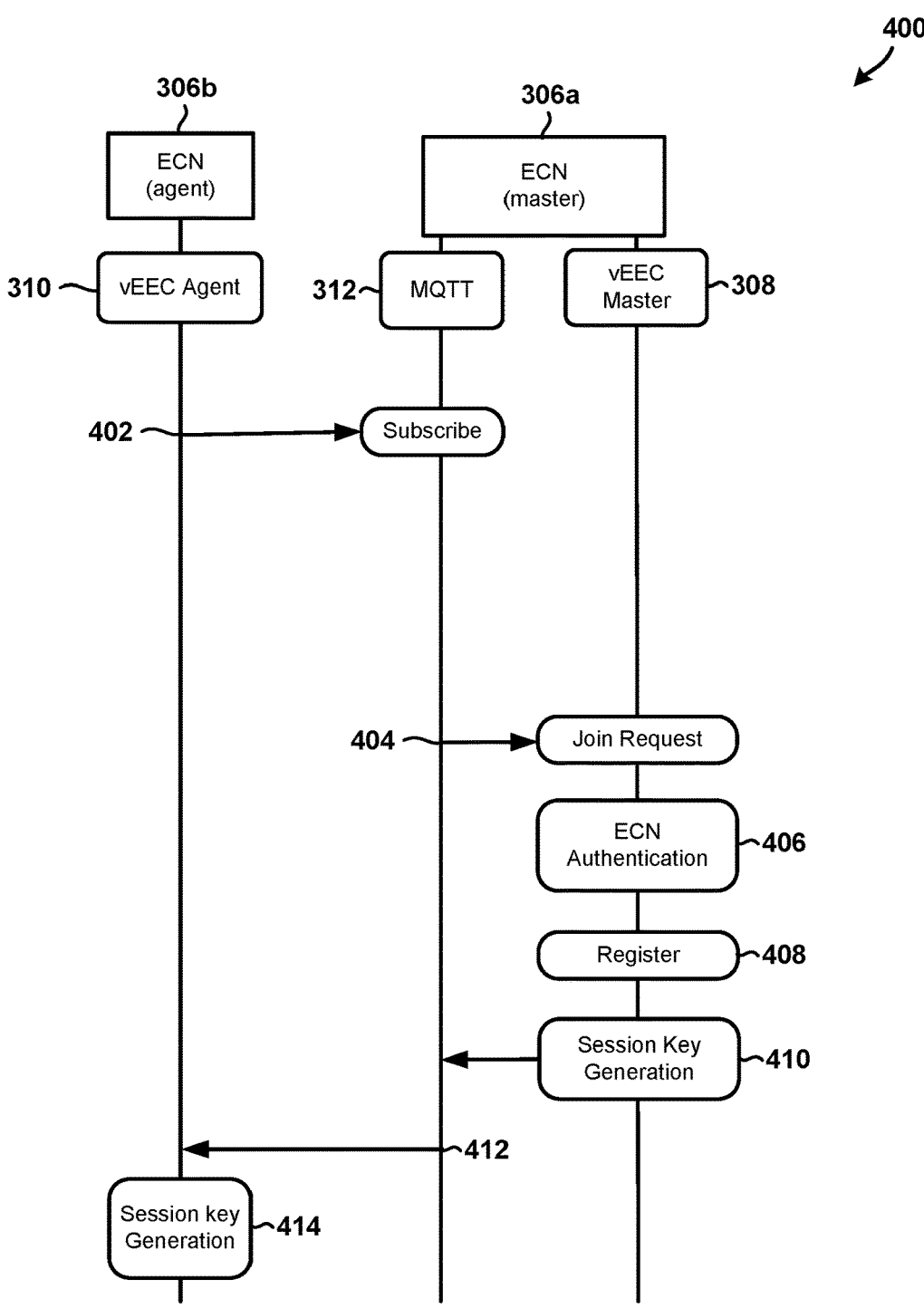
FIG. 4 is a process flow diagram illustrating a method for registering an ECN operating as a vEEC agent with an ECN operating as a vEEC master 308 in accordance with some embodiments.

FIG. 4 illustrates a high-level method 400 for registering an ECN 306b operating as a vEEC agent 310 with an ECN 306a operating as a vEEC master 308. In FIG. 4 the MQTT server 312 is hosted on the ECN 306a operating as a vEEC master 308. The method 400 allows for the establishment of communication between the vEEC agent 310 and the vEEC master 308, with the list of ECNs authorized to communicate with the vEEC master 308 being managed potentially through multiple methods, including a NMS 316.

In operation 402, the vEEC agent 310 may initiate the process by sending a subscription message to the MQTT server 312 to signify the agent's request to join the network managed by the vEEC master. In operation 404, the MQTT server 312 may receive the subscription message and send a join request to the vEEC master 308 to initiate the authentication and registration process. In operation 406, the vEEC master 308 may perform ECN authentication operations, which may help ensure that only authorized and valid ECNs are allowed to join the network. In operation 408, the vEEC master 308 may register the ECN so that the ECN may be recognized as a part of the vEEC network and access network resources. In operation 410, the vEEC master 308 may generate a session key for establishing a secure communication session between the vEEC master and the agent. In operation 412, the MQTT server 312 may send a response message to the vEEC agent 310. This message may indicate the status of the registration process and the successful generation of the session key. In operation 414, the vEEC agent 310 may generate its own session key. This key may be used in tandem with the master's key for secure communication within the network.

FIG. 5 illustrates another high level method 500 for registering an ECN 306b operating as a vEEC agent 310 with an ECN 306a operating as a vEEC master 308. In the example illustrated in FIG. 5, the operations of method 500 are performed by an ECN 306b operating as a vEEC agent 310, a MQTT 312 server, an ECN 306a operating as a vEEC master 308, and an ECN joiner 502.

The example illustrated FIG. 5 differs from the example illustrated in FIG. 4 in several key aspects. For example, the MQTT server 312 is not integrated into the ECN, as was the case in FIG. 4. Instead, the MQTT server 312 exists as a separate entity or instance. This separation allows for a more flexible and scalable approach, as the MQTT server may be independently managed and scaled without being constrained by the limitations of any single ECN. In addition, the system illustrated in FIG. 5 includes an ECN joiner 502 component. The ECN joiner 502 component may function as a database that maintains a list of ECNs authorized to subscribe to a particular vEEC master. This database is important for managing and controlling which ECNs can join the network and communicate with the vEEC master. In some embodiments, the ECN joiner 502 component may be implemented as a container service, offering flexibility and ease of deployment. In some embodiments, the MQTT server 312 may also be run as a service.

In operation 510, the vEEC master 308 may initiate the process by sending a subscription message to the MQTT server 312 to signify the master's request to join and manage the network. In operation 512, the MQTT server 312 may receive the subscription message and send a join request to the ECN joiner 502 component to initiate the authentication and registration process. In operation 514, the ECN joiner 502 may perform ECN authentication operations, which help ensure that only authorized and valid ECNs are allowed to join the network. In operation 516, the ECN joiner 502 may register the ECN so that the ECN may be recognized as a part of the vEEC network and access network resources. In operation 518, the ECN joiner 502 may generate a session key for establishing a secure communication session between the vEEC master and the agent.

In operation 520, the vEEC Master 306*a* may generate its own session key. This key may be used in tandem with the other keys for secure communication within the network.

In operation 522 the master ECN 306*a* requests a list of registered ECNs hosted by the ECN Joiner 502. The MQTT server 312 upon getting the connection request may send a request message in operation 524 to the ECN Joiner 502.

In operation 526, the ECN joiner 502 may receive a request for the current list of ECNs registered (ID and attributes). In operation 528, the ECN joiner 502 may send a message to the MQTT server 312. In operation 530, the MQTT server 312 may send a message to the vEEC master 308.

In operation 532, the vEEC agent 310 send a subscribe request to the MQTT server 312. In operation 533 the MQTT server 312 sends a join request to ECN Joiner 502. In operation 534, the ECN joiner 502 may receive a join request to initiate the authentication and registration process. In operation 536, the ECN joiner 502 may perform ECN authentication operations, which help ensure that only authorized and valid ECNs are allowed to join the network. In operation 538, the ECN joiner 502 may register the ECN so that the ECN may be recognized as a part of the vEEC network and access network resources. In operation 540, the ECN joiner 502 may generate a session key for establishing a secure communication session between the vEEC master and the agent. In operation 542, the MQTT server 312 may send a session key generation message to the vEEC agent 310. In operation 544, the ECN joiner 502 may generate and send an ECN registered update message to the MQTT server 312. In operation 546, the MQTT server 312 may send an ECN registered update message to the vEEC master 308.

The approach illustrated in FIG. 5 offers a significant benefit in terms of network flexibility and reach. It may enable an edge computing node (ECN), regardless of whether it functions as a vEEC agent or master, to engage in a subscribe-and-publish interaction with other ECNs that are not part of its immediate local network. This capability may significantly extend the network's reach and enhance its connectivity, allowing for interactions with a more extensive and diverse network.

The subscribe-and-publish process discussed above goes beyond mere basic communication. It encompasses a variety of more complex and critical functions such as routing, policy enforcement, authentication, and other control functions. These additional capabilities are important for ensuring effective and secure communication among ECNs. By integrating these functions, the system not only facilitates the exchange of information but also ensures that this exchange is conducted securely and in accordance with established policies and protocols. This expanded functionality and enhanced security protocol may contribute to creating a more robust and flexible edge computing environment. In turn, this environment may improve the overall functionality and efficiency of the network. The flexibility to communicate with a broader range of ECNs may allow for a more dynamic response to changing network demands and conditions. It may also allow for more adaptable edge computing solutions because ECNs may dynamically adjust to different operational requirements and interact with a wider variety of network nodes and resources.

Some embodiments may include vEEC orchestrator components configured to manage ECNs within an integrated system that includes computing, cloud services, storage, networking, and security. The orchestrator may be configured to dynamically scale resources based on specific requirements such as capacity, bandwidth, latency, geographic distribution, and the number of instances. The vEEC orchestrator operations may cover a wide range of activities, including resource procurement, installation, configuration, management, and continuous monitoring, ensuring optimal resource allocation and utilization in response to changing demands.

In some embodiments, networks utilizing the vEEC system may allow the ECNs to use both wired and wireless connections. These connections serve dual purposes: facilitating backhaul communications for data transfer to central points from remote elements and supporting communication between various ECNs and edge devices. This dual connectivity approach may improve the network's versatility and reliability and allow for robust communication links for both core data transmission and peripheral interactions.

In some embodiments, the vEEC orchestrator may be configured to address congestion challenges in ECNs, which often arise from high demand and limited resources. Traditional edge computing methods struggle with adjusting computing resources or wireless capacity at the edge in real-time. The vEEC orchestrator allows for resource redistribution among ECNs in a heterogeneous environment, balancing loads across multiple nodes to mitigate individual node constraints.

In some embodiments, the vEEC orchestrator may be configured to assist ECNs in managing resource-related congestion by enabling failover to cloud resources. When an ECN faces resource limitations, tasks are transferred to a cloud computing environment with more abundant resources. This process helps alleviate resource constraints of individual nodes by redistributing consumption across a network of ECNs.

In some embodiments, the vEEC orchestrator may be configured to enhance the application capabilities of edge devices constrained by limited resources. This is achieved by implementing a compute distribution scheme that allows the ECNs to surpass their inherent limitations and improve the diversity and quality of applications and user experiences.

In some embodiments, the vEEC orchestrator may be configured to offload computational tasks from edge devices to more powerful servers located elsewhere. This may enhance edge device capabilities by leveraging the resources of these more powerful servers, thus transferring computation to locations with greater resources.

In some embodiments, the vEEC orchestrator may be configured to standardize configurations within clusters or points of distribution (PODs), simplifying the process of subscriber management and leveraging coverage from other ECNs for improved service delivery. These ECNs may connect through various network types, such as mesh or WAN, allowing users to access services such as Wi-Fi beyond the network's immediate area.

In some embodiments, the vEEC orchestrator may be configured to create a cohesive environment for workloads and resources. This unified environment may allow for easy movement of resources as needed for failover or performance optimization and/or may otherwise address the complexities of edge computing network environments.

In some embodiments, the vEEC orchestrator may be configured to unify diverse networks and devices to avoid vendor lock-in. Vendor lock-in may occur when a customer becomes overly dependent on a single supplier for products or services, unable to easily switch to another vendor without substantial costs or inconvenience. The vEEC orchestrator may be configured to prevent such dependency by supporting compatibility with a wide range of networks and devices from different vendors. This flexibility may allow for easier integration and swapping of components.

In some embodiments, the vEEC orchestrator may be configured to use a hybrid orchestration scheme to manage and coordinate different types of network infrastructures and services. This hybrid orchestration scheme may integrate public and private cloud resources along with on-premises deployments. Public clouds may include services offered by third-party providers over the Internet, private clouds may include infrastructure operated solely for a single organization, and on-premises deployments may include computing resources located within the physical confines of an organization.

In some embodiments, the vEEC orchestrator may be configured to use a hybrid orchestration scheme that maintains consistent security across the network. That is, one of the challenges in managing such a diverse set of resources and infrastructures is maintaining a uniform level of security. The vEEC orchestrator may help ensure that security measures are consistent across all elements of the network, regardless of whether they are part of public clouds, private clouds, or on-premises systems. This may be particularly beneficial in disparate systems that have varying levels of security and vulnerabilities.

In some embodiments, the vEEC orchestrator may be configured to integrate infrastructure components that are distributed geographically across different locations and platforms. The vEEC orchestrator may be configured to manage a wide variety of hardware, software, and network resources that may be spread out across different physical sites and/or across different technological platforms.

In some embodiments, the vEEC orchestrator may be an enhanced management and orchestration (MANO) component and/or configured to perform network orchestration operations. A MANO component may be an important part of network management software (NMS), specializing in tasks that are essential for managing both the network and its computing resources. Currently, various MANO platforms, both proprietary and open source, are available in the market. Notably, MANO conforms to the European Telecommunications Standards Institute (ETSI) standards, specifically referred to as ETSI NFV MANO. This standard plays an important role in the 3GPP standard architecture, enabling edge applications and facilitating the interaction between 5G and Mobile Edge Computing (MEC).

In some embodiments, the vEEC orchestrator may be configured to incorporate a range of capabilities for automating end-to-end (E2E) services across the network. The vEEC orchestrator may be configured to integrate various functions and processes within the network that streamline and optimize network operations.

In some embodiments, the vEEC orchestrator may be configured to manage and control multi-domain network infrastructure. This may include the management and control of various network components, as well as the delivery of autonomic service assurance and dynamic service delivery. Some embodiments may implement an effective MANO architecture that includes a proactive dashboard for monitoring and managing network operations.

In some embodiments, the vEEC orchestrator may be configured to implement a new approach to network management and orchestration that diverges from traditional monolithic models. Given the complexities and dynamic nature of edge computing, it is important to rethink the orchestration process within networks. The vEEC orchestrator may be configured to implement a more flexible and dynamic approach that uses intelligent orchestration to effectively adapt to changing network demands and technologies.

In some embodiments, the vEEC orchestrator may be configured to use network as a service (NaaS) technologies and techniques or allow for the deployment and configuration of applications across geographically distributed edge devices. The applications in this setup may be delivered based on consumption, either as services hosted in public clouds, private data centers, or as local instantiations. This approach allows for flexibility in how applications are deployed and managed across different locations.

In some embodiments, the vEEC orchestrator may be configured to fully leverage the advantages of a distributed edge environment. This may include managing a large number of sites, edge devices, and enterprise-specific applications concurrently. It may also include providing visibility into the status and connectivity of devices, assigning network assets, deploying and configuring applications, and enforcing Quality of Service (QOS) and policies. The orchestrator may also be configured to dynamically adjust to changing network conditions, ensure failover and recovery resiliency, manage network and security configurations of edge devices, and support various network types such 4G/5G/6G/Wi-Fi. In addition, the vEEC orchestrator may be configured to optimize traffic delivery and support bring your own (BYO) certified applications and network hardware.

In some embodiments, the vEEC orchestrator may be configured to create a unified environment where workloads and resources may be ported and replicated as necessary for failover or performance optimization. The vEEC orchestrator may be configured to simplify the management and operation of network deployments, ensuring efficiency and adaptability in various examples.

In some embodiments, the vEEC orchestrator may be configured to use both intent-based and predictive orchestration schemes. These schemes may be important in simplifying network deployments and operations, making them more accessible. The vEEC orchestrator may be configured to perform intent-based orchestration that allows for a zero-touch approach in which network resources needed to support applications are automatically implemented without the need for complex workflows or extensive manual intervention.

In some embodiments, the vEEC orchestrator may be configured to implement several key attributes and functionalities. The vEEC orchestrator may perform predictive and intent-based orchestration using AI/ML, offer cluster classes, and manage a large number of sites, edge devices, and enterprise-specific applications. The vEEC orchestrator may perform life cycle management for containers and applications, deployment and configuration of applications/containers, QoS and policy enforcement, bandwidth control, container/application interfaces, resiliency, and network slicing. The vEEC orchestrator may facilitate the dynamic adjustment to changing network conditions, provide interfaces/abstractions, ensure failover and recovery resiliency, and optimize data/services in terms of capacity, latency, and delivery. The vEEC orchestrator may support adaptive monitoring for device status and connectivity, manage network and security configurations, optimize traffic delivery, and support BYO-certified applications and network hardware.

Figure 6:
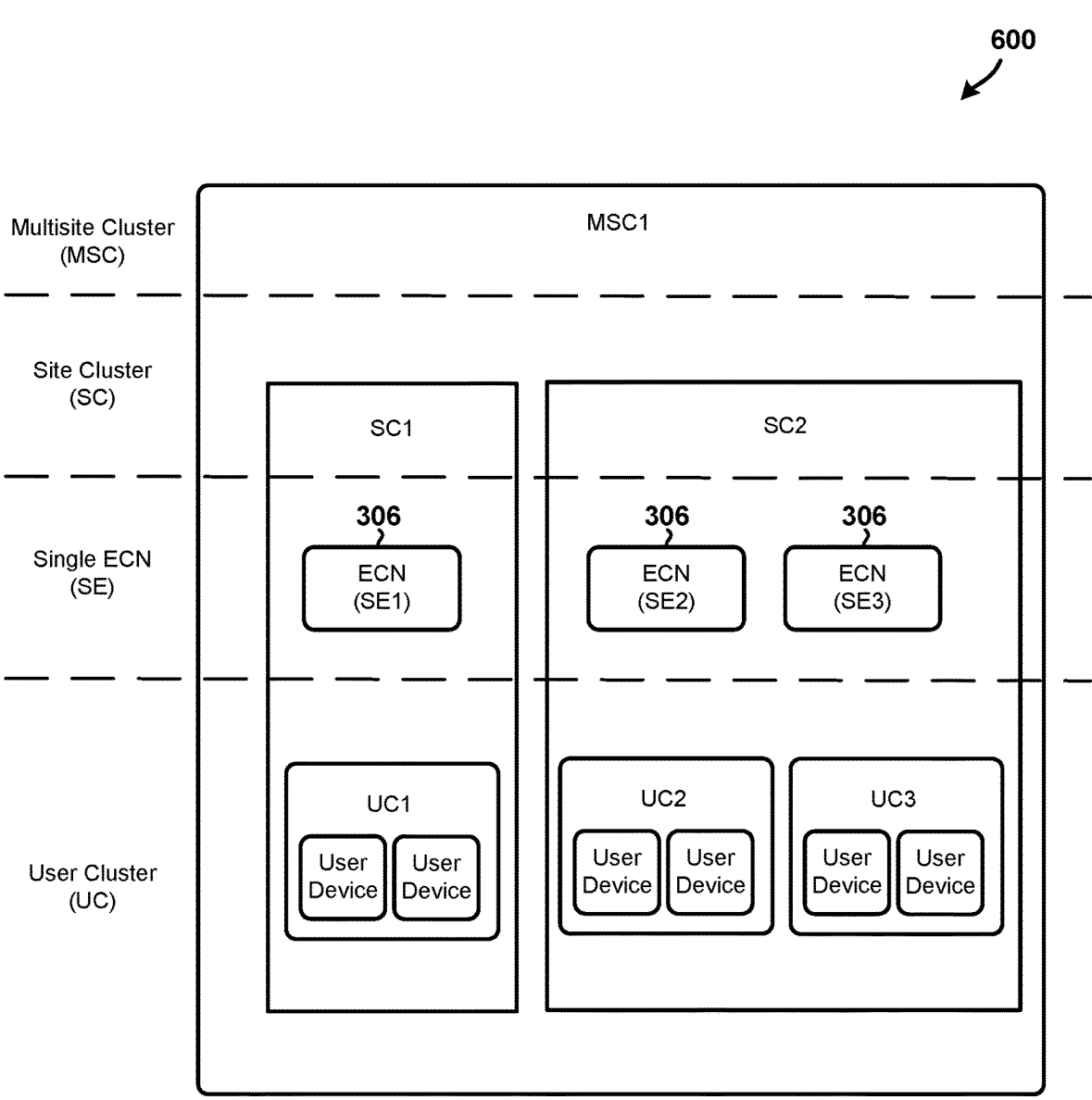
FIG. 6 is a component block diagram illustrating an example vEEC orchestration system that organizes the ECNs and/or other computing resources into a structure of cluster classes or types configured to facilitate network management and deployment in accordance with some embodiments.

FIG. 6 illustrates a vEEC orchestration system 600 that organizes the ECNs 306 and/or other computing resources into a structure of cluster classes or types configured to facilitate network management and deployment. The vEEC orchestration system 600 may include one or more of a user cluster (UC), single ECN (SE), site cluster (SC), and multisite cluster (MSC). The cluster classes are organized in a tiered, layered fashion, which may contribute to achieving both flexibility and simplicity in managing and deploying the network.

A user cluster (UC) may include multiple edge or user devices associated with a single user. This cluster has the option of using a single Pre-Shared Key (PSK) shared among all devices or having distinct PSKs for each device. This configuration may allow for tailored security measures based on user requirements.

A single ECN (SE) may be the primary device in which applications and containers are deployed and executed. Each ECN may be a discrete unit in the orchestration process that is responsible for running specific applications or containers.

A site cluster (SC) may include one or more hosts that run applications or containers. An SC may include several interconnected ECNs or those located within a common geographic area. In this setup, the applications or containers running in an SC may be independent of those defined in a SE. This may in turn indicate a broader scope of application management within the SC.

A multi-site cluster (MSC) may include several SCs managed by a single organization. An MSC may encompass thousands of ECNs and SCs. Similar to SC, the applications or containers in an MSC may be managed at this level and are not confined to definitions within an SC or SE. This may in turn indicate a higher level of organizational control and distribution.

The vEEC orchestration system 600 may be configured to perform application/container distribution (ACD) methods for the distribution of applications or containers. The vEEC orchestrator may distribute applications or containers to a UC, SE, SC, or MSC. The ACD methods may be used to manage how applications and containers are deployed across various clusters. For example, these methods may be used to ensure efficient and effective distribution of the applications and containers that is aligned with the specific needs and structure of the network.

Figure 7:
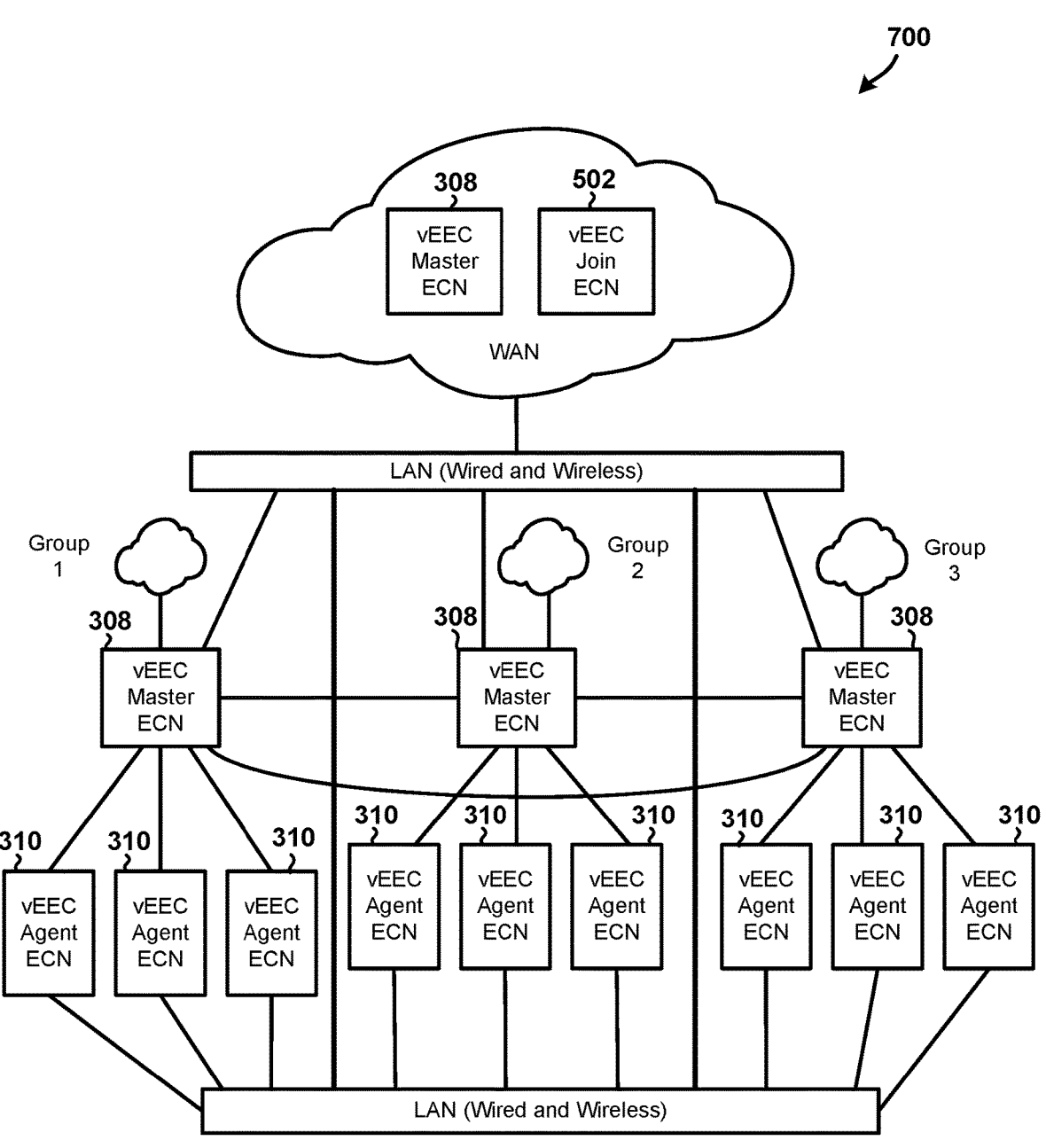
FIG. 7 is a component block diagram illustrating a network of ECNs organized into groups to form a sophisticated network structure in which ECN groups (Groups 1, 2 and 3) are managed by a master ECN, with flexible interconnections and gateway arrangements in accordance with some embodiments.

FIG. 7 illustrates a network 700 of ECNs organized into groups to form a sophisticated network structure in which ECN groups (Groups 1, 2 and 3) are managed by a master ECN, with flexible interconnections and gateway arrangements. This configuration may allow for efficient management, resilient connectivity, and adaptable network topology within the vEEC orchestration system.

In FIG. 7 there may be a designated vEEC master ECN 308 in each ECN group (Groups 1, 2 and 3) that operates as a gateway and/or plays an important role in managing or coordinating the activities of other ECNs (vEEC agent ECNs 310) within its group. The master ECN 308 may be a standalone unit that operates independently and/or may be set up in a redundant configuration for increased reliability. This redundancy may be within its own group, through a cloud-based setup, or by clustering with other ECNs. Such a configuration may enhance the resilience and fault tolerance of the network by ensuring that there is backup functionality in case the primary master ECN encounters technical issues.

The ECNs within each ECN group (Groups 1, 2 and 3) may be interconnected through either wired or wireless connections. This flexibility in connectivity options may allow for the adaptation of the network to different environmental and infrastructural conditions and/or may allow for robust and efficient communication between the ECNs regardless of their physical setup.

Each ECN group may include or use one or more gateways. In FIG. 7, the gateways are illustrated as a single vEEC master ECN 308 for each group. However, it should be understood that the arrangement of gateways may be varied; a group may have multiple gateways, or it might utilize a gateway located in another group. This allows for a versatile and adaptable network structure in which the gateways may be strategically positioned and utilized for optimal network performance and connectivity.

Figure 8:
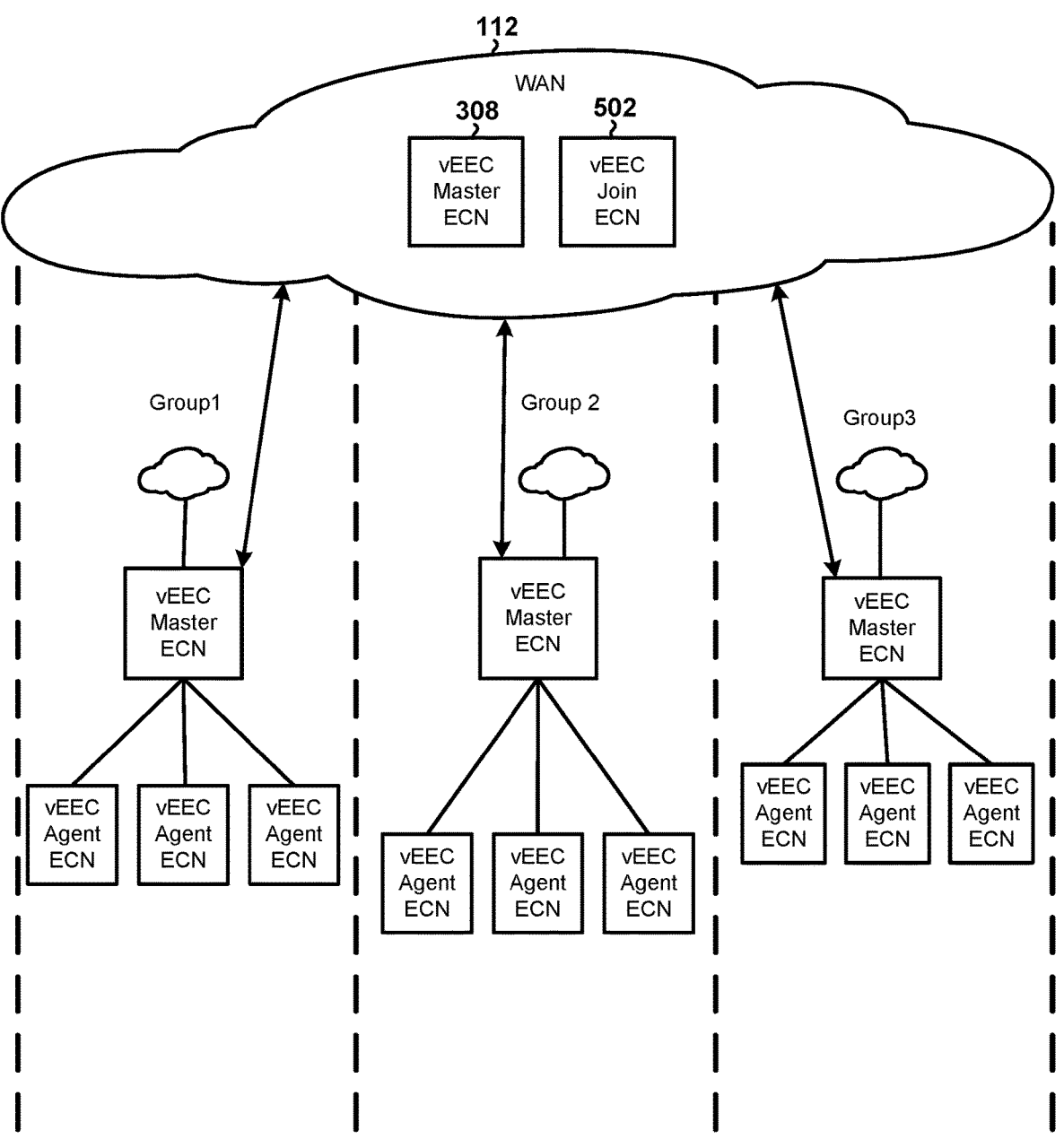
FIG. 8 is a component block diagram illustrating a network of ECNs organized into isolated groups.

FIG. 8 illustrates another network of ECNs organized into groups. In the example illustrated in FIG. 8, the ECN groups (Groups 1, 2 and 3) are isolated from each other. Each group may function independently without direct or common interconnections with other ECN groups. This configuration may be advantageous for security, data integrity, and management purposes, as it allows each group to operate within its own defined parameters without interference or dependency on other groups.

Some embodiments may include a vEEC master ECN 308 that serves as a central point or hub to facilitate communication and coordination among the otherwise isolated groups. That is, the vEEC master ECN 308 may allow for inter-group communication despite the isolation of the ECN groups (Groups 1, 2 and 3). The vEEC master ECN 308 may be located in a cloud 112 environment or another separate location. This flexibility in positioning the vEEC master ECN 308 may allow for a more scalable and adaptable network structure. A cloud-based master ECN 308 may leverage cloud computing benefits such as scalability, accessibility, and robustness, whereas a master ECN in a different physical location may cater to specific network requirements or constraints.

Figure 9:
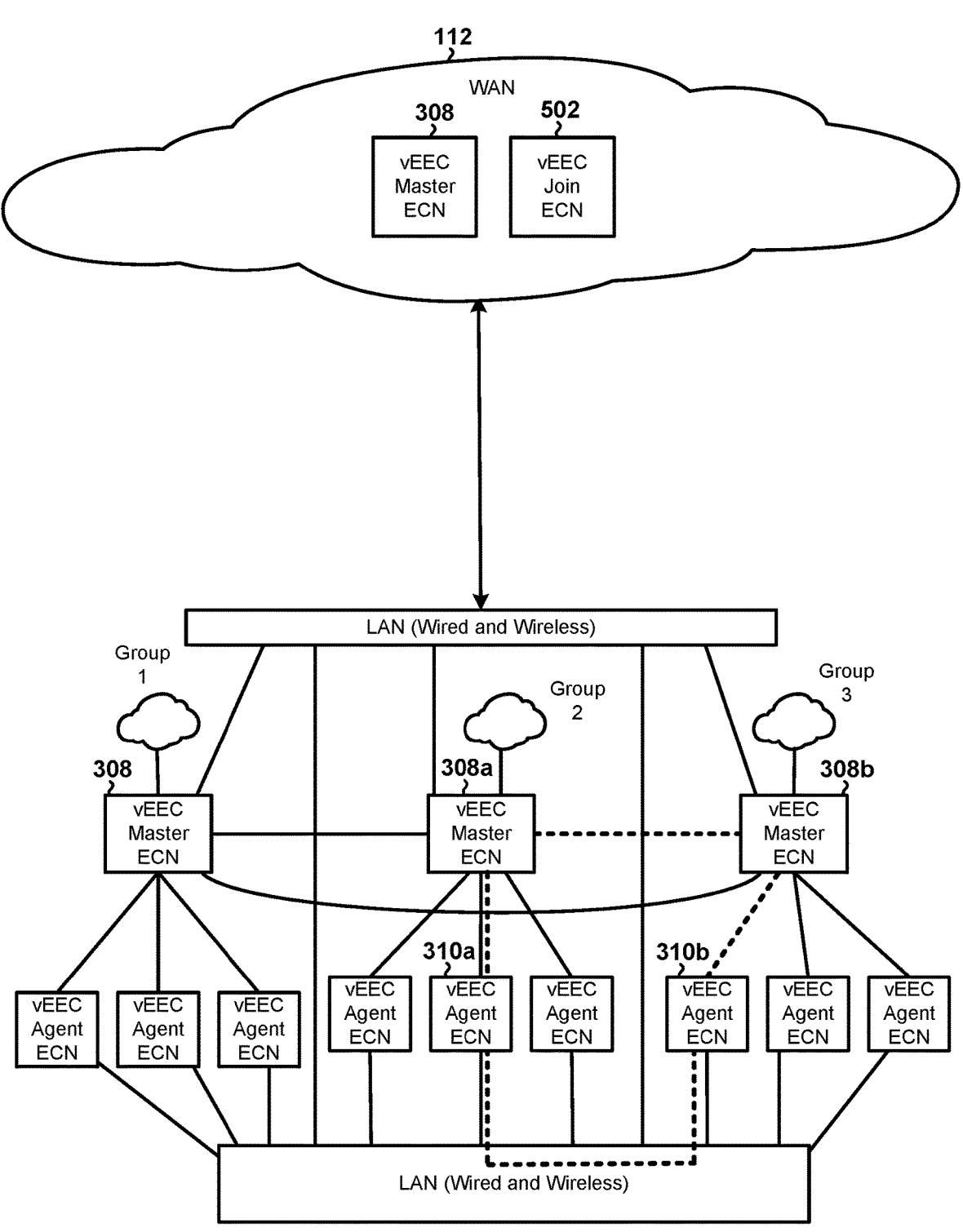
FIG. 9 is a component block diagram illustrating a network of ECNs in which resource sharing occurs between different ECN groups.

FIG. 9 illustrates a network of ECNs in which resource sharing occurs between different ECN groups (Groups 1, 2 and 3). When an ECN in one group faces resource limitations, it collaborates with an ECN in another group through their respective vEEC master ECNs. This inter-group collaboration and resource-sharing mechanism may help ensure that applications run effectively even when individual ECNs encounter resource constraints.

In particular, FIG. 9 illustrates an example in which an ECN 310a in Group 2 faces a resource shortage for a specific application. This shortage is either self-identified by the ECN 310a or detected by the vEEC master ECN 308a, which oversees resource consumption. Upon recognizing the resource deficit, the vEEC master ECN 308a of Group 2 evaluates the capabilities of the local ECNs within the same group, only to find that they cannot fulfill the resource requirements. Consequently, the vEEC master ECN 308a of Group 2 initiates communication with the vEEC master ECN 308b of Group 3 to request additional resources.

The vEEC master ECN 308b in Group 3, upon receiving this request, assesses its available resources and compliance with policy requirements. Finding that it has adequate resources, the vEEC master ECN 308b of Group 3 consents to provide resources. This leads to an exchange of messages between the vEEC master ECNs 308a, 308b of Groups 2 and 3 to coordinate resource sharing. The ECN 310a in Group 2 is directed to interface with the appropriate ECN 310b in Group 3. The resource-sharing arrangement between the two groups may be either a temporary measure or continue for the duration necessary to support the application in Group 2.

Thus, there is a resource shortage in an ECN of Group 2, the local ECNs in Group 2 are unable to provide resources, the ECN requests resources from Group 3, and the ECN in Group 3 assesses and provisions the resources.

Figure 10:
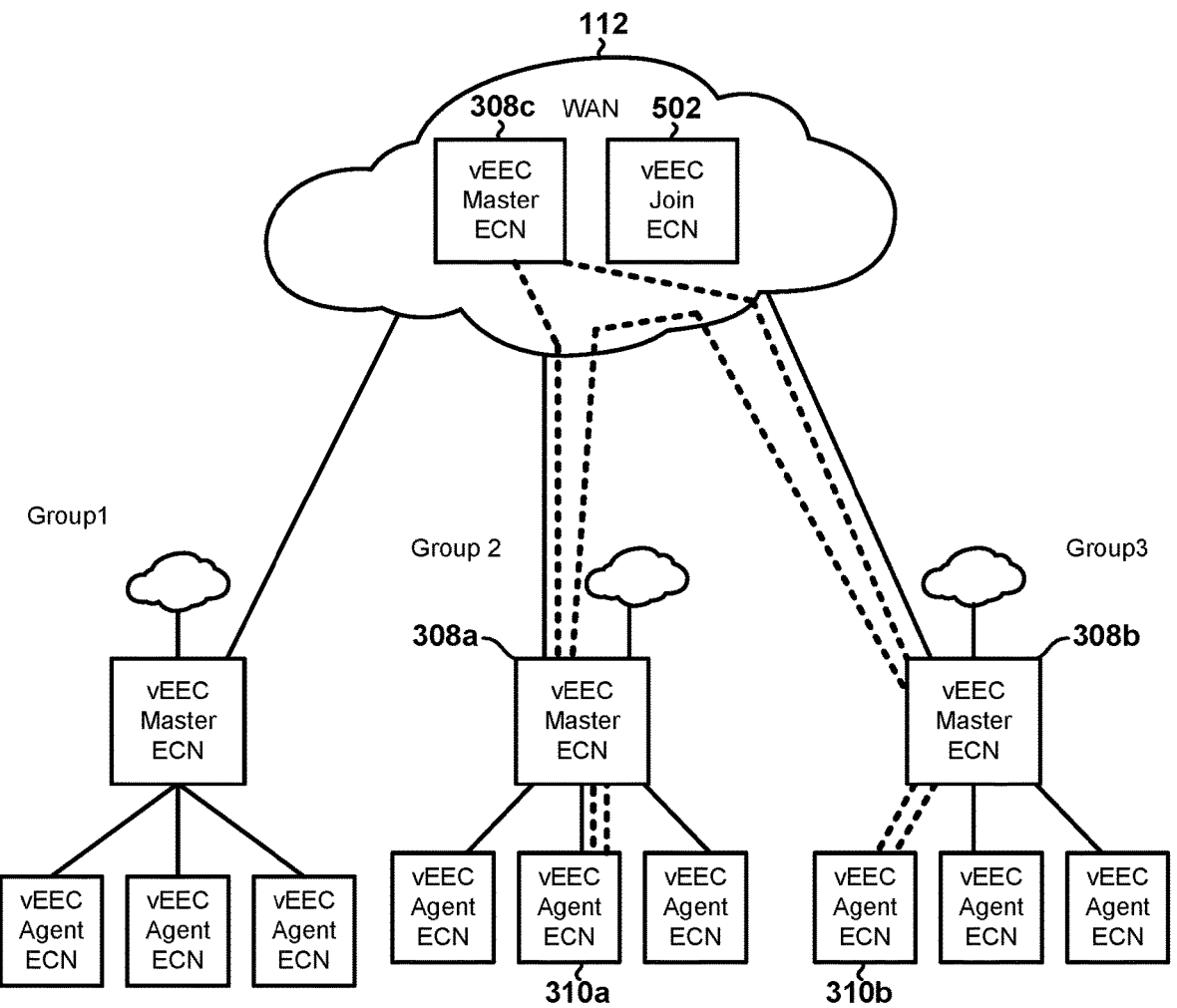
FIG. 10 is a component block diagram illustrating another network of ECNs in which resource sharing occurs between different ECN groups and using a cloud environment or Wide Area Network (WAN) to facilitate connectivity between the vEEC masters of different groups.

FIG. 10 illustrates another network of ECNs in which resource sharing occurs between different ECN groups, with the notable difference being the use of a cloud environment or Wide Area Network (WAN) to facilitate connectivity between the vEEC masters of different groups. Upon recognizing a need for additional resources, the vEEC master ECN 308a in Group 2 communicates its resource requirements to a cloud-based vEEC master ECN 308c. In response to receiving the request via the cloud vEEC master 308c, the vEEC master 308b in Group 3 evaluates its ability to provide the needed resources, confirms its capacity to meet the requirements, and informs the cloud vEEC master 308c of its readiness to assist. The cloud-based vEEC master 308c then facilitates the process, acting as an intermediary to relay routing information and policy requirements to both the vEEC masters 308a, 308b in Groups 2 and 3 to allow for efficient resource sharing between the groups.

Figure 11A:
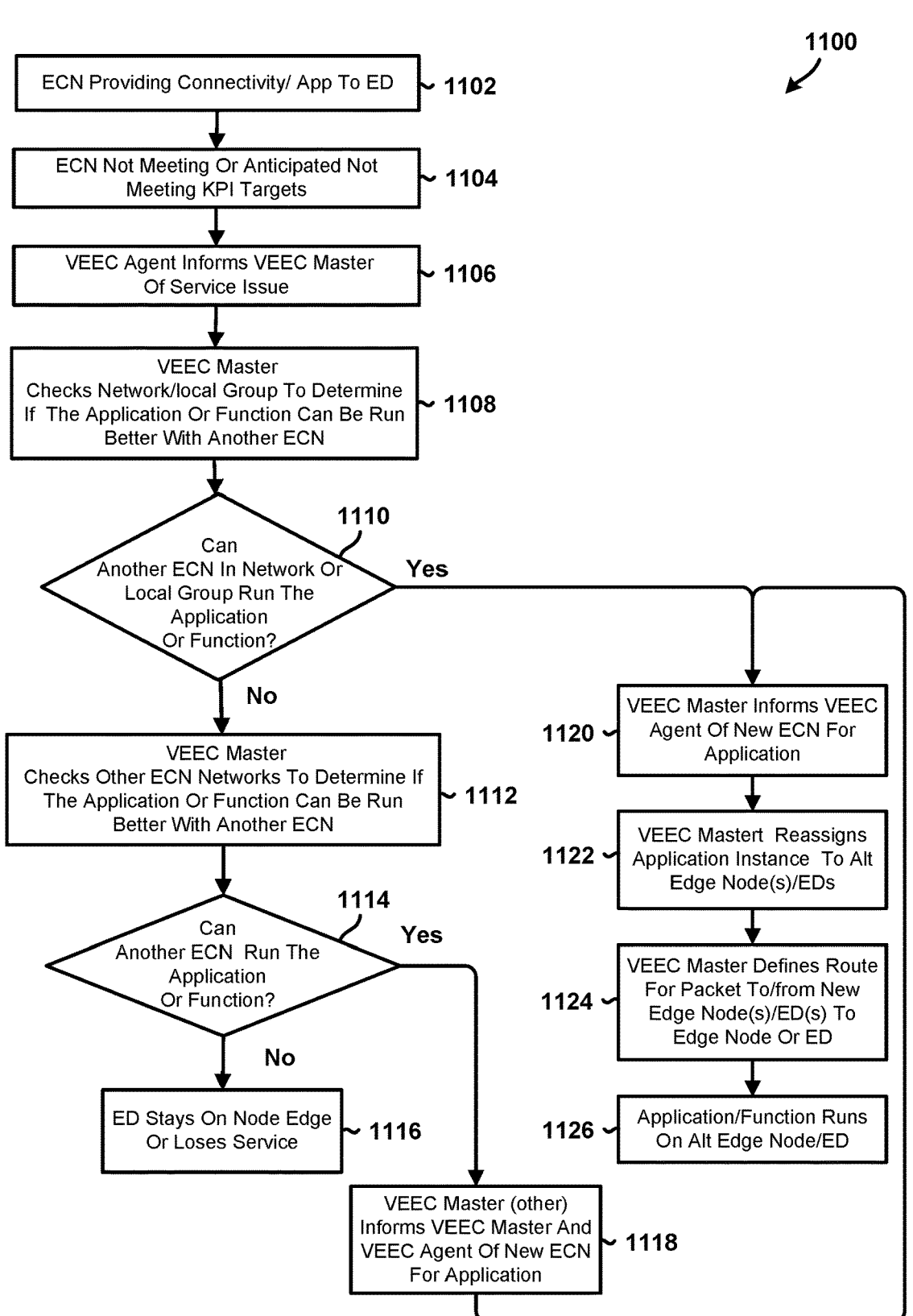
FIG. 11A is a process flow diagram illustrating a method for transferring an application from one ECN to another, emphasizing continuity and optimal performance within an ECN network.

FIG. 11A illustrates a method 1100 for transferring an application from one ECN to another, emphasizing continuity and optimal performance within an ECN network in accordance with some embodiments. In block 1102, an ECN provides connectivity and applications to edge devices (EDs). In block 1104, this ECN fails or is determined to be likely to fail in meeting key performance indicator (KPI) targets. In block 1106 the vEEC agent, detecting the service issue, informs the vEEC master.

In block 1108, the vEEC master conducts an initial assessment within the network or local group to identify if another ECN could more effectively run the application or function. In determination block 1110, the vEEC master may determine based on the initial assessment whether another ECN may run the application or function more effectively. If no suitable ECN is found within the immediate network or local group (i.e., determination block 1110="No"), the search extends to other ECN networks in block 1112. In determination block 1114, the vEEC master determines whether an external ECN is capable of running the application or function.

If a suitable alternative ECN is not found within the local group or externally (i.e., determination block 1114="No"), the edge device may continue operating on the current ECN or potentially lose the service in block 1116. In response to determining that an external ECN is capable of running the application or function (i.e., determination block 1114="Yes"), the vEEC master of that group communicates this to both the originating vEEC master and the vEEC agent in block 1118. The vEEC master may inform the vEEC agent about the new ECN designated for the application in block 1120.

If an appropriate ECN is identified, either within the local group or externally (i.e., determination block 1110="Yes" or determination block 1114="Yes"), the vEEC master may inform the vEEC agent about the new ECN designated for the application in block 1120.

If a suitable alterative ECN is found the vEEC master reassigns the application instance to an alternative Edge Node or Edge Device in block 1122. The vEEC master defines the routing path for packets to and from the new Edge Node(s) or Edge Device(s) to the original Edge Node or ED in block 1124. In block 1126, the application or function commences operation on the alternative Edge Node or Edge Device, thereby ensuring seamless service despite the initial ECN's inability to meet performance criteria.

FIG. 11B is a process flow diagram illustrating a method 1150 of managing application offloading in a vEEC system in accordance with some embodiments. Method 1150 may be performed by a processor in a vEEC master ECN.

In block 1152, the processor may monitor the performance of a plurality of ECNs against predefined KPI targets. For example, the processor may continuously collect and analyze data related to network traffic, resource utilization, latency, throughput, and error rates from each ECN. The processor may compare these metrics against the established KPI targets, which may include thresholds for data transfer speeds, maximum allowable downtime, and specific resource usage limits. The processor may use performance analysis algorithms to identify deviations from these KPI benchmarks to proactively manage network resources and ensure optimal functionality and efficiency of each ECN.

In block 1154, the processor may receive a notification from a vEEC agent indicating a service issue in an ECN failing to meet said KPI targets. For example, the processor may be configured to receive automated alerts or messages generated by vEEC agents deployed in each ECN. These agents may continuously monitor the local performance metrics of their respective ECNs and, upon detecting a discrepancy or failure to meet the set KPI targets (e.g., excessive latency, bandwidth issues, or resource depletion, etc.) automatically generate and send a detailed notification to the processor. This notification may include specifics of the KPI deviations, potential causes, and any relevant data that may assist in diagnosing and addressing the service issue.

In determination block 1156, the processor may determine whether an alternative ECN within a local group of ECNs may effectively run an application or function originally assigned to the ECN experiencing the service issue or failing to meet the KPI targets. For example, the processor may analyze the capabilities and current load of other ECNs within the local group to identify a suitable candidate. This may involve comparing the resource requirements of the affected application or function with the available resources, processing power, and network capacity of each potential alternative ECN. The processor may also consider factors like geographical proximity, latency, and historical performance data to ensure that the selected ECN may run the application effectively and maintain or enhance its performance according to the desired KPIs. If an appropriate ECN is identified within the local group, the processor may prepare for the possible reassignment of the application or function to this ECN.

In response to determining that there are no suitable alternative ECN within the local group (i.e., determination block 1156="No"), the processor may extend the search to ECNs in external groups in block 1158. For example, the processor may communicate with a centralized network management system or directly with vEEC masters in other groups to inquire about the availability and capabilities of their respective ECNs. This may include sending out queries or requests for information regarding the performance, resource availability, and current load of ECNs in these external groups. The processor may also assess the compatibility of these external ECNs with the specific requirements of the application or function in question, considering factors such as network latency, data privacy regulations, and the logistical feasibility of transferring the application. Such comprehensive evaluation may help the processor in identifying the most suitable ECN outside the local group for potentially offloading the application.

In block 1160, the processor may receive confirmation of the availability and suitability of an ECN in an external group to run said application or function. For example, the processor may receive a response from the vEEC master or network management system of the external group, detailing the capacity and current operational status of a recommended ECN. This response may include specific metrics such as available processing power, memory, network bandwidth, and other relevant resource availability, aligning with the requirements of the application or function in need. In addition, the response might address compliance with any necessary operational or security standards, ensuring that the identified ECN is capable and appropriate for hosting the application. This confirmation may allow the processor to proceed knowing that the selected ECN from the external group may effectively and securely handle the offloading task.

In block 1162, the processor may coordinate the offloading of the application or function from the original ECN to the identified alternative ECN in the external group. For example, the processor may initiate a series of automated steps to facilitate a smooth transition. This may include sending configuration details and specific requirements of the application to the alternative ECN, ensuring it is prepared to take over the application. The processor may also manage the synchronization of data and state information between the original and new ECNs to maintain continuity and minimize downtime during the transition. In addition, the processor may establish network routing changes to redirect traffic to the new ECN and update any relevant network policies or settings to support the newly offloaded application. This coordination may be done in a manner to ensure a seamless handover with minimal impact on the end-user experience and overall network performance.

In block 1164, the processor may reassign the application or function to the identified alternative ECN. For example, the processor may execute commands to transfer the operational control of the application, including its relevant data and configurations, to the new ECN. This process may include updating the network routing tables to redirect application traffic and data streams to the alternative ECN. The processor may also send instructions to both the original and alternative ECNs to ensure a synchronized transition, which may include steps for application shutdown on the original ECN and startup protocols on the new ECN. Further, the processor may adjust monitoring and management settings to track the application's performance on the new ECN, ensuring it meets the predefined KPIs and operates efficiently in its new environment. This reassignment may be managed to maintain data integrity and service continuity during the transition.

In block 1166, the processor may define routing paths for data packets to and from the new ECN to maintain the continuity of the application or function. For example, the processor may update the network's routing table to ensure that all data traffic intended for the application is correctly directed to the new ECN. This may include specifying network paths, possibly including intermediary nodes, that efficiently and securely transport data between the end-users and the new ECN. The processor may also implement changes to the Domain Name System (DNS) settings or other network protocols to facilitate this rerouting. The processor may also establish failover mechanisms and backup routes to ensure reliability and minimize packet loss during the transition.

In block 1168, the processor may initiate the operation of the application or function on the identified alternative ECN. For example, the processor may send activation commands to the alternative ECN, triggering the start-up of the application or function on this new node. This initiation may include loading the application's code, inputting necessary configurations, and allocating the required resources, such as memory and processing power. The processor may also oversee the synchronization of any data and state information needed for the application to resume operation seamlessly. The processor may also set up monitoring processes on the alternative ECN to ensure the application runs smoothly and meets the established performance metrics. The processor may perform other similar operations to ensure that the application's transition to the new ECN is successful and that its operation continues without significant interruption or degradation in service quality.

In block 1170, the processor may continue the monitoring of performance of the reassigned application or function to ensure compliance with the KPI targets. For example, the processor may collect and analyze real-time data related to the application's performance metrics on the new ECN, such as response times, resource utilization, network latency, and throughput. This ongoing monitoring may include comparing the current performance data against the established KPI targets to detect any deviations or potential issues. The processor may also implement automated alert systems to notify network administrators of any performance anomalies or KPI breaches. This continuous oversight may allow for proactive adjustments and optimizations to the application or network configurations, ensuring that the application consistently meets the required standards and delivers the expected quality of service on the alternative ECN.

Figure 12:
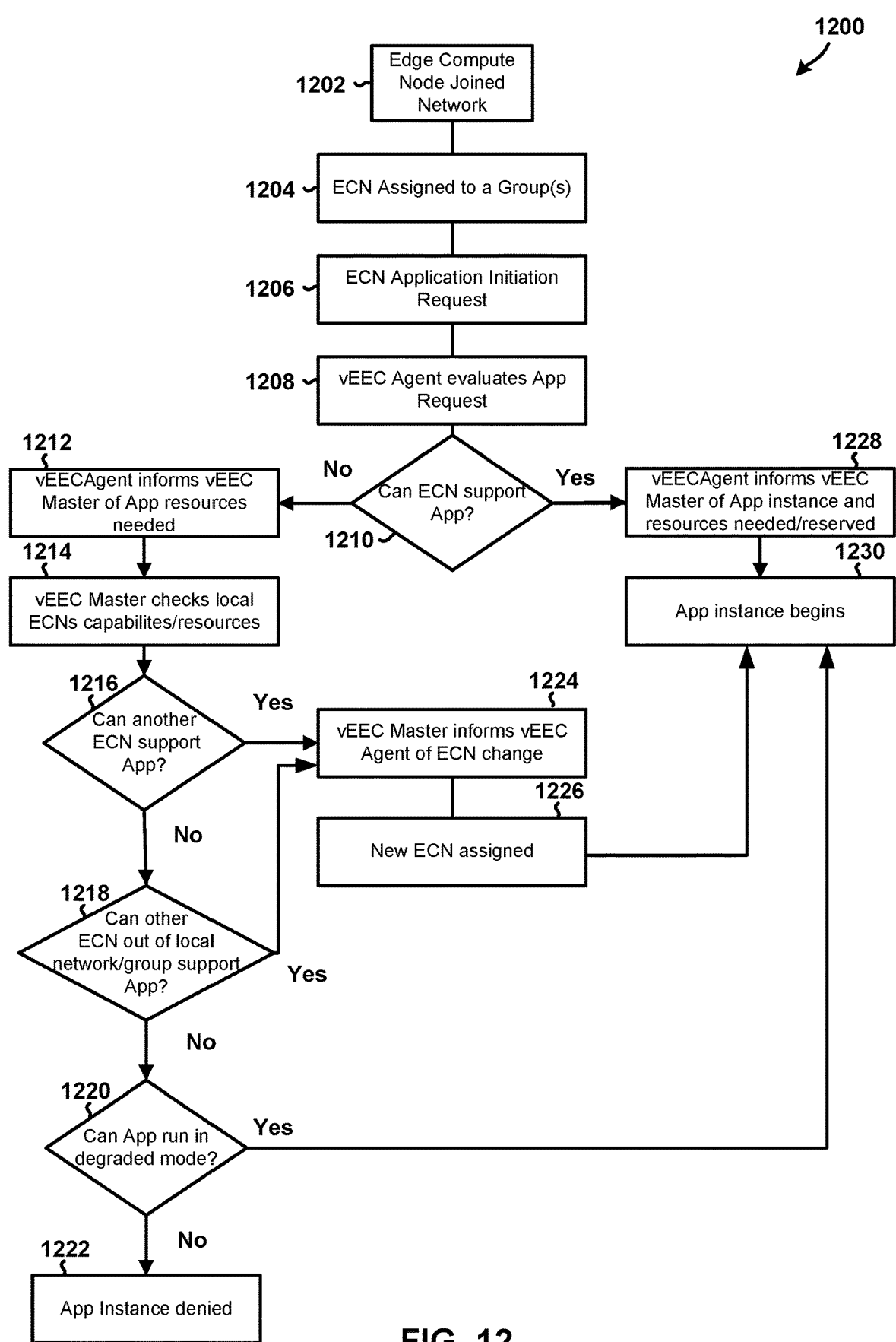
FIG. 12 is a process flow diagram illustrating a method of requesting additional resources to run a particular application in accordance with some embodiments.

FIG. 12 is a process flow diagram illustrating a method 1200 of requesting additional resources to run a particular application in accordance with some embodiments. Method 1200 may be performed by a processor in an ECN.

In block 1202, the processor may register the connection of a new ECN to the network. For example, the processor may log the ECN's details and status, confirming successful network integration.

In block 1204, the processor may assign the newly joined ECN to one or more designated groups. For example, the processor may analyze network topology and ECN capabilities to determine the most suitable group assignments based on predefined criteria.

In block 1206, the processor may receive a request to initiate an application from an ECN. For example, the processor may process the initiation protocols, including resource allocation and readiness checks, for the requested application.

In block 1208, the vEEC Agent may evaluate the application initiation request. For example, the vEEC Agent may assess the compatibility of the application's requirements with the ECN's resources and current load.

In block 1210, the vEEC Agent may determine whether the ECN can support the application. For example, the vEEC Agent may compare the ECN's available resources against the application's needs to determine if the current ECN can support the support the application with its particular KPI requirements.

In block 1212, the vEEC Agent may relay information about the application's resource needs to the vEEC master if the ECN lacks the necessary resources for supporting the application. For example, the vEEC Agent may compile a report detailing the specific deficits and send it to the vEEC master for further action.

In block 1214, the vEEC Master may check the capabilities and resources of other ECNs within the local group. For example, the vEEC Master may query local ECNs for their current status and available capacity to identify a potential host for the application.

In block 1216, the processor may determine whether another local ECN can support the application. For example, the processor may analyze the responses from the local ECNs to identify a suitable candidate for application offloading.

In block 1218, the vEEC Master may determine whether an ECN outside of the local network or group can support the application when no local ECNs are suitable. For example, the vEEC Master may extend the resource request to ECNs in external groups and evaluate their responses.

In block 1220, the vEEC Master may determine whether the application may operate in a degraded mode if no ECNs are found to support it fully. For example, the vEEC Master may determine if the application's critical functions may be maintained with limited resources or reduced performance.

In block 1222, the vEEC Master may deny the application instance if it cannot be supported in any form. For example, the vEEC Master may send a notification to the requesting ECN and the vEEC agent indicating the denial and the reasons for it.

In block 1224, the vEEC Master may inform the vEEC agent if a new ECN is assigned to run the application. For example, the vEEC Master may update the system's configuration to reflect the change and trigger the necessary steps for the application's migration.

In block 1226, the vEEC Master may finalize the assignment of a new ECN. For example, the vEEC Master may execute the administrative process to officially designate the new ECN as the host for the application.

In block 1228, the vEEC Agent may inform the vEEC master of the application instance and the resources that have been allocated for it. For example, the vEEC Agent may document the resource allocation and confirm the reservation on the new ECN.

In block 1230, the vEEC Agent may commence the operation of the application on the newly assigned ECN. For example, the vEEC Agent may initiate the application start-up sequence and monitor the transition to ensure a smooth handover and service continuity.

Figure 13:
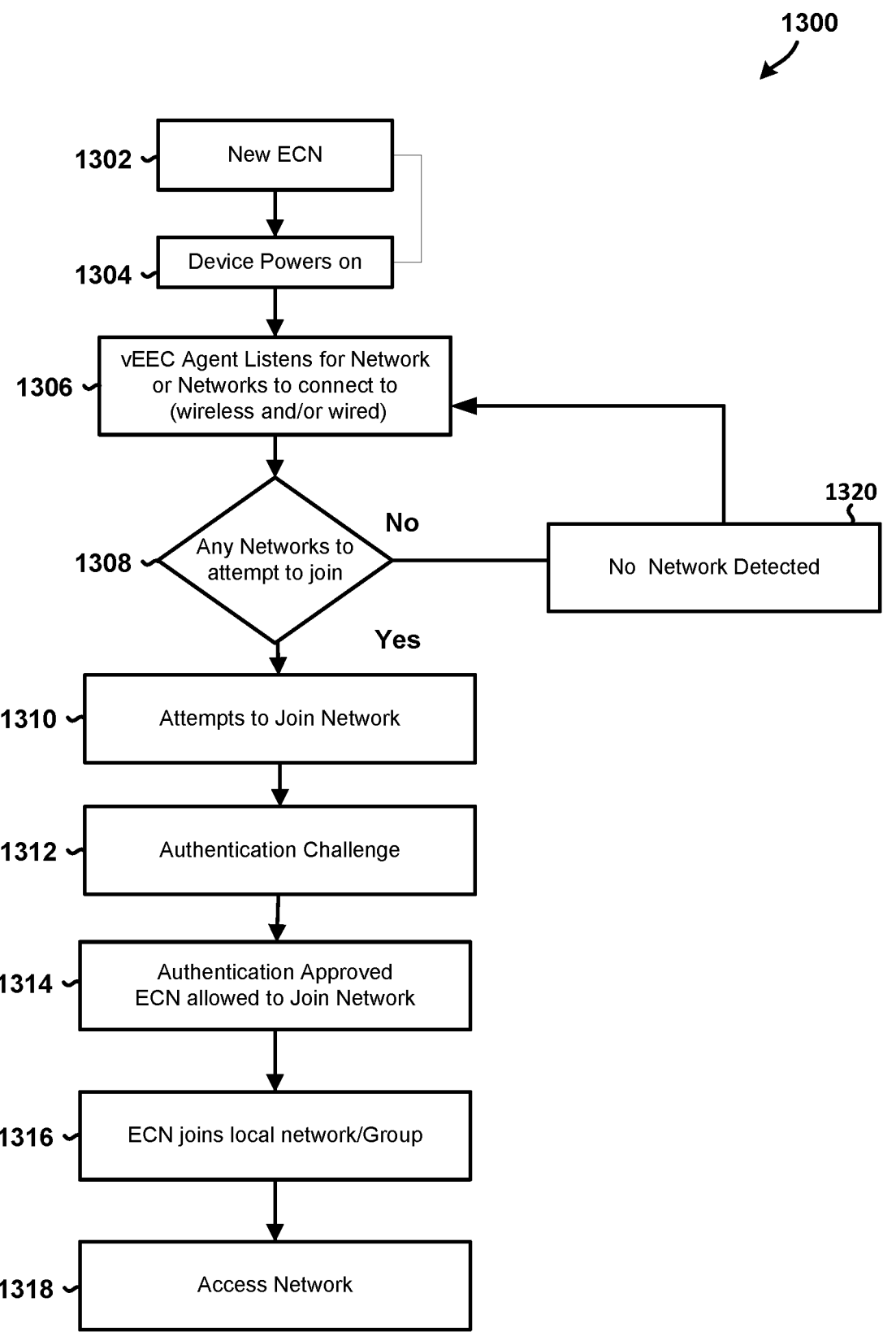
FIG. 13 is a process flow diagram illustrating a method of joining an ECN group in accordance with some embodiments.

FIG. 13 is a process flow diagram illustrating a method 1300 of joining an ECN group in accordance with some embodiments. Method 1300 may be performed by a processor in an ECN.

In block 1302, the processor may initialize the registration process for a new Edge Computing Node (ECN). For example, the processor may activate the ECN's networking interfaces and prepare it for network discovery.

In block 1304, the processor may power on the device. For example, the processor may execute the boot-up sequence, which may include self-diagnostics and loading of the operating system and necessary services.

In block 1306, the processor may engage the vEEC agent to listen for available networks, both wireless and wired, to which the ECN can connect. For example, the processor may scan for network signals and evaluate the strength and security of available connections.

In block 1308, the vEEC Agent may determine whether there are any viable networks to attempt to join. For example, the processor may assess the list of detected networks against preconfigured criteria to select an appropriate network for connection attempts.

In response to determining that there are no viable networks to attempt to join (i.e., determination block 1308="No"), the vEEC Agent may determine that there are no networks detected in block 1320 and repeat the operations in block 1306. On the other hand, in response to determining that there are viable networks to attempt to join (i.e., determination block 1308="Yes"), the vEEC Agent may initiate attempts to join a network in block 1310. For example, the vEEC Agent may use the network credentials stored on the ECN to authenticate with the selected network.

In block 1312, the vEEC Agent may handle an authentication challenge from the network. For example, the vEEC Agent may engage in a cryptographic handshake with the network's authentication system to verify the ECN's credentials.

In block 1314, the vEEC Agent may receive confirmation that the authentication is approved, thereby granting permission for the ECN to join the network. For example, the processor may process the authentication tokens or certificates from the network, confirming successful authentication.

In block 1316, the vEEC Master may facilitate the ECN's joining of the local network or group. For example, the vEEC Master may register the ECN with the network's directory services and update the network topology to include the new ECN.

In block 1318, the vEEC Master may enable the ECN to access network resources. For example, the processor may configure network routes and permissions, allowing the ECN to communicate with other nodes and access shared resources.

Figure 14:
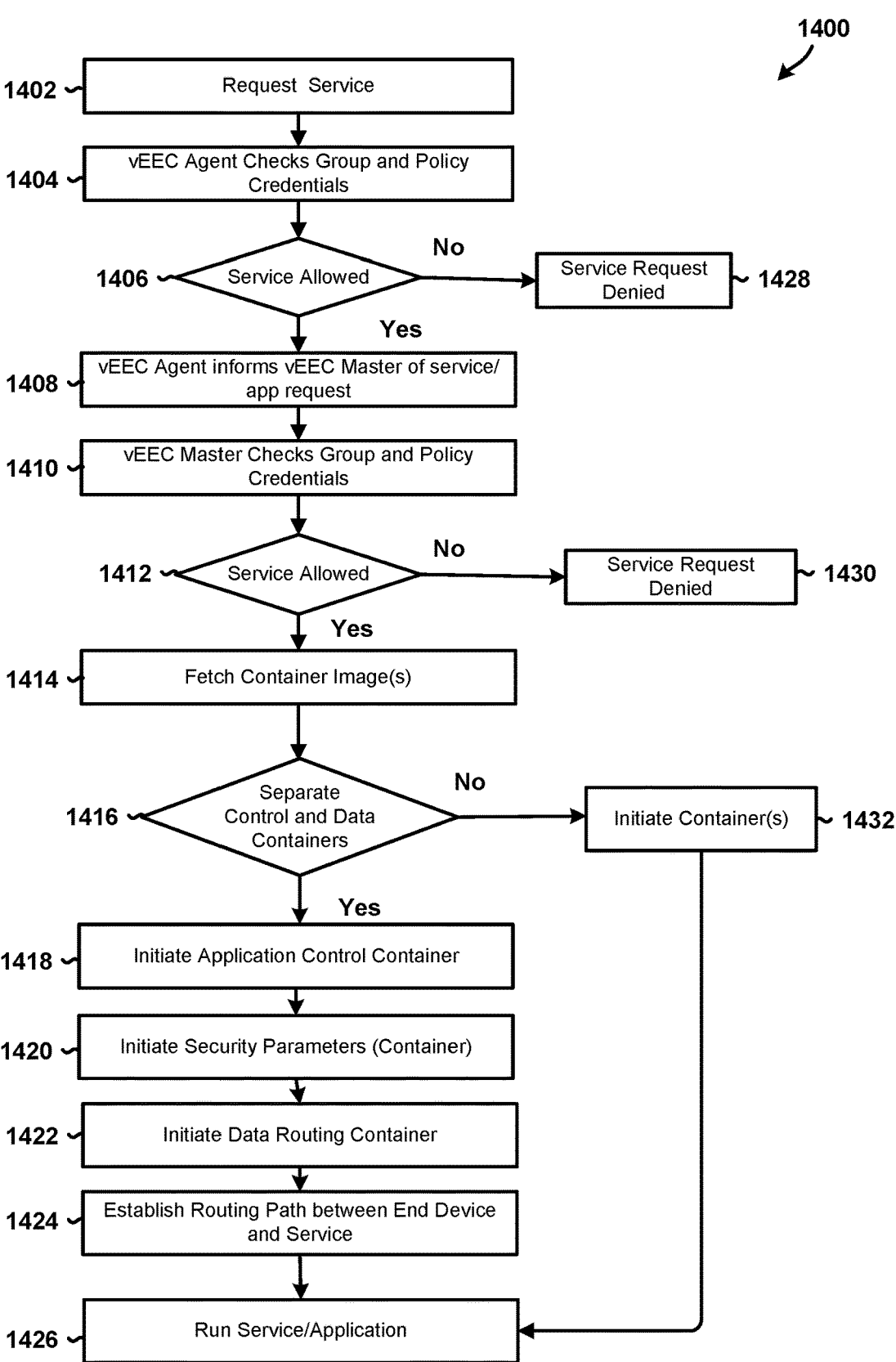
FIG. 14 is a process flow diagram illustrating a method for requesting services or applications to be executed on an ECN in a vEEC system, which may be compatible with ETSI Mobile Edge Computing (MEC) standards.

FIG. 14 is a process flow diagram illustrating a method 1400 for requesting services or applications to be executed on an ECN in a vEEC system, which may be compatible with ETSI Mobile Edge Computing (MEC) standards, in accordance with some embodiments. In overview, the method begins with a service request and involves a sequence of verification steps to ensure the ECN can adequately run the requested service or application. The vEEC master, potentially hosted within a Virtual Machine (VM), plays an important role in managing these requests. Method 1400 may be performed by a processor in a vEEC agent ECN and/or vEEC master ECN.

In block 1402, the vEEC Agent may handle a service request. For example, the vEEC Agent may receive and log a request from an end device or application for network services or resources.

In block 1404, the vEEC Agent may check the group and policy credentials. For example, the vEEC Agent may verify the requesting entity's credentials against the network's access policies and group memberships to ensure compliance and authorization.

In block 1406, the vEEC Agent may determine if the service is allowed. For example, the vEEC Agent may evaluate the request against network policies and if the request meets the necessary criteria, it will allow the service to proceed.

In block 1408, the vEEC Agent may inform the vEEC master of the service or application request. For example, the vEEC Agent may send a notification to the vEEC master about the request, including details of the required service and any relevant parameters.

In block 1410, the vEEC Master may check group and policy credentials again, this time at the vEEC master level. For example, the vEEC Master may perform a secondary verification of the request against higher-level network policies and group authorizations.

In block 1412, the vEEC Master may confirm if the service is allowed by the vEEC master. For example, the vEEC Agent may receive authorization from the vEEC master to proceed with the request based on a comprehensive policy check.

In block 1414, the vEEC Agent may fetch the necessary container image(s). For example, the vEEC Agent may retrieve the software images required for the service from a container registry or storage repository.

In block 1416, the vEEC Agent may determine if separate control and data containers are necessary. For example, the vEEC Agent may decide based on the service requirements whether to isolate control logic from data processing within separate containers.

In block 1418, the vEEC Agent may initiate the application control container. For example, the vEEC Agent may launch a container specifically for managing the application's control functions.

In block 1420, the vEEC Agent may initiate security parameters for the container. For example, the processor may configure security settings, such as authentication and encryption, within the container environment.

In block 1422, the vEEC Agent may initiate a data routing container. For example, the vEEC Agent may start a container responsible for routing data to and from the service, adhering to predefined network paths.

In block 1424, the vEEC Agent may establish a routing path between the end device and the service. For example, the vEEC Agent may set up communication channels to ensure that data packets travel efficiently between the requesting device and the service's location.

In block 1426, the ECN may run the service or application. For example, the vEEC Agent may execute the service within the prepared container environment, making it available for use by the end device.

If at any point the service request is denied, as indicated in blocks 1428 and 1430, the vEEC Agent may handle the denial. For example, the vEEC Agent may log the denial, notify the requesting entity, and possibly provide reasons or alternative options.

If it's determined that separate control and data containers are not necessary, as indicated in block 1432, the vEEC Agent may initiate containers without separation. For example, the processor may launch a unified container that handles both control and data aspects of the application.

Thus, the process of method 1400 initiates when a service is requested (block 1402), followed by the vEEC agent checking the requesting entity's group membership and policy credentials (block 1404). If the service is permitted based on these checks, the vEEC agent informs the vEEC master of the service or application request (block 1408). The vEEC master conducts its own verification of group and policy credentials (block 1410). If confirmed, the vEEC master proceeds to facilitate the service by fetching the required container image(s) (block 1414) and, if necessary, initiating separate control and data containers (block 1416). The application control container is then initiated (block 1418), along with the establishment of security parameters (block 1420) and data routing containers (block 1422). Finally, a routing path is established between the end device and the service (block 1424), leading to the running of the service or application (block 1426).

If at any stage the service request is denied due to group or policy constraints (blocks 1428 and 1430), or if it's determined that separate control and data containers are not needed (block 1432), appropriate actions are taken, which could range from denying the service to adjusting the container setup.

Figure 15:
FIG. 15 is a component block diagram illustrating a configuration of a vEEC cluster arrangement in a system that could be configured in accordance with some embodiments.

FIG. 15 illustrates a configuration of a vEEC cluster arrangement in system that could be configured in accordance with some embodiments. FIG. 15 also illustrates vEEC orchestration's hierarchical and modular approach, allowing for scalability and flexible management across multiple layers of network infrastructure that allows for mass-scale deployment and includes a flexible network-of-networks structure.

In the example illustrated in FIG. 15, there are two main clusters Multi-Site Cluster 1 (MS C1) and Multi-Site Cluster 2 (MS C2). These clusters represent larger organizational structures within the vEEC system. Within each multi-site cluster are site clusters (SC), such as SC1 in MS C1 and SC2 and SC3 in MS C2. Each Site Cluster contains one or more ECNs that are managed by a VEEC master/Server. For example, SC1 includes ECN SE3, while SC2 includes ECN SE6. These ECNs serve as central nodes within their respective Site Clusters. Under the ECNs, there are further delineated Single ECNs (SE), such as SE1 and SE2 under SC1. These Single ECNs are connected to User Clusters (UC), like UC1 and UC2. Each User Cluster contains multiple Edge Devices (ED), which are the end-user devices that utilize the computing resources and services provided by the vEEC system.

The vEEC agents are important components in this architecture that reside on each ECN and facilitate communication and orchestration tasks. The vEEC agent may be responsible for managing service requests, resource allocation, and application/container deployment within its host ECN. If an application or container is assigned to a Multi-Site Cluster (MSC), it may be deployed to any ECN within the cluster without the need for individual provisioning for each ECN.

The use of applications or containers by User Clusters may be governed by policy and service authorizations, which may be based on the subscription credentials of the User Clusters. As such, while an application may be available within a Multi-Site Cluster, only User Clusters with the appropriate credentials and policies may be permitted to use the application.

Figure 16A:
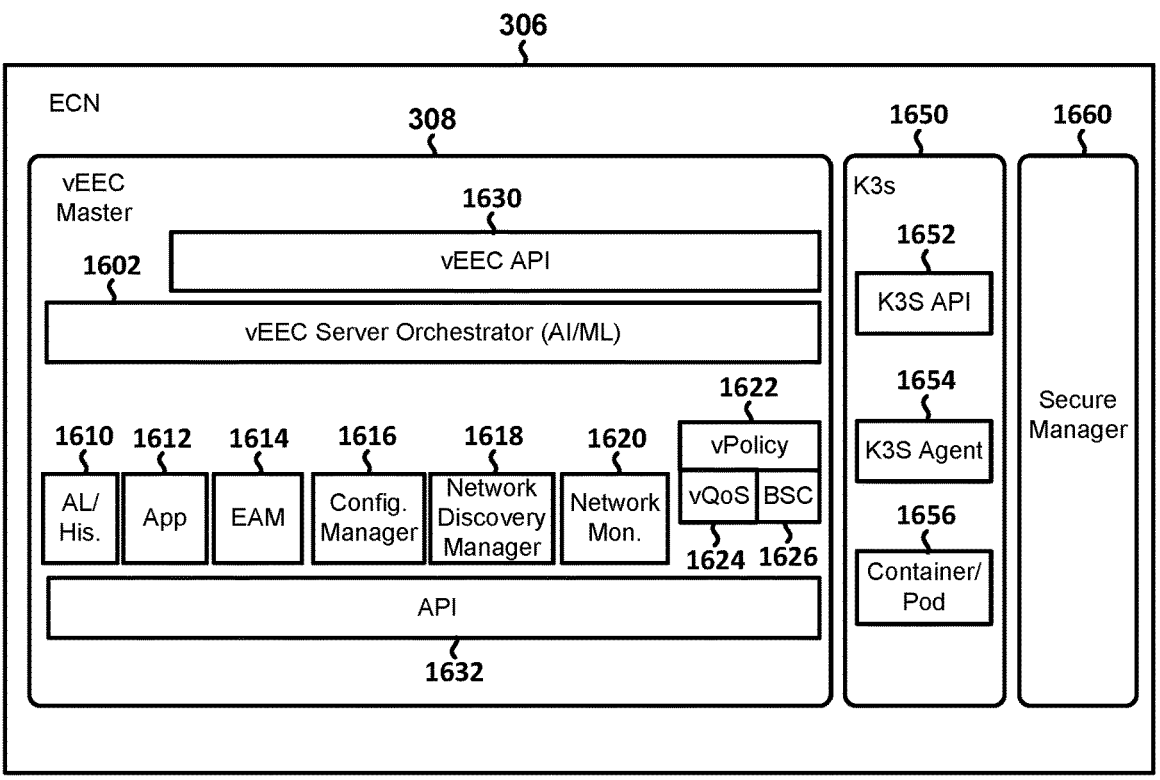
FIGS. 16A and 16B are component block diagrams illustrating components of the vEEC orchestration system, showcasing the master orchestrator component and the agent orchestrator component, respectively.
Figure 16B:
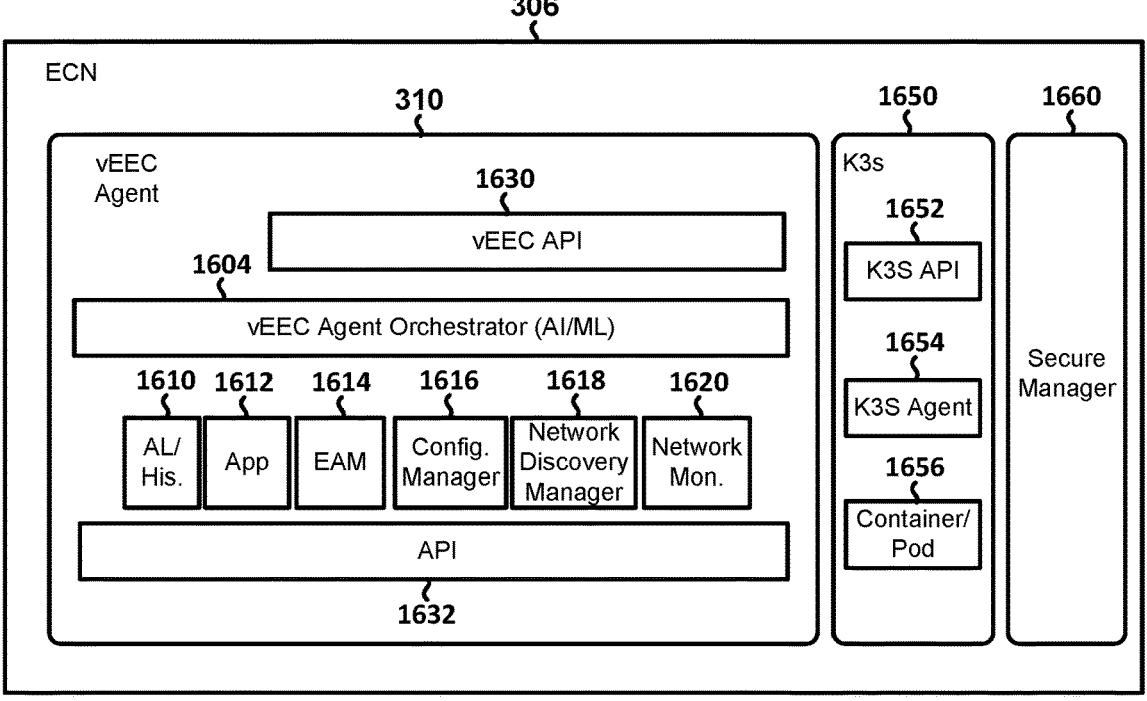

FIGS. 16A and 16B illustrate components of the vEEC orchestration system, showcasing the master orchestrator component 1602 and the agent orchestrator component 1604, respectively. The vEEC orchestrator plays a crucial role in managing the allocation and availability of resources within an Edge Computing Node (ECN). A vEEC orchestrator may be responsible for assessing the ECN's capacity to support applications or containers and making critical decisions on operational modes. Based on resource availability, the vEEC orchestrator may permit an application to run at its full capacity, restrict its functionality due to resource limitations, or prevent it from running where resources are inadequate.

These figures also highlight the modular nature of the vEEC system, indicating that both the master and agent components may function independently as instances or within containers on an ECN 306. A notable feature of the vEEC architecture is its resilience. A vEEC agent may assume the role of a vEEC master if the connection to the primary vEEC master is severed. This seamless transition is possible because the vEEC agent maintains a mirrored dataset of the necessary vEEC master data, negating the need for a system reset during such failover scenarios.

The vEEC master and agent may include multiple components that collaborate to enhance the system's operational efficiency and reliability. These components include but are not limited to an Application Library/History (AL/H) 1610 for managing applications and their versions, Applications (App) 1612 which are the actual software services, an Edge Application Manager (EAM) 1614 for orchestrating application deployment, a Configuration Manager 1616 for setting up system parameters, a Network Discovery Manager 1618 for identifying network resources, a Network Monitor 1620 for tracking network performance, vPolicy 1622 and vQoS 1624 for policy enforcement and quality of service management, BSC 1626 for bandwidth control, vEEC API 1630 for interfacing with vEEC components, and a general API 1632 for broader interactions. These components may function collectively to create a dynamic and resilient network orchestration platform that help ensure that the vEEC system may adjust to the diverse demands of an ECN environment.

FIGS. 16A and 16B also demonstrate the vEEC system's compatibility with popular orchestrators such as Kubernetes (K8) and K3s, a lightweight Kubernetes distribution. The illustrated ECNs 306 are equipped with K3s components 1650, encompassing the K3s API 1652 for orchestration interactions, the K3s agent 1654 for managing node operations, and container/pod management 1656 for application isolation and deployment. In addition, each ECN 306 may include a Secure Manager 1660 that help ensure that security protocols are tightly integrated into the network management processes. This compatibility with industry-standard orchestrators underscores the vEEC system's versatility and its capacity to operate within a modern, containerized infrastructure.

The vEEC system may include a range of components tailored to implement or enhance its network operations. These components may include an adaptive learning/machine learning (AL/ML), app library history, master application catalog (MAppC), customer application catalog (CAppC), application module, edge application manager (EAM), network discovery module, network monitoring module, vPolicy, configuration manager (agent), configuration manager (master/server), and secure manager.

The adaptive learning/machine learning (AL/ML) component may be configured to harness predictive analytics and intent-based management to refine the network's operations.

The app library history may maintain a database or file system replete with a catalog of applications and containers, ensuring compatibility across various ECN types and keeping the network abreast of the latest deployments.

The MAppC may provide a broad spectrum of default applications to all users within the multi-site cluster (MSC), ensuring that each site cluster (SC), single ECN (SE), and individual customer (IC) may access applications tailored to their specific operational needs.

The CAppC may provide a tailor-made catalog experience to individual customers. This catalog allows access to proprietary applications and third-party services, subject to appropriate authorizations.

The application module may facilitate the deployment of applications or containers, syncing with the requirements pertinent to each ECN or ECN type.

The EAM may manage the applications per the service management agreement and/or conducts in-depth analyses of network and service data to diagnose and rectify infrastructural and application-centric issues, engaging with the network management system for further monitoring and intervention if necessary.

The network discovery module may identify the connected devices and ECNs (agents), keeping the network topology within the network management system current and reflective of the network's actual state.

The network monitoring module may provide an overarching, real-time perspective of services across the network's infrastructures, delivering detailed insights into service quality and KPI adherence. The network monitoring module may be locally accessible on the ECN (given the right permissions).

The vPolicy module, operative on the vEEC server and standby on the vEEC agent, may establish the policies and services that user clusters may access, delineating the permissible applications and resources based on user privileges.

Resource allocation may be managed by the configuration manager. On the agent side, the configuration manager may dedicate local resources for application or container operations (including network slices). On the master/server side, the configuration manager may orchestrate resource distribution across the network and coordinate with other agents to ensure efficient resource utilization.

The secure manager may enforce security protocols throughout the network and/or may alert the network monitoring module of any security incidents. The security manager may also determine if they may be automatically rectified or if they necessitate manual intervention.

Figure 17:
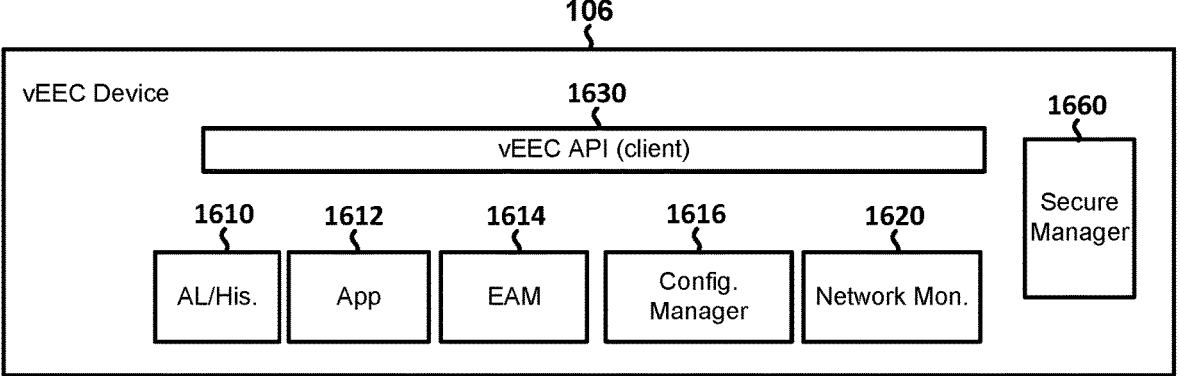
FIG. 17 is a component block diagram illustrating components of the vEEC orchestration system that may be integrated into an edge device in accordance with some embodiments.

FIG. 17 illustrates components of the vEEC orchestration system that may be integrated into an edge device 106 in accordance with some embodiments. An edge device 106 may be equipped with a client-facing vEEC API 1630, which facilitates interaction with the vEEC ecosystem. It may also include app library/history 1610 that tracks and manages the applications and their deployment records, an edge application manager 1614 that oversees the lifecycle of applications, and a configuration manager 1616 that tailors the device's settings for optimal application performance. In addition, the device 106 may include a network monitoring 1620 component that oversees network performance and ensures the integrity of communications. The application 1612 component represents the actual operational software that the edge device executes. A secure manager 1660 may safeguard the device and its operations from potential security threats.

It is important to note that many edge devices have limited resources and may not have the capacity to support a full vEEC orchestration agent. Such constraints necessitate a careful consideration of the resource footprint of each component to ensure compatibility with the device's capabilities. The vEEC orchestration components are thus designed to be lightweight and efficient, allowing even resource-constrained edge devices to participate in the broader vEEC system without compromising their functional integrity.

The vEEC system may implement a hybrid data center model that integrates both cloud and edge computing facilities. This architecture's primary goal is to position applications and functions in close proximity to the end devices that utilize them, optimizing performance by reducing latency. The hybrid nature of the vEEC data centers allows edge networks to inherit and execute many of the functions traditionally managed by centralized data centers. This transition of roles alleviates the processing demands on central facilities and reduces energy consumption (aligning with eco-friendly data management practices). In addition, the vEEC may use a distributed control plane architecture that helps ensure each edge data center operates autonomously. This means that every edge server may be equipped to handle both control and computational tasks so as to enhance the system's overall autonomy. The distributed control plane allows for various databases to exist within the network, necessitating synchronization across multiple platforms. This may be achieved through a federation of vEEC edge data centers, which links their databases to function seamlessly as a unified infrastructure, or by synchronizing databases site-to-site to maintain consistent configurations throughout the edge data centers. Such a configuration may also enhance the resilience of the vEEC network. Should communication between the central and edge data centers be disrupted, the impact on network performance may be minimized due to the edge data centers' self-sufficient operational capabilities. This design ensures that the vEEC system maintains high availability and reliable service delivery, even in the face of potential network interruptions.

Figure 18:
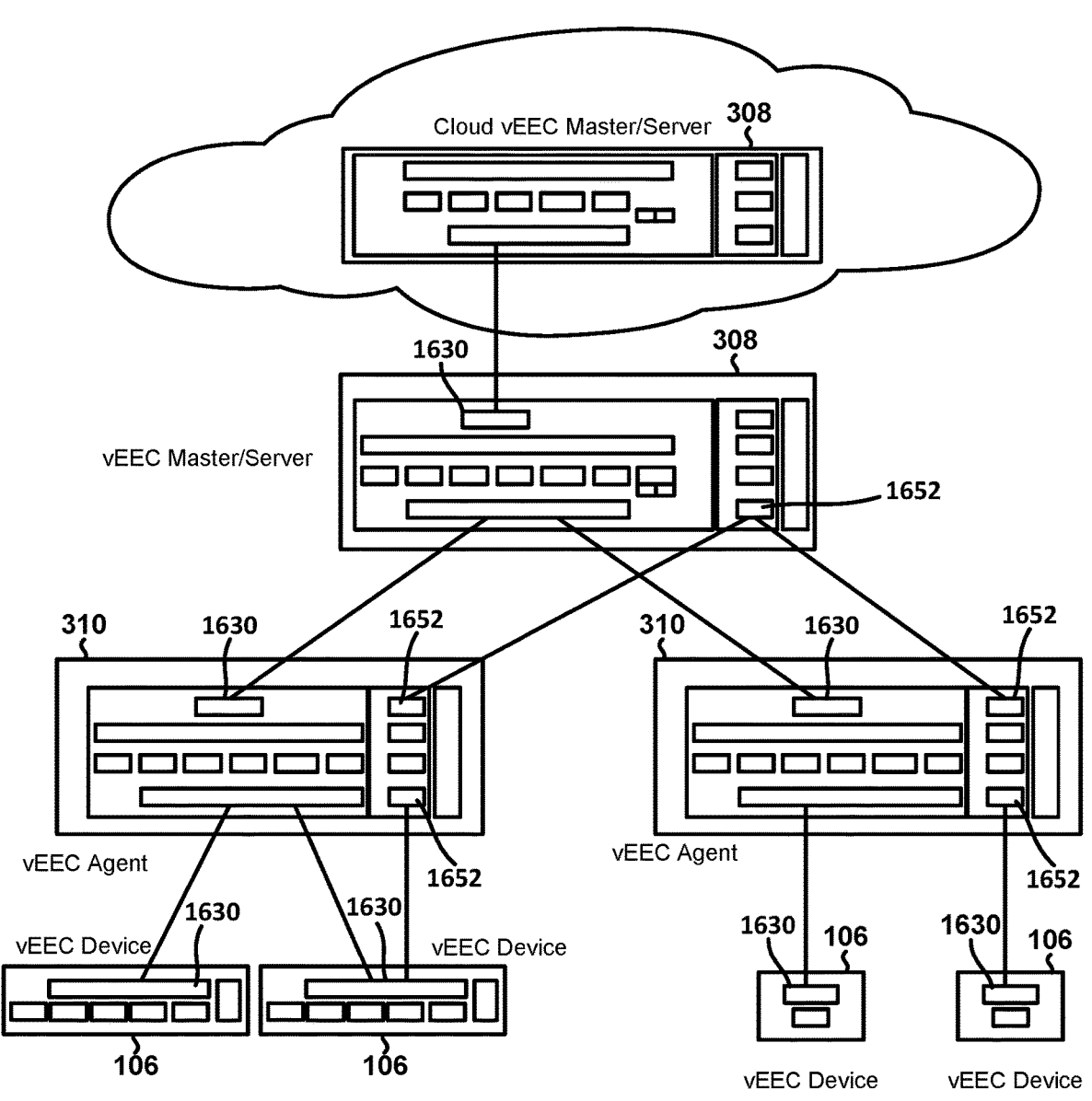
FIG. 18 is a component block diagram illustrating an example of a vEEC master/server and agent/client architecture.

FIG. 18 illustrates an example of a vEEC master/server and agent/client architecture. The vEEC master/server is versatile in its placement—it may be located in the cloud, on-premise, or outside the cloud. The designation of the within this architecture, the vEEC Server within this setup, whether it is the cloud-based or the on-premise server, is determined by the service policy in use. This architecture includes several vEEC agents, which may be associated with both ECNs and edge devices.

In the example illustrated in FIG. 18, all the devices, encompassing servers, agents, ECNs, and edge devices, may be integrated into a single Multi-Site Cluster (MSC). In addition, the vEEC system is adaptable and allows for the possibility of a vEEC master/server and/or agent/client to be affiliated with multiple single Site Clusters (SCs) and MSCs.

The vEEC architecture also includes the concept of grouping, where a group—be it a User Cluster (UC), Single ECN (SE), SC, or MSC, or any combination thereof—may be assigned to a specific slice of predefined network resources. This results in the segmentation of the network, which may either be applied to the entire network or just a subsection of it. While assigning a group to a predefined network slice may lead to some efficiency losses, this is often counterbalanced by the simplification of group management, which may be a significant advantage in large-scale network operations.

This segmentation approach can have implications for micro-segmentation and Quality of Service (QOS). Specifically, micro-segmentation in this context may not be dependent on the bearer traffic for each application run. Consequently, the QoS experienced by an application might not fully align with the capabilities of the current network slice, potentially impacting the application's performance. Despite this, the vEEC system may maintain a balance between efficient network management and the optimization of network resource usage.

In some embodiments, the vEEC system may include edge computing systems or devices that are configured to orchestrate a range of network operations. These operations may include managing network resources within an integrated system, including elements such as computing power, cloud services, storage capabilities, networking, and security protocols. The system may dynamically scale resources in response to specific requirements, adjusting for factors like capacity, bandwidth, and latency to optimize network performance.

To address network congestion, the system may redistribute resources among Edge Computing Nodes (ECNs) within a heterogeneous environment. This resource redistribution may help maintain efficient network operation and prevent bottlenecks. In situations in which ECNs face resource limitations, the system may implement or enable a failover to cloud resources to ensuring that computing tasks may continue without interruption. The system may also enhance the capabilities of edge devices that have limited resources by implementing a compute distribution scheme that strategically allocates computational tasks to more powerful servers located elsewhere in the network. By offloading these tasks, edge devices may operate more efficiently, focusing their limited resources on tasks that are more suitable for their capabilities. These operations may improve the performance of individual devices as well as the overall functionality and efficiency of the system/network.

FIG. 19 is a process flow diagram illustrating a method 1900 for orchestrating network operations in a vEEC system in accordance with some embodiments. Method 1900 may be performed by a processor or processing system in a computing system (e.g., ECN, edge device, etc.).

In block 1902, the processor may initialize the vEEC system by loading network configuration and identifying ECNs and their capabilities. For example, the processor may access a centralized network management system to retrieve the latest configuration data, which may include detailed information about the network topology, protocols, and the roles of various nodes within the network. The processor may determine how the ECNs are interconnected and how they interact with other network components, such as routers, switches, and cloud resources. The processor may also perform a capability assessment for each ECN by sending queries to gather data about their hardware and software specifications. This may include information such as CPU speed, memory capacity, storage space, and the types of tasks each ECN is equipped to handle. The processor may tailor the network management strategies to the specific strengths and limitations of each ECN, ensuring efficient resource allocation and optimal network performance.

In some embodiments, the processor may establish communication links with cloud resources in block 1902. For example, the processor may set up secure and efficient data transmission channels to a cloud-based server for additional computational support or data storage. As an example, consider a network of ECNs deployed in infrastructure for traffic management and environmental monitoring. As part of the initialization operations in block 1902, the processor in each ECN may establish a connection to cloud services to offload excess data for long-term storage and to leverage cloud computing power for intensive data analysis tasks that are beyond the local processing capabilities of the ECNs. This connection may be important during events that generate large amounts of data (e.g., city-wide festivals, emergencies, etc.) for which local ECN resources might be insufficient. By establishing these cloud links, the processor may help ensure that the vEEC system and/or ECN network remains scalable, flexible, and capable of handling varying workloads. As a result, the processor may improve the overall efficiency and reliability of the vEEC system.

In block 1904, the processor may continuously monitor network resources that include computing, cloud services, storage, networking, and security resources. For example, the processor may actively track the CPU and memory usage of the ECN along with the load on cloud servers to manage computing resources effectively. This may include analyzing the performance of cloud-based applications and predicting future resource needs based on current trends. The processor may also monitor storage utilization (locally, in cloud storage, etc.) to help ensure adequate space for data capture and retention, monitor the health and bandwidth of network connections to identify any data transmission bottlenecks or failures, and/or monitor and evaluate the network security posture by, for example, scanning for vulnerabilities and monitoring for unusual network traffic that could signal a cyber threat.

In block 1906, the processor may assess resource requirements for one or more software applications or tasks within the vEEC system. For example, the processor may evaluate a video streaming application's need for high bandwidth and low latency to ensure uninterrupted service. This may include analyzing data traffic patterns, video resolution demands, and expected user count to determine the necessary network bandwidth and processing power. The processor may allocate more resources in response to determining that the application is expected to handle high-definition streaming for a large number of users. As another example, the processor may evaluate the computational power required to quickly process a large amount of sensor data. The processor may consider factors such as data ingestion rates, processing speed needed for real-time analysis, and the storage required for accumulating historical data. These assessments may allow the processor to allocate resources dynamically and ensure that each application or task within the vEEC system has the necessary computational power, storage, and network capacity to function correctly.

In block 1908, the processor may dynamically scale network resources based on the determined requirements, which may include adjusting capacity, bandwidth, and/or latency thresholds (or otherwise setting or modifying specific limits or parameters for capacity, bandwidth, and latency) that act as reference points or benchmarks that dictate how resources are allocated and managed within the network. For example, the processor may increase the bandwidth allocation for an ECN that is managing a sudden surge in video conferencing traffic during peak business hours. Such an adjustment may help ensure that the video conferencing application receives enough bandwidth to maintain high-quality video and audio streams without lag. As another example, the processor may increase the processing capacity of the ECN to handle the increased data flow (e.g., during peak activity periods such as rush hour, etc.) in response to determining that the ECN is tasked with processing real-time data from an array of IoT devices. As yet another example, the processor may prioritize and reconfigure network paths to reduce latency for tasks that require low latency. These dynamic adjustments may help ensure that the network resources are optimally utilized, that the performance requirements of different applications are met, that efficient and uninterrupted service delivery is maintained across the vEEC system, etc.

In some embodiments, dynamically scaling network resources in block 1908 may include updating the resource allocations in real-time. For example, the processor may detect an increase in demand for video streaming services in a residential area managed by the ECN (e.g., due to a popular event being broadcast, etc.). In response, the processor may immediately allocate additional bandwidth and processing power to the ECNs handling this area (or redistribute resources from less critical tasks or other ECNs, etc.) to help ensure that users do not experience any degradation in streaming quality. These adjustments may be performed in real-time, allowing the system to adapt swiftly to the changing demands.

In block 1910, the processor may resolve network congestion by redistributing tasks among ECNs based on network traffic analysis. For example, the processor may detect a bottleneck in data flow within a segment of a surveillance system due to multiple high-definition video feeds being processed simultaneously. To alleviate this congestion, the processor may redistribute some of the video processing tasks to adjacent ECNs that are currently underutilized, thereby balancing the load across the network and ensuring smooth video analysis. As another example, the processor may reroute some data processing tasks to other ECNs with more available capacity in response to determining that a group or cluster of ECNs in a healthcare network is experiencing heavy traffic due to numerous connected medical devices simultaneously sending patient data. This redistribution may ease the burden on the congested ECNs and prevent potential delays in critical data processing (e.g., real-time monitoring of patient vitals, etc.).

In some embodiments, resolving the network congestion in block 1910 may include adjusting routing paths to alleviate traffic load. For example, the processor may identify a bottleneck in the data flow within an ECN network that manages communication between various smart devices in a home automation system. In response, the processor may reroute some of the data traffic through less congested paths to distribute the load more evenly across the network. Such rerouting may include prioritizing critical data (e.g., security alerts, etc.) over less urgent data (e.g., routine temperature readings, etc.). As another example, the processor could detect a congestion point impacting the timely delivery of critical health data in a hospital network in which multiple devices continuously transmit patient data. In response, the processor may adjust the routing paths within the ECN network (e.g., by creating dedicated paths or tunnels for high-priority data, etc.) to help ensure that vital patient information is transmitted efficiently without delay.

In block 1912, the processor may enable failover to cloud resources for ECNs that face resource limitations. For example, the processor may recognize when an ECN responsible for processing data from a network of traffic sensors is nearing its computational capacity. In response, the processor may automatically initiate a failover procedure that offloads some of the data processing tasks to cloud-based servers to prevent the ECN from becoming overwhelmed and potentially failing and/or to ensure that traffic data analysis continues uninterrupted. As another example, the processor may temporarily redirect some transaction processing to the cloud during peak times in a retail environment in response to determining that an ECN handling customer transaction data is overloaded. By implementing such failover strategies, the processor may help ensure continuous operation and reliability of the vEEC system even when individual ECNs encounter resource constraints.

In some embodiments, the processor may enable failover to cloud resources in block 1912 by initiating failover protocols and redirecting tasks with minimal service disruption. For example, the processor may detect that an ECN that is tasked with processing real-time data from a network of urban traffic sensors is overwhelmed due to an unusually high volume of data during a major event. In response, the processor may activate failover protocols to seamlessly transfer some of the data processing workload to cloud servers in such a way that the real-time analysis of data continues without interruption. As another example, in response to determining that the local ECN handling customer transactions is nearing its capacity limit (e.g., due to a surge in online shopping activity, etc.), the processor may quickly redirect additional transaction processing tasks to the cloud. By redirecting tasks, the processor may balance the workload, prevent slowdowns or crashes in the transaction processing, and maintain a smooth and efficient customer experience.

In block 1914, the processor may offload computational tasks from edge devices with limited resources to more powerful servers or ECNs. For example, the processor may identify a scenario in which an edge device in a retail store is tasked with analyzing large volumes of customer data for real-time personalized marketing. Since edge device may struggle to perform this analysis due to resource constraints, the processor may offload the data analytics task to a more powerful ECN or a cloud server with greater computational capabilities. Such offloading may help ensure that the analysis is completed promptly and/or enable the store to offer real-time personalized promotions to customers. Similarly, if a network of sensors collecting environmental data is connected to an edge device with limited processing capacity, the processor might transfer the data aggregation and analysis tasks to a central ECN with superior processing capabilities to help ensure the timely and efficient processing of large datasets. These offloading operations may allow the vEEC system to improve resource utilization, maintain high performance, and ensure that computational demands are met even when individual edge devices face resource limitations.

In some embodiments, offloading the computational tasks in block 1914 may include balancing computational workloads across the network to enhance application capabilities. For example, the processor may identify an edge device in a retail store struggling to analyze customer data in real-time due to its limited processing power. In response, the processor may offload the data analytics task to a more powerful ECN or to a cloud server that has the necessary computational capabilities to handle such intensive tasks. Such redistribution may ease the workload on the constrained edge device and help ensure that the retail store may utilize real-time analytics for customer engagement effectively. In another example, the processor may transfer data aggregation and advanced analysis tasks to a central ECN equipped with better processing capabilities in response to determining that a network of sensors collecting environmental data is connected to an edge device with limited processing power. By offloading and balancing these tasks, the processor may improve resource utilization across the network and/or improve the overall performance and capabilities of the applications running on the edge devices.

In some embodiments, offloading the computational tasks in block 1914 may include migrating the computational tasks based on latency and performance characteristics. For example, the processor may detect that an edge device monitoring urban traffic flow is unable to process data quickly enough to provide real-time traffic updates, leading to increased latency. In response, the processor may shift some of the data processing to a central ECN that has higher processing capabilities and is strategically located to minimize latency.

In block 1916, the processor may continuously monitor network performance and resource utilization for adjustments. For example, the processor may track the real-time data throughput and latency across the ECN network in a smart manufacturing plant. The processor may dynamically allocate additional bandwidth or computing resources to affected ECN in response to detecting increased latency or reduced throughput that could affect the timely execution of manufacturing processes. As another example, the processor may proactively transfer older data to cloud storage or other ECNs with more available space in response to determining that certain ECNs are nearing their storage capacity.

In block 1918, the processor may refine resource allocation models and system configuration based on feedback and performance metrics. For example, the processor may analyze the data from a network of urban traffic sensors and adjust the allocation models to better handle peak hour traffic flows. The processor may modify the system configuration to prioritize intersections that are consistently experiencing data processing delays during rush hour based on the feedback data. As another example, the processor may receive performance metrics indicating that an ECN in a hospital network responsible for processing patient monitoring data is underutilized at night. In response, the processor may modify the resource allocation model to divert some resources from this ECN to other more active nodes during those hours. This process of continuously refining the allocation models and configurations based on real-world performance feedback may help ensure that the vEEC system remains efficient, responsive, and adaptable to changing demands and conditions.

In some embodiments, as part of the operations in any or all of blocks 1902-1918, the processor may implement artificial intelligence or machine learning algorithms for predictive analysis and proactive system adjustments. For example, the processor may analyze patterns in network traffic and resource utilization using machine learning models to predict future network load, and proactively adjust resource allocation to prevent potential bottlenecks. These AI and machine learning implementations may allow the ECN processor to anticipate future scenarios and make any necessary adjustments ahead of time to enhance overall system efficiency and reliability.

As discussed above, in some embodiments the processor may be configured to initialize the vEEC system. In some embodiments, initializing the vEEC system may include initializing a vEEC server to function as the master server in accordance with predefined service policies. These operations may also include determining the location of the vEEC server (which may be located in the cloud, on-premise, outside the cloud environment, etc.), loading service policies, determining the role of the vEEC server, determining whether a device will operate as a master server or a subordinate agent, identifying and associating vEEC agents with their respective ECNs and edge devices, associating several vEEC agents with ECNs and EDs, establishing communication protocols between the vEEC server and these agents, etc.

The vEEC server may also monitor the network performance and resource utilization of all connected ECNs. This monitoring allows for the proactive management of network resources and performance optimization. In scenarios where connectivity is lost, the system may reassign the master server role to the most suitable ECN. This reassignment may be an important failover mechanism ensuring continuous network operation. The vEEC server may maintain its role as the current master server until the originally designated master server rejoins and demonstrates stability for a predetermined period.

FIG. 20 is a process flow diagram illustrating a method 2000 for managing a vEEC system in accordance with some embodiments. Method 2000 may be performed by a processor or processing system in computing system.

In block 2002, the processor may initialize a vEEC server within a network. For example, the processor may initialize the vEEC server to manage data processing and network tasks closer to the source of data generation, which may help reduce latency, manage bandwidth more efficiently, and enhance data security. For example, the processor may activate software on the ECN that configures it as a vEEC server to that it may handle local data processing for the devices in the system.

In block 2004, the processor may determine the location and/or an operational environment of the vEEC server and configure the vEEC server based on its location or operational environment (e.g., cloud, on-premise, external, etc.). The processor may also determine the vEEC server's operational environment, such as by assessing network connectivity, resource availability, and geographical location. In some embodiments, the processor may be configured to determine the operational environment of the vEEC server by determining whether the vEEC server is an on-premise vEEC server, an off-premise cloud-based vEEC server, or off-premise vEEC server that is outside the cloud.

In some embodiments, the processor may determine the location and/or an operational environment of the vEEC server based on network connectivity parameters and resource availability. If the server is identified as cloud-based, the processor may focus on maximizing its capabilities for remote data processing and storage, which may help ensure seamless cloud integration and robust data security measures.

On the other hand, if the vEEC server is located on-premise, the processor may prioritize local network integration and low-latency operations essential for real-time data processing. The processor may configure the server with more emphasis on local network protocols and direct communication lines with onsite ECNs and edge devices, ensuring efficient local data processing and quick response times. In an external or hybrid setting in which the vEEC server operates outside the traditional on-premise or cloud environments, the processor may implement a blend of configurations. This could include establishing secure connections to both the local network and cloud services to help ensure the server may handle diverse data streams and processing tasks while maintaining consistent communication with various network nodes. The processor's configuration of the vEEC server based on its location may directly influence the server's efficiency, responsiveness, and/or overall contribution to the edge computing network. The ability to tailor the server's setup according to its operational environment may help ensure that it may meet the specific demands and challenges of different computing contexts.

In block 2006, the processor may determine the role of the vEEC server as a master server or a subordinate agent based on service policies. For example, the processor may analyze network topology and service requirements to designate a server with robust computing resources as the master server that is responsible for coordinating network activities and managing subordinate agents.

In some embodiments, the processor may be configured to determine the role of the vEEC server by determining whether the vEEC server is a vEEC master or a subordinate vEEC agent. The vEEC master role may include overseeing network operations, managing resource allocation, and orchestrating interactions between various ECNs and edge devices.

In some embodiments, the assignment of roles may be based on optimizing network performance and ensuring efficient distribution of computational tasks. For example, the processor may analyze networks service policies that include rules and criteria for role assignments based on the server capabilities, network architecture, and specific application requirements. If the vEEC server possesses high processing power, extensive memory capacity, and is centrally located within the network, the processor may designate it as a master server.

In some embodiments, the processor may assign the role of a subordinate agent in response to determining that the vEEC server has more limited resources or is situated at a network periphery. This role typically involves handling more localized or specialized tasks, under the guidance of a master server. The subordinate agent may focus on specific application processing or data handling tasks, relaying critical information back to the master server for broader network management. The determination may be based on ensuring that each server within the network is utilized in a manner that maximizes its strengths and compensates for its limitations. By assigning roles based on service policies and server capabilities, the processor may help create a balanced and efficient network in which tasks are appropriately distributed and servers operate in roles that align with their functional capacities.

In block 2008, the processor may associate vEEC agents with ECNs and edge devices within the network. For example, the processor may map each vEEC agent to specific ECNs and edge devices based on factors such as their geographical location, processing capabilities, and the nature of the tasks they typically handle. As another example, in a scenario in which an ECN is responsible for processing large volumes of data from IoT devices, the processor might associate it with a vEEC agent specialized in handling high data throughput and real-time analytics. This association may help ensure that the ECN is managed by an agent equipped to handle its specific workload and operational requirements.

As yet another example, the processor may assign vEEC agents adept at managing fast response times and high-speed data processing for a system in which the edge devices are primarily used for low-latency applications (e.g., autonomous control systems, etc.). This targeted association may allow for a more nuanced management of vEEC devices and/or help ensure that the vEEC devices operate efficiently and in alignment with the network's overall objectives.

In block 2010, the processor may establish communication protocols between the vEEC server and the vEEC agents. For example, the processor may implement secure MQTT protocols for IoT devices communicating with the vEEC server, ensuring encrypted data transmission and authentication. In some embodiments, establishing communication protocols may include configuring network routes, encryption standards, and/or authentication mechanisms. For example, the processor may configure network routes to facilitate direct and efficient data transmission paths between the vEEC server and its associated agents, which may in turn reduce latency and ensure quick response (especially in applications that rely on real-time data processing). The processor may also implement robust encryption standards to secure the communication channels, set up authentication mechanisms to verify the identity of the vEEC agents communicating with the server, and tailor the communication protocols to accommodate the specific requirements of different edge devices and applications. For example, in a scenario involving a large number of IoT devices with varying data transmission needs, the processor may establish a combination of communication protocols (e.g., MQTT for devices requiring minimal bandwidth and HTTP for those engaged in more complex interactions). By establishing these communication protocols, the processor may help ensure that the vEEC server and its agents may communicate, collaborate, and operate in an efficient, secure, and harmonized manner.

In block 2012, the processor may continuously monitor network performance and resource utilization across ECNs. For example, the processor may track bandwidth usage, processor load, and memory utilization in real-time to preemptively address performance issues and redistribute loads as needed. As another example, the processor may execute a variety of monitoring tools to track key performance indicators such as bandwidth usage, latency, packet loss, and overall data throughput on each ECN. The processor may assess whether each node is performing optimally or if there are bottlenecks affecting data flow, examine resource utilization, monitor how much CPU, memory, and storage each ECN is using, etc. In scenarios where an ECN is nearing its capacity limits, the processor may proactively manage resources, such as by reallocating tasks to less burdened nodes or by scaling up resources where possible. This preemptive approach may be particularly important in edge computing environments in which workload demands fluctuate rapidly.

In block 2014, the processor may dynamically reassign the vEEC master role to another ECN based on a result of monitoring the connectivity and resources of ECNs. For example, the processor may shift the master role to a different ECN if the current master experiences a significant drop in connectivity or processing power, ensuring uninterrupted network management. As such, in some embodiments, dynamically reassigning the master server role may include evaluating the resource availability, network connectivity, and operational stability of each ECN. For example, the processor may reassign the vEEC master role to another ECN in response to detecting a connectivity loss.

In block 2016, the processor may maintain the current master server role until stability is demonstrated for a predetermined period. For example, the processor may determine to keep a newly assigned master server in its role for a minimum of one week, monitoring its performance and stability. During this period, the processor may evaluate factors such as network latency, data throughput, and error rates. If the server maintains optimal performance throughout this period, it confirms the suitability of the server in the master role, contributing to the overall stability and efficiency of the vEEC system.

In block 2016, the processor previously serving as a master server role may evaluate for a period of time factors such as network latency, data throughput and error rates. If the server that was previously a master server maintains optimal performance throughout this period, it confirms the suitability of the server in the master role. If the previous master server is better suited as a master server the previous master server will resume its role a master server. If the existing master server can serve the vEEC network the same or better it will remain as the master server contributing to the overall stability and efficiency of the vEEC system.

In some embodiments, the processor may also dynamically scale network resources based on current demands and performance metrics, redistribute tasks among ECNs to address network congestion and prioritize operations, implement failover to cloud resources (to transfer tasks to cloud resources in case of resource limitations at the ECN level, etc.), enhance application capabilities on edge devices with limited resources through compute distribution schemes, identify tasks that may be more efficiently processed by the servers, offload tasks from edge devices to more powerful servers for improved efficiency, standardize configurations within groups/clusters and implement a hybrid orchestration scheme for network management, and/or use artificial intelligence and machine learning algorithms for predictive analysis, proactive system adjustments, and to enhance network operations, enforce QoS and policies, and manage network slicing, etc.

FIG. 21 is a process flow diagram illustrating a method 2100 for managing services and applications in a vEEC system in accordance with some embodiments. Method 2100 may be performed by a processor or processing system in computing system.

In block 2102, the processor may initialize the vEEC system and load operational configurations and service policies. For example, the processor may initialize a vEEC system in a transportation infrastructure system and load configurations to manage traffic flow and public safety applications according to local governmental policies. In some embodiments, the service policies may include various rules and guidelines designed to optimize network performance, ensure security, and align the network's operations with specific organizational or regulatory requirements. In some embodiments, these policies may vary widely depending on the specific use case and objectives of the vEEC system. In various embodiments, the service policies may include data privacy and security policies, traffic prioritization policies (e.g., rules for prioritizing certain types of network traffic to maintain QoS, etc.) bandwidth allocation policies, resource utilization and scaling policies, data retention and archiving policies, disaster recovery and failover policies, service-level agreement (SLA) compliance policies, energy consumption policies, access control policies, monitoring and reporting policies, content filtering and censorship policies, and compliance with local and international regulation policies.

In block 2104, the processor may implement and enforce Quality of Service (QOS) parameters in accordance with the service policies. For example, the processor may implement QoS parameters by configuring network switches and routers to prioritize certain types of packets (e.g., VOIP or streaming data, etc.) using techniques such as packet inspection and bandwidth reservation. In some embodiments, the processor might implement QoS parameters to prioritize communications, such as to prioritize gold service members over silver service members, to prioritize corporate employee communications over regular data traffic, to prioritize government communications over civilian data traffic, to prioritize critical healthcare data over administrative traffic, etc.

In block 2106, the processor may continuously monitor and evaluate the utilization of network resources including computing power, cloud services, storage, networking, and security. For example, the processor may utilize specialized monitoring software in an ECN to track resource utilization metrics such as CPU and memory usage, network throughput, and storage capacity, while also analyzing network traffic patterns using deep packet inspection for data transfer efficiency and latency reduction. As a further example, the processor may monitor a hospital's network to evaluate the use of computing power and storage, adjusting for optimal handling of patient data and telemedicine services. In some embodiments, the processor may also analyze traffic patterns for enhanced data transfer efficiency and latency reduction.

In block 2108, the processor may dynamically scale network resources (e.g., computing power, storage, bandwidth, etc.) based on the assessment of capacity, bandwidth, and latency. In some embodiments, dynamically scaling the network resource allocations in block 2108 may include dynamically increasing or decreasing the network resources in real-time based on current network demands. Said another way, in some embodiments, dynamic scaling of network resources may include adjusting computing and storage resources, bandwidth allocation, and security measures. In some embodiments, the processor may implement dynamic resource scaling by interfacing with virtualization software within an ECN, automatically provisioning or de-provisioning virtual machine resources based on real-time analysis of network capacity, bandwidth demands, and latency metrics.

In block 2110, the processor may transfer tasks from ECNs to cloud resources in case of resource limitations at the ECN level. In some embodiments, transferring tasks from ECNs in the vEEC system to cloud resources in response to detecting resource limitations at the ECN level may include transferring tasks from ECNs in the vEEC system to cloud resources in response to determining that local resources in the ECNs have reach their limits or are insufficient to handle the current load. In some embodiments, the processor may initiate task migration protocols in an ECN, automatically transferring certain computational tasks to cloud resources when local resource thresholds are exceeded. The processor may ensure continuity and efficiency of operations via cloud integration services. As another example, the processor may transfer data processing tasks from local retail store servers to cloud resources during peak shopping hours to prevent system overload. In some embodiments, transferring tasks to cloud resources may include automating the transition and synchronization between ECN and cloud resources.

In block 2112, the processor may detect network congestion and redistribute tasks and network loads among ECNs to alleviate congestion. For example, the processor may redistribute data processing tasks among surveillance cameras to prevent overloading any single device in the surveillance network during high-activity events. In some embodiments, redistributing the tasks and network loads among the ECNs in the vEEC system in response to detecting network congestion may include redistributing the tasks so as to balance the load across the network and prevent any single ECN in the vEEC system from becoming a bottleneck. In some embodiments, the processor may deploy load balancing algorithms to redistribute network traffic and computational tasks among available nodes, using real-time traffic analysis and predictive modeling to prevent or alleviate network congestion.

In block 2114, the processor may offload tasks from edge devices to more powerful servers within the network or cloud servers as needed. For example, in response to high computational demands, the processor may activate task offloading mechanisms in an ECN to redirect certain tasks from edge devices to more powerful servers within the network or to cloud-based resources based on current load and processing capabilities. As another example, the processor might offload data analysis tasks from traffic sensors to more powerful central servers during rush hours for more efficient processing.

In block 2116, the processor may facilitate the movement of resources across the network. For example, the processor may orchestrate the distribution of network resources such as bandwidth and storage across different ECNs and edge devices using resource management protocols and automated policy enforcement to improve network efficiency and performance. As another example, the processor may facilitate the reallocation of storage resources between different departments within a large corporation to improve network efficiency.

In some embodiments, orchestrating the distribution of network resources across different ECNs and edge devices in block 2116 may include managing the distribution and reallocation of resources including bandwidth and storage among various network components in the vEEC system. In some embodiments, orchestrating the distribution of network resources across different ECNs and edge devices may include allocating network resources in a manner that increases overall network performance, reduces latency, and supports the continuity and reliability of services delivered by the vEEC system. In some embodiments, orchestrating the distribution of network resources across different ECNs and edge devices may include implementing a resource management protocol, identifying and assessing the resource capacities and demands of each ECN and edge device within the vEEC system, determining a preferred allocation of network resources based on current and predicted usage patterns, making real-time adjustments to resource distribution in response to changing network conditions, and maintaining compliance with predefined service level agreements (SLAs) and regulatory requirements.

In block 2118, the processor may manage failover and recovery processes for ECNs. For example, the processor may manage failover processes by continuously monitoring network health indicators in an ECN. In response to detecting a failure, the processor may automatically reroute traffic and services to pre-configured backup systems to maintain operational continuity. In some embodiments, managing failover and recovery processes may include implementing a robust failover system and automating the recovery process to minimize service disruptions.

In block 2120, the processor may continuously monitor network performance and adjust QoS, resource allocations, and task distributions based on real-time data. For example, the processor may continuously analyze network performance metrics (e.g., latency, packet loss, throughput, etc.) in an ECN and adjust QoS settings, reallocate resources, and redistribute tasks based on this real-time data. In some embodiments, adjusting the QoS, the resource allocations, and the task distributions based on the real-time data collected from monitoring the network performance may include implementing an adaptive control algorithm within the processor that analyzes the monitored data, including but not limited to, metrics such as network traffic volume, latency, packet loss, throughput, and resource utilization rates, automatically modify the QoS settings to prioritize critical services, reallocating resources such as bandwidth and processing power to high-demand components, and redistributing tasks among the ECNs and cloud resources to optimize network efficiency. The adjustment process may be continuous and dynamic, allowing the vEEC system to respond promptly to fluctuating network conditions and maintain optimal performance.

In some embodiments the processor may use predictive analytics to forecast future network demands and preemptively adjust the network configurations to avoid potential performance degradation. In some embodiments, the monitoring and adjustment of the network in block 2120 may include implementing and using feedback mechanisms to refine and optimize network performance. In some embodiments, the processor may also use predictive analytics to foresee potential network issues and preemptively adjust network configurations.

FIG. 22 is a process flow diagram illustrating a method 2200 for managing an edge computing system in accordance with some embodiments. Method 2200 may be performed by a processor or processing system in computing system.

In block 2202, the processor may initialize the edge computing system, including edge devices (EDs), edge computing nodes (ECNs), and cloud servers. For example, the processor may execute initialization scripts to boot up edge devices, establish network connections for ECNs, and set up communication links with cloud servers. The processor may set up the foundational infrastructure of the edge computing system and ensure all components are operational and interconnected.

In block 2204, the processor may configure network parameters for the edge computing system, including setting up trusted domains and security protocols. For example, the processor may deploy SSL/TLS protocols across the network to establish trusted domains for secure data sharing. In some embodiments, the processor may also implement secure communication protocols within trusted domains to facilitate efficient data sharing. By configuring network parameters, the processor may optimize the performance of the edge computing system. Trusted domains may allow for efficient data flow between verified and reliable nodes, reducing latency and improving response times. Security protocols, while ensuring data protection, also need to be optimized to not overly burden the network with heavy processing demands. In addition, edge computing environments often involve a variety of devices and platforms. Setting up trusted domains and security protocols may help ensure that these diverse components may interact seamlessly and securely. This configuration is also more scalable and may adapt as the network grows or changes.

In block 2206, the processor may offload components of a software application from a user's computing device to one or more EDs, ECNs, or cloud servers based on resource availability, network latency, and application requirements. In some embodiments, processor may use load balancing techniques to redistribute computational tasks from a vEES device to the most suitable ECNs or cloud servers based on current network conditions and resource availability. In some embodiments, offloading components of a software application may include determining the most appropriate destination node (e.g., ECN, etc.) for each component based on a set of predetermined criteria.

In block 2208, the processor may establish a computing mesh for sharing hardware and software resources among multiple devices in the network. In some embodiments, the processor may implement a virtualized network overlay that interconnects different EDs and ECNs, allowing them to share computational and storage resources seamlessly. In some embodiments, establishing a computing mesh may include interconnecting the resources of each ED and ECN to create a shared, accessible network of resources.

In block 2210, the processor may continuously monitor workloads, computation capacities, and performance requirements of each ED and ECN. For example, the processor may continuously run performance monitoring tools to track and analyze CPU usage, memory consumption, and network throughput of each ED and ECN. The continuous monitoring may help in identifying bottlenecks and performance issues and/or allow for proactive maintenance and optimization of the network.

In block 2212, the processor may dynamically allocate and use resources of the edge devices based on the monitored data. For example, the processor may use real-time data to dynamically adjust the allocation of resources such as processing power and storage among edge devices to meet varying workload demands. In some embodiments, dynamically allocating and utilizing resources of the edge devices may include optimizing for performance efficiency based on the current needs and capabilities of each device.

In block 2214, the processor may manage trusted domains or groupings within the network to facilitate secure and efficient data sharing among devices without cumbersome verification or authentication procedures. For example, the processor may configure network policies that establish and manage trusted domains, simplify the process of secure data exchange, and reduce the need for repetitive authentication.

In block 2216, the processor may enable communication and data sharing among ECNs across different groups or geographical locations. For example, the processor may implement advanced routing protocols and encryption standards to enable secure and efficient data sharing among ECNs across different geographical locations. In some embodiments, the processor may maintain data security and integrity across different network segments to enable or better support communication and data sharing among ECNs across different groups or locations.

In block 2218, the processor may assign specific network resource slices to different network segments, including UCs, SEs, SCs, or MSCs. For example, the processor may use network slicing techniques to allocate specific bandwidth and computing resources to different network segments.

In block 2220, the processor may implement network segmentation, applicable to either the entire network or specific subsections thereof. For example, the processor may implement VLANs or virtual networks, segmenting the network to optimize traffic flow, enhance security, and improve resource management. In some embodiments, implementing network segmentation may include managing segments to optimize network performance, resource utilization, and security.

In block 2222, the processor may adjust network configurations, resource allocations, and/or offloading strategies based on real-time performance data and changing requirements. For example, the processor may use adaptive algorithms to adjust network configurations and resource allocations in response to real-time performance metrics and evolving network requirements. In some embodiments, the processor may be further configured to collect feedback from the system to continuously refine and enhance the system configurations and operational strategies.

FIG. 23 is a process flow diagram illustrating a method 2300 for managing communication in a vEEC system using MQTT in accordance with some embodiments. Method 2300 may be performed by a processor or processing system in computing system.

In block 2302, the processor may initialize the vEEC system, including a vEEC server and Edge Computing Nodes (ECNs). For example, the processor may execute boot-up protocols to start the vEEC server and activate each ECN, loading specific configurations such as network settings and operational parameters tailored to the edge computing environment. In some embodiments, initializing the vEEC system may include loading configurations and settings specific to the edge computing environment.

In block 2304, the processor may add or integrate an MQTT server into the vEEC system. For example, the processor may integrate an MQTT server into the vEEC system by installing MQTT broker software and configuring it as the central hub for message communication. In some embodiments, integrating the MQTT server may include setting up the server as the central communication hub for the vEEC system. That is, adding an MQTT server may centralize communication and facilitate efficient data exchange and command propagation within the vEEC system.

In block 2306, the processor may configure MQTT topics and quality of service levels appropriate for the vEEC system. For example, the processor may configure MQTT topics and QoS levels by setting up topic hierarchies and defining message delivery requirements in the MQTT broker settings. Configuring MQTT topics and QoS levels in block 2306 may ensure that messages are organized and delivered according to the specific needs and priorities of the vEEC system.

In block 2308, the processor may implement a procedure for ECNs to join the MQTT server and subscribe to relevant MQTT topics. In addition to allowing ECNs to join the MQTT server by configuring network settings and security credentials, the processor may also facilitate a dynamic subscription model. The dynamic subscription model may enable ECNs to manage their subscriptions to topics based on their operational roles and/or may allow for flexible interaction patterns. For example, an agent may subscribe to multiple masters or a master may coordinate with several agents, even those governed by a different master within the vEEC system. In some embodiments, the processor may also be configured to manage the subscriptions of ECNs to MQTT topics based on their functional roles within the vEEC system.

In block 2310, the processor may establish communication between vEEC agents on ECNs and the vEEC master/server through the MQTT server (utilizing publish and subscribe mechanisms, etc.). For example, the processor may set up data exchange protocols and command issuance procedures via MQTT. This setup facilitates versatile communication pathways in which vEEC agents on ECNs may publish data to and subscribe to data from multiple vEEC masters/servers. Moreover, it may allow a vEEC master to effectively communicate with several agents, including those under the control of another vEEC master, thereby enhancing the system's interoperability and coordination capabilities In some embodiments, establishing communications in block 2310 may include setting up data exchange protocols and command issuance procedures via MQTT.

In block 2312, the processor may configure the network architecture. In some embodiments, the processor may execute algorithms, protocols, and configurations that collectively define the network architecture and configure the system to reduce or minimize hierarchical layers so as to allow direct and efficient data flow between ECNs and the vEEC server. In some embodiments, the processor may reduce or minimize the hierarchical layers by using any combination of flat topology design, network virtualization, optimized routing, edge computing principles, direct connect technologies, and software-defined networking. In some embodiments, the processor may configure the network to be scalable and flat so as to improve or optimizing data flow between ECNs and the vEEC server. A scalable and flat network architecture may improve data transmission efficiency, reduce latency, and enhance the overall system performance.

In block 2314, the processor may dynamically manage MQTT topics to reflect the operational needs and changes within the vEEC system. In some embodiments, dynamically managing MQTT topics may include allowing ECNs to subscribe or unsubscribe from topics as required by their changing operational contexts. For example, the processor may dynamically adjust MQTT topic subscriptions to allow ECNs to subscribe or unsubscribe as their operational roles or data requirements change.

In block 2316, the processor may process incoming messages from ECNs efficiently on the vEEC server. In some embodiments, the processor may improve or optimize message processing algorithms on the vEEC server to handle high volumes of incoming data from ECNs.

In block 2318, the processor may implement or incorporate fault tolerance mechanisms within the MQTT server to handle network failures. For example, the processor may implement redundancy and automatic reconnection protocols within the MQTT server to maintain communication continuity in case of network disruption. In some embodiments, incorporating fault tolerance mechanisms may include configuring the MQTT server to handle disconnections and reconnections of ECNs.

In block 2320, the processor may implement load balancing strategies (e.g., distributing message handling across multiple broker instances, etc.) across the MQTT-based network. Such load balancing operations may load balancing prevents any single point from becoming overwhelmed.

In block 2322, the processor may enforce security measures for MQTT communication, including encryption and client authentication. For example, the processor may enforce security in MQTT communication by implementing SSL/TLS encryption for data transmission and requiring client authentication for access control.

In block 2324, the processor may continuously monitor and maintain the health and performance of the MQTT server and the vEEC system. For example, the processor may continuously run diagnostic tools to monitor the health of the MQTT server and the vEEC system. In some embodiments, the processor may also regularly update the security protocols to safeguard against potential vulnerabilities in MQTT communication.

FIG. 24 is a process flow diagram illustrating a method 2400 for managing a vEEC system with an orchestrator in accordance with some embodiments. Method 2400 may be performed by a processor or processing system in computing system.

In block 2402, the processor may integrate a hybrid data center model that combines cloud and edge computing facilities. For example, the processor may deploy middleware that enables communication and data synchronization between cloud-based servers and local edge computing nodes and/or use virtualization technologies to create instances that operate both in the cloud and on edge devices. In some embodiments, integrating the hybrid data center model may include creating a cohesive computing environment that facilitates seamless data and task transfer between cloud and edge components.

In block 2404, the processor may implement a hybrid orchestration scheme that integrates public and private cloud resources with on-premises deployments and maintains consistent security across the network. In some embodiments, the hybrid orchestration scheme may include real-time monitoring and dynamic allocation of resources based on current system demands and operational contexts. In some embodiments, the processor may accomplish this by implementing any of all of the advanced network orchestration techniques discussed in this application to dynamically allocate resources and manage workloads based on resource requirements, computational needs, etc.

In block 2406, the processor may configure the orchestrator to offload computational tasks from edge devices to more powerful servers located in diverse locations. For example, the processor may detect resource-intensive tasks at the edge and automatically reroute them to cloud servers or central data centers with higher processing capabilities so that the edge devices are not overwhelmed and may maintain optimal performance for local tasks. In some embodiments, the orchestrator may be further configured to perform application/container distribution methods for the efficient distribution of applications or containers across the network. This may include the processor using container orchestration tools such as Kubernetes to deploy and manage containers across different servers. In some embodiments, the processor may be further configured to manage the lifecycle of containers and applications within the network, including automated deployment, configuration, and scaling. In some embodiments, the processor may accomplish this by using an integrated management system that utilizes AI-driven analytics to predict workload patterns, adjust resource allocation, and manage container health.

In block 2408, the processor may allocate, activate, allow, or enable resource redistribution among ECNs in a heterogeneous environment to balance loads across multiple nodes. For example, the processor may implement dynamic resource allocation algorithms that continuously assess the workload and performance of each ECN and redistribute tasks such as data processing or storage to underutilized nodes. This ensures that no single node is overwhelmed, while others are idle, leading to more efficient overall network operation. As another example, the processor may implement and use a predictive analytics system that anticipates future load spikes based on historical data and real-time inputs. The processor may preemptively reallocate resources, such as CPU cycles, memory, and bandwidth, to ECNs that are predicted to experience increased demand.

In block 2410, the processor may manage resource-related congestion by enabling failover to cloud resources for ECNs facing resource limitations. For example, the processor may monitor the resource usage of each ECN, and in response to detecting that an ECN is nearing its capacity limits, automatically initiate a failover process that reroutes excess workload to cloud servers. In some embodiments, managing resource-related congestion may include implementing algorithms for automatic detection of congestion points and subsequent reallocation of resource. For example, the processor may use machine learning algorithms to analyze traffic patterns, resource utilization, and performance metrics across the network. The processor may redistribute tasks either to other underutilized ECNs or to the cloud in response to identifying potential or actual congestion points.

In block 2412, the processor may integrate infrastructure components distributed across different geographical locations and platforms into a unified network. For example, the processor may establish secure VPN connections or use advanced networking protocols to link disparate data centers, edge computing nodes, and cloud platforms, creating a seamless network fabric that spans multiple locations. As another example, the processor may implement SDN and NFV technologies to abstract and centralize network control functions. The processor may manage and orchestrate network traffic and services across different geographical locations from a central point, ensuring consistent policy enforcement, network optimization, and efficient traffic management across the integrated network infrastructure.

In block 2414, the processor may implement a distributed scheme of resource sharing among different ECN groups. For example, the processor may use a decentralized resource management system in which each ECN group has autonomous control over its resources while also being able to lend or borrow resources from other groups based on demand and availability. In some embodiments, the processor may also implement a central vEEC master to facilitate communication and coordination among different ECN groups to enable inter-group communication. The vEEC master may act as a mediator and overseer for resource sharing and maintain an overview of the resource status of each ECN group. The vEEC master may coordinate the distribution of resources. This central coordination may enable a more organized and systematic approach to resource sharing and/or help ensure that resource allocation decisions are made based on the needs and capacities of the entire network rather than individual ECN groups.

In block 2416, the processor may assign network assets, deploy and configure applications, and enforce QoS and policies. For example, the processor may allocate specific network resources such as bandwidth, processing power, and storage to different applications based on their priority and requirements. The processor may then deploy these applications on appropriate ECNs or cloud servers. In addition, the processor may enforce QoS policies by prioritizing network traffic, ensuring that critical applications receive the necessary resources to maintain high performance and reliability.

In block 2418, the processor may support different types of edge computing tiers and the types of applications that may be supported in each tier. For example, the processor may categorize ECNs into tiers based on their computational capabilities and latency requirements. The processor may assign lightweight, latency-sensitive applications to lower-tier nodes and more resource-intensive applications to higher-tier nodes.

In block 2420, the processor may dynamically adjust the orchestrator to changing network conditions and ensuring failover and recovery resiliency. For example, to maintain service continuity, the processor may continuously monitor network health and performance metrics and trigger failover procedures to backup systems when a potential issue is detected.

In block 2422, the processor may enhance traffic delivery and support Bring Your Own (BYO) certified applications and network hardware. For example, the processor may implement flexible networking protocols and interfaces that accommodate a variety of third-party applications and hardware, enhance traffic routing, and ensure compatibility across diverse network components.

In block 2424, the processor may implement intent-based and predictive orchestration schemes using artificial intelligence (AI) and machine learning (ML). For example, the processor may deploy AI algorithms that analyze network usage patterns to predict future demands and automatically adjust resource allocation for optimal performance. In some embodiments, implementing AI/ML-based predictive orchestration schemes may include using AI/ML-based technologies to anticipate network needs and adjust resources and configurations proactively. For example, the processor may use machine learning models to predict traffic surges and preemptively scale up ECN resources to handle the increased load without compromising performance.

In block 2426, the processor may provide cluster classes, including user clusters (UC), single ECNs (SE), site clusters (SC), and multi-site clusters (MSC) in a tiered, layered fashion. For example, the processor may organize the network infrastructure into clusters that are tailored for specific operational scopes and resource requirements.

In block 2428, the processor may coordinate the offloading of applications or functions from one ECN to an alternative ECN in an external group, including defining routing paths for data packets and monitoring performance to ensure compliance with KPI targets. For example, the processor may analyze the workload and performance of each ECN. The processor may reroute certain tasks to less burdened nodes in different groups while ensuring that the data paths are enhanced for reduced or minimal latency and that the overall performance meets or exceeds predetermined KPIs.

Figure 25:
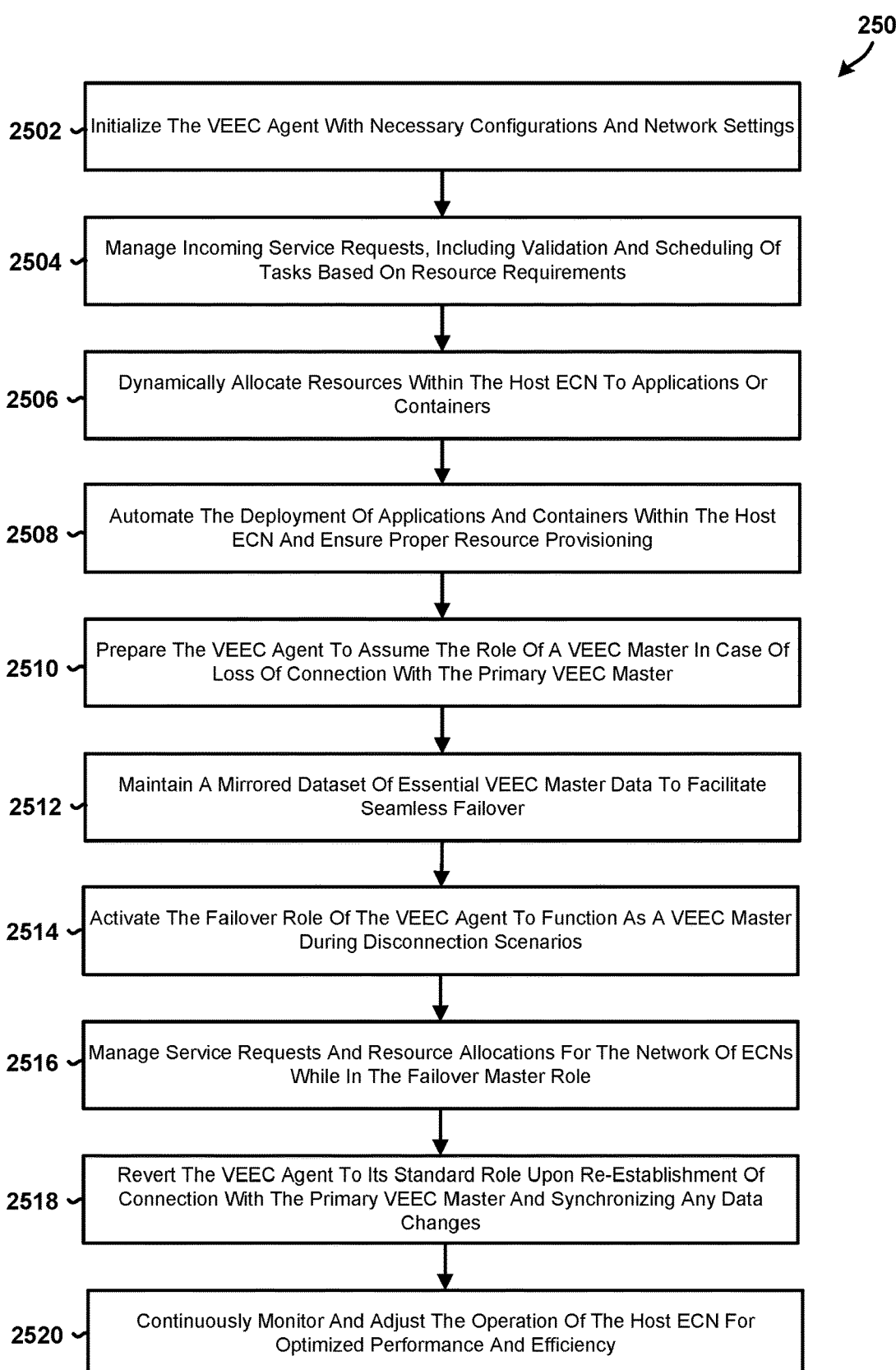
FIG. 25 is a process flow diagram illustrating a method for managing operations of a vEEC agent within a host ECN in accordance with some embodiments.

FIG. 25 is a process flow diagram illustrating a method 2500 for managing operations of a vEEC agent within a host ECN in accordance with some embodiments. Method 2500 may be performed by a processor or processing system in computing system.

In block 2502, the processor may initialize the vEEC agent with necessary configurations and network settings. In some embodiments, the processor may also implement detection mechanisms within the vEEC agent to identify a loss of connection with the primary vEEC master. For example, the processor may implement monitoring protocols to regularly check the connectivity status with the vEEC master (e.g., for quick detection of any disconnection or network issues, etc.).

In block 2504, the processor may manage incoming service requests, including validation and scheduling of tasks based on resource requirements. In some embodiments, these operations may include parsing each request to determine its resource footprint and aligning it with the available computing, storage, and network capacities within the host ECN.

In block 2506, the processor may dynamically allocate resources within the host ECN to applications or containers. For example, the orchestrator may continuously monitor system load and automatically adjust CPU, memory, and storage allocations in real-time.

In block 2508, the processor may automate the deployment of applications and containers within the host ECN, ensuring proper resource provisioning. For example, the processor may use container orchestration tools such as Kubernetes or Docker to manage the deployment, scaling, and networking of containers.

In block 2510, the processor may prepare the vEEC agent to assume the role of a vEEC master in case of loss of connection with the primary vEEC master. For example, the processor may activate standby capabilities in the vEEC agent so that it maintains an updated state of the network and is ready to take over master functions if needed.

In block 2512, the processor may maintain a mirrored dataset of essential vEEC master data to facilitate seamless failover. For example, the processor may regularly synchronize configuration data, network policies, and state information with the primary vEEC master.

In block 2514, the processor may activate the failover role of the vEEC agent to function as a vEEC master during disconnection scenarios. For example, the processor may switch the vEEC agent to master mode to take over network control and decision-making processes while maintaining network integrity and performance.

In block 2516, the processor may manage service requests and resource allocations for the network of ECNs while in the failover master role. For example, the processor may continue to handle incoming service requests, allocate resources to ECNs, and ensure uninterrupted service delivery across the network.

In block 2518, the processor may revert the vEEC agent to its standard role upon re-establishment of connection with the primary vEEC master and synchronizing any data changes. For example, the processor may oversee the transition of operational control back to the primary master and ensure that all changes and updates made during the failover are accurately communicated and integrated.

In block 2520, the processor may continuously monitor and adjust the operation of the host ECN for optimized performance and efficiency. For example, the processor may implement real-time analytics to assess the performance of the ECN and make adjustments to configurations and resource allocations as needed. In some embodiments, the processor may also establish a feedback mechanism to refine and update the vEEC agent's operational procedures based on operational data and user inputs, enabling continuous improvement of the system.

FIG. 26 is a process flow diagram illustrating a method 2600 for operating a network discovery module in a network management system in accordance with some embodiments. Method 2600 may be performed by a processor or processing system in computing system.

In block 2602, the processor may initialize the network discovery module within the network management system (NMS). For example, the processor may load and run network scanning software to identify devices connected to the network and gather relevant network information. In some embodiments, the processor may also implement security measures to protect the data collected by the network discovery module and ensure compliance with privacy standards. For example, the processor may encrypt the data collected during the discovery process and implement access controls to ensure that only authorized personnel may view or modify this information.

In block 2604, the processor may scan the network to detect connected devices and ECNs. In some embodiments, scanning the network may include using network protocols including SNMP, ARP, ICMP, and others to identify devices across different network segments. For example, the processor may execute a series of commands to send requests to devices on the network, using network protocols (e.g., SNMP, ARP, ICMP, etc.) to gather data such as IP addresses, device types, and connectivity status.

In block 2606, the processor may identify each detected device and ECN by retrieving their identification information including IP addresses, MAC addresses, device type, and other metadata. For example, the processor may parse the responses received from the network scan to extract and categorize the information. In some embodiments, the processor may create a detailed inventory of all connected devices.

In block 2608, the processor may create and update a map of the network topology to reflect the interconnections between detected devices and ECNs. In some embodiments, the processor may use software tools to generate a map information structure that identifies how each device is connected and the pathways data takes across the network. In some embodiments, the processor may generate a network topology map that provides a visualization of how devices and ECNs are interconnected within the network.

In block 2610, the processor may continuously monitor the network for changes in device connectivity and status, and dynamically update the network topology in the network management system. For example, the processor may run a background service that periodically scans the network, detects new devices, and updates the topology map accordingly. In some embodiments, dynamically updating the network topology may include updating the network topology map to reflect new devices joining, existing devices leaving, or changes in device connectivity status.

In block 2612, the processor may monitor the operational status of each identified device and ECN, including availability, health, and performance metrics. For example, the processor may utilize SNMP or similar protocols to query devices for their status and performance data (e.g., metrics such as uptime, CPU usage, network traffic, etc.). In some embodiments, monitoring the operational status of each device and ECN may include implementing alert mechanisms for significant changes or issues.

In block 2614, the processor may conduct periodic rescanning of the network to verify the accuracy of the network topology and status of devices and ECNs. For example, the processor may schedule automatic rescans at regular intervals to ensure that the network map and device inventory remain current. In some embodiments, the processor may adjust the frequency of the periodic rescanning based on the network size, complexity, and/or observed rate of changes in the network.

In block 2616, the processor may integrate the findings of the network discovery module with other network management functions. For example, the processor may correlate the discovery data with security logs to identify potential security threats or with performance data to optimize network configurations.

In block 2618, the processor may synchronize the collected data with a central database or cloud system and generate reports for network administrators. For example, the processor may package the discovery and monitoring data into comprehensive reports and upload them to a cloud-based service for easy access and analysis by network administrators and/or network admin software.

FIG. 27 is a process flow diagram illustrating a method 2700 for managing applications in an edge computing environment using an Edge Application Manager (EAM) in accordance with some embodiments. Method 2700 may be performed by a processor or processing system in computing system.

In block 2702, the processor may initialize the Edge Application Manager (EAM) within a network management ecosystem. For example, the processor may load the EAM component, configure it with the necessary parameters for the specific network environment, and initiate its integration with existing network infrastructure and edge applications.

In block 2704, the processor may manage edge applications in accordance with respective service management agreements. For example, the processor may regularly check each application against its specified service agreement to ensure compliance with defined performance, resource utilization, and availability benchmarks. In some embodiments, managing edge applications may include adhering to performance benchmarks, resource utilization limits, and availability requirements as specified in service management agreements.

In block 2706, the processor may continuously collect network performance and application health data. For example, the processor may use monitoring tools to gather real-time metrics on network traffic, application response times, resource usage, and any errors or exceptions occurring within the edge applications.

In block 2708, the processor may conduct in-depth analyses of the collected data to diagnose infrastructural and application-centric issues. For example, the processor may use data analytics tools to identify unusual patterns or anomalies that could indicate underlying problems. In some embodiments, conducting in-depth analyses may include identifying patterns, anomalies, or potential issues in network performance and application behavior. Diagnosing infrastructural and application-centric issues may include using diagnostic tools to pinpoint root causes of detected problems.

In block 2710, the processor may integrate with a broader network management system for cohesive monitoring and intervention. For example, the processor may establish communication protocols to share data and insights with other network management systems.

In block 2712, the processor may implement automated measures to rectify identified issues. For example, the processor may automatically trigger resource reallocation, application restarts, or updates, and adjust network configurations to resolve detected issues. In some embodiments, implementing automated measures may include performing these and other proactive interventions to maintain service levels and application performance.

In block 2714, the processor may establish ongoing monitoring protocols post-issue rectification to ensure optimal operation. For example, the processor may continue to closely monitor the affected applications and network segments to confirm that the implemented fixes are effective.

In block 2716, the processor may update and/or enhance the EAM's diagnostic and management algorithms based on continuous feedback. For example, the processor may refine the EAM's algorithms by incorporating lessons learned from past issues, feedback from network administrators, and evolving network requirements.

In block 2718, the processor may generate detailed reports on application performance and management interventions. For example, the processor may compile data into comprehensive reports that detail the health, performance, and any actions taken regarding edge applications. In some embodiments, generating detailed reports may include creating information structures that aid in understanding, maintaining, and improving the health and management of edge applications.

Some embodiments may include methods for managing network operations in a vEEC system, which may include locating a vEEC server within a network (the server is positioned in at least one of a cloud environment, on-premise, or outside of the cloud), designating the vEEC server as a master server based on a service policy, associating several vEEC agents with Edge Computing Nodes (ECNs) and Edge devices within the network, integrating the vEEC server and agents into a Multi-Site Cluster (MSC), and adding the vEEC server or agent to multiple Site Clusters (SCs) and MSCs. In some embodiments the method may further include assigning a group within the network to a predefined slice of network resources, segmenting the network based on the assigned group (the segmentation applies to either the entire network or a subsection thereof), simplifying group management within the segmented network, and accommodating micro-segmentation within the network (the micro-segmentation is independent of bearer traffic for each application run). In some embodiments, the group may include at least one of a User Cluster (UC), Single ECN (SE), SC, or MSC.

Some embodiments may include methods for adaptive network resource management in a vEEC system, which may include implementing a distributed control plane architecture within the vEEC system, operating a controller instance on every edge data center within the system (thereby rendering each edge data center autonomous), and running control functions and compute functions on edge servers within the edge data centers. In some embodiments, the methods may include synchronizing multiple databases across multiple platforms within the vEEC system, creating a federation of vEEC edge data centers, and connecting databases of the edge data centers to operate infrastructure end-to-end as a whole or synchronizing databases across sites for consistent configuration. In some embodiments, a loss of communication between a central data center and an edge data center may result in minimal impact on network performance due to the autonomous operation of the edge data centers.

Some embodiments (e.g., embodiments illustrated and described with reference to FIGS. 11A and 11B, etc.) may include methods of managing application offloading in a versatile elastic edge compute (vEEC) system, which may include monitoring the performance of a plurality of edge computing nodes (ECNs) against predefined key performance indicator (KPI) targets, receiving a notification from a vEEC agent indicating a service issue in an ECN in the plurality of ECNs failing to meet said KPI targets, determining whether an alternative ECN within a local group of ECNs may effectively run an application or function originally assigned to the ECN experiencing the service issue or failing to meet the KPI targets, extending the search to ECNs in external groups in response to determining that there are no suitable alternative ECN within the local group, receiving confirmation of the availability and suitability of an ECN in an external group to run the application or function, coordinating the offloading of the application or function from the original ECN to the identified alternative ECN in the external group, and reassigning the application or function to the identified alternative ECN.

Some embodiments may further include determining routing paths for data packets to and from the new ECN that maintain the continuity of the application or function. In some embodiments, monitoring the performance of the plurality of ECNs against predefined KPI targets may include collecting and analyzing data related to network traffic, resource utilization, latency, throughput, and error rates from each ECN to generate metrics, and comparing the generated metrics against thresholds for data transfer speeds, maximum allowable downtime, and specific resource usage limits to identify deviations from KPI benchmarks.

In some embodiments, determining whether the alternative ECN within the local group of ECNs may effectively run the application or function originally assigned to the ECN experiencing the service issue or failing to meet the KPI targets may include analyzing the capabilities and current load of other ECNs within the local group. In some embodiments, analyzing the capabilities and current load of other ECNs within the local group may include comparing the resource requirements of the application or function with available resources, processing power, and network capacity of each of the other ECNs within the local group. In some embodiments, extending the search to ECNs in external groups in response to determining that there are no suitable alternative ECN within the local group may include sending requests for information regarding the performance, resource availability, and current load of ECNs in the external groups. In some embodiments, extending the search to ECNs in external groups in response to determining that there are no suitable alternative ECN within the local group may include communicating with a centralized network management system or with one or more vEEC masters in other groups to inquire about the availability and capabilities of their respective ECNs.

Some embodiments (e.g., embodiments illustrated and described with reference to FIG. 19, etc.) may include methods of orchestrating network operations in a virtual Edge Enhanced Computing (vEEC) system, which may include initializing the vEEC system by loading network configuration and identifying edge computing nodes (ECNs) and their capabilities, monitoring network resources that include computing, cloud services, storage, networking, and security resources, determine resource requirements for one or more software applications or tasks within the vEEC system, dynamically scaling network resources based on the determined requirements, resolving network congestion by redistributing tasks among ECNs based on network traffic analysis, implementing failover to cloud resources for ECNs that face resource limitations, offloading computational tasks from edge devices with limited resources to more powerful servers or ECNs, monitoring network performance and resource utilization for adjustments, and refining resource allocation models and system configuration based on feedback and performance metrics.

In some embodiments, initializing the vEEC system further may include establishing communication links with cloud resources. In some embodiments, dynamically scaling network resources may include updating the resource allocations in real-time. In some embodiments, dynamically scaling network resources may include modifying specific parameters for capacity, bandwidth, and latency. In some embodiments, resolving network congestion by redistributing tasks among the ECNs based on the network traffic analysis further may include adjusting routing paths to alleviate traffic load. In some embodiments, implementing failover to cloud resources for ECNs that face resource limitations may include implementing failover protocols and reducing service disruptions by redirecting tasks.

In some embodiments, offloading computational tasks from edge devices with limited resources to more powerful servers or ECNs may further include balancing computational workloads across the network to enhance application capabilities. In some embodiments, offloading computational tasks from edge devices with limited resources to more powerful servers or ECNs may include migrating the computational tasks based on latency and performance characteristics. Some embodiments may further include implementing artificial intelligence or machine learning algorithms for predictive analysis and proactive system adjustments.

Some embodiments (e.g., embodiments illustrated and described with reference to FIG. 20, etc.) may include methods of orchestrating network operations in a virtual Edge Enhanced Computing (vEEC) system, which may include determining, by a processor in an edge computing node (ECN), an operational environment of a vEEC server within a network, configuring the vEEC server based on its operational environment, determining the role of the vEEC server as a master server or a subordinate agent based on service policies, associating vEEC agents with edge computing nodes (ECNs) and edge devices within the network, establishing communication protocols between the vEEC server and the vEEC agents, monitoring network performance and resource utilization across the associated ECNs, dynamically reassigning the vEEC master role to another ECN based on a result of monitoring the connectivity and resources of associated ECNs, and maintaining the current master server role until stability may be demonstrated for a predetermined period.

In some embodiments, determining the operational environment of the vEEC server may include determining whether the vEEC server may be an on-premise vEEC server, an off-premise cloud-based vEEC server, or off-premise vEEC server that may be outside the cloud. In some embodiments, determining the operational environment of the vEEC server may include evaluating network connectivity, resource availability, and geographical location.

In some embodiments, determining the role of the vEEC server as the master server or the subordinate agent based on the service policies may include determining whether the vEEC server may be a vEEC master or a vEEC agent. In some embodiments, dynamically reassigning the vEEC master role to another ECN based on the result of monitoring the connectivity and resources of associated ECNs may include reassigning the vEEC master role to one of vEEC devices in response to detecting a connectivity loss. In some embodiments, establishing the communication protocols between the vEEC server and the vEEC agents may include configuring network routes, encryption standards, and authentication mechanisms.

In some embodiments, dynamically reassigning the vEEC master role to another ECN based on a result of monitoring the connectivity and resources of associated ECNs may include evaluating the resource availability, network connectivity, and operational stability of each ECN. In some embodiments, dynamically reassigning the vEEC master role to another ECN based on a result of monitoring the connectivity and resources of associated ECNs may include reassigning the vEEC master role to another ECN in response to detecting a connectivity loss.

Some embodiments may further include dynamically scaling network resources based on current demands and performance metrics, redistributing tasks among ECNs to address network congestion and prioritize operations, and implementing failover to transfer tasks to cloud resources in case of resource limitations at the ECN level. Some embodiments may further include implementing a compute distribution scheme that enhances software application capabilities on edge devices with limited resources by identifying tasks that may be more efficiently processed by external servers and offloading the identified tasks from edge devices to more external servers.

Some embodiments may further include standardizing configurations within clusters, groups, or points of distribution (PODs), creating a cohesive environment for workloads and resources to facilitate resource movement, integrating infrastructure components across various locations and platforms, implementing a hybrid orchestration scheme for network management, ensures consistent security across diverse network systems, configuring a vEEC orchestrator for compatibility with various networks and devices to avoid vendor lock-in, using network-as-a-service (NaaS) technologies for deploying and configuring applications across geographically distributed vEEC devices, applying intent-based and predictive orchestration schemes, implementing artificial intelligence-based orchestration, life cycle management, QoS, policy enforcement, and network slicing, managing failover and recovery processes, or supporting adaptive monitoring, optimize traffic delivery, and accommodate bring your own (BYO) certified applications and hardware.

Some embodiments (e.g., embodiments illustrated and described with reference to FIG. 21, etc.) include methods of managing services and applications in a virtual Edge Enhanced Computing (vEEC) system, which may include implementing and enforcing, by a processor in an edge computing node (ECN) in the vEEC system, Quality of Service (QOS) parameters in accordance with service policies, monitoring and evaluating utilization of network resources, dynamically scaling network resource allocations based on a result of the monitoring and evaluation of the utilization of network resources, transferring tasks from ECNs in the vEEC system to cloud resources in response to detecting resource limitations at the ECN level, redistributing tasks and network loads among the ECNs in the vEEC system in response to detecting network congestion, orchestrating the distribution of network resources across different ECNs and edge devices, managing failover and recovery processes for ECNs, monitoring network performance, and adjusting QoS, resource allocations, and task distributions based on real-time data collected from monitoring the network performance.

In some embodiments, dynamically scaling the network resource allocations based on the result of the monitoring and evaluation of the utilization of the network resources may include dynamically increasing or decreasing the network resources in real-time based on current network demands, in which the network resources include computing power, storage, and bandwidth.

In some embodiments, transferring tasks from ECNs in the vEEC system to cloud resources in response to detecting resource limitations at the ECN level may include transferring tasks from ECNs in the vEEC system to cloud resources in response to determining that local resources in the ECNs have reach their limits or are insufficient to handle the current load. In some embodiments, redistributing the tasks and network loads among the ECNs in the vEEC system in response to detecting network congestion may include redistributing the tasks so as to balance the load across the network and prevent any single ECN in the vEEC system from becoming a bottleneck.

In some embodiments, orchestrating the distribution of network resources across different ECNs and edge devices may include managing the distribution and reallocation of resources which may include bandwidth and storage among various network components in the vEEC system. In some embodiments, orchestrating the distribution of network resources across different ECNs and edge devices may include allocating network resources in a manner that increases overall network performance, reduces latency, and supports the continuity and reliability of services delivered by the vEEC system. In some embodiments, orchestrating the distribution of network resources across different ECNs and edge devices may include implementing a resource management protocol, identifying and assessing the resource capacities and demands of each ECN and edge device within the vEEC system, determining a preferred allocation of network resources based on current and predicted usage patterns, making real-time adjustments to resource distribution in response to changing network conditions, and maintaining compliance with predefined service level agreements (SLAs) and regulatory requirements.

In some embodiments, adjusting the QoS, the resource allocations, and the task distributions based on the real-time data collected from monitoring the network performance may include modifying the QoS settings to prioritize critical services, reallocating resources to high-demand ECNs, and redistributing tasks among the ECNs and cloud resources to improve network efficiency. In some embodiments, adjusting the QoS, the resource allocations, and the task distributions based on the real-time data collected from monitoring the network performance may include implementing and using a feedback mechanism and/or predictive analytics to foresee potential network issues and preemptively adjust network configurations.

Some embodiments (e.g., embodiments illustrated and described with reference to FIG. 22, etc.) may include methods of managing an edge computing system, which may include configuring network parameters for the edge computing system, the configuring which may include setting up trusted domains and security protocols, offloading all or portions of a software application from a user computing device to one or more edge compute nodes (ECNs) or cloud servers based on resource availability, network latency, and application requirements, establishing a computing mesh for sharing hardware and software resources among multiple ECNs in the network, monitoring workloads, computation capacities, and performance requirements of each ECN in the computing mesh, dynamically allocating resources of the ECNs in the computing mesh based on a result of the monitoring, managing the trusted domains or groupings within the network to facilitate secure and efficient data sharing among ECNs across different groups or geographical locations, and adjusting network configurations, resource allocations, and/or offloading strategies based on real-time performance data and changing requirements.

Some embodiments may further include implementing network segmentation for the entire network or specific subsections of the network. In some embodiments, assigning specific network resource slices to different network segments may include assigning a network resource slice to a UC that may include multiple edge or user devices associated with a single user. In some embodiments, assigning specific network resource slices to different network segments may include assigning a network resource slice to an SC that may include a plurality of interconnected ECNs located within the same geographic area. In some embodiments, assigning specific network resource slices to different network segments may include assigning a network resource slice to an MSC that may include several SCs managed by a single organization. In some embodiments, establishing a computing mesh for sharing hardware and software resources among multiple ECNs in the network may include implementing a virtualized network overlay that interconnects different ECNs so that they share computational and storage resources.

As discussed throughout this application, the various embodiments overcome a variety of technical challenges to improve the performance and functioning of the computing devices, network components, ECNs, edge computing system, vEEC system, etc. For example, by enabling real-time monitoring and dynamic reassignment of applications across a network of ECNs, an edge computing device within the network may significantly enhance the resilience and adaptability of critical applications. For example, in agricultural applications the embodiments may promptly reroute essential functions such as weather prediction to alternative ECNs to ensure continuity of service. This may be particularly important in areas in which reliable data may mean the difference between a successful harvest and crop failure. Similarly, in urban traffic management, the device's capability to swiftly identify and resolve performance issues in ECNs may reduce network congestion and overcome infrastructure limitations. These and other operations for making real-time adjustments and maintaining service continuity, despite infrastructural and connectivity constraints, exemplifies a significant technical advancement.

Figure 28:
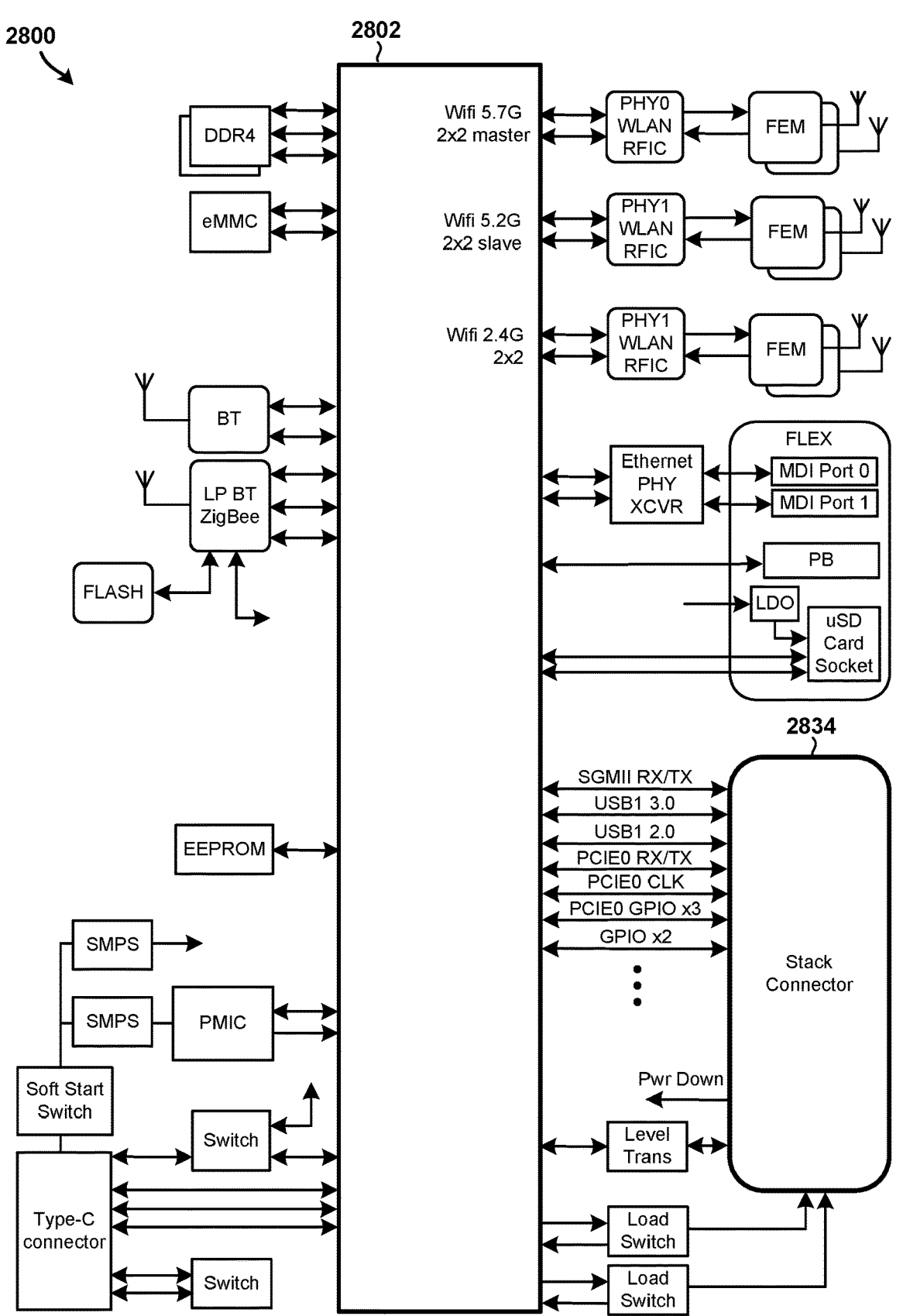
FIG. 28 is a component block diagram illustrating an example computing system that may be used to implement some embodiments.

FIG. 28 illustrates an example computing system 2800 that may be used to implement some embodiments. The computing system 2800 may include a SOC 2802 and a stack connector 2834. The stack connector 2834 may include an interconnection/bus module with various data and control lines for communicating with the SOC 2802. The stack connector 2834 may also expose systems buses and resources of a SOC 2802 or computing device 2800 in a manner that allows the chip or computing system to attach to an additional unit to include additional features, functions or capabilities, but which preserves the performance and integrity of the original SOC 2802 or computing device 2800.

The edge computing system may be made up of multiple edge computing systems all connected in a mesh environment. The edge computing devices may be a heterogeneous hardware environment where different edge computing devices have different capabilities depending on their internal architectures which includes CPU type, RAM, storage capabilities, wireless and wired capabilities as well as kernel capabilities and version. The heterogeneous environment can also include edge devices that have the same identical platforms but operating with different software versions.

The processors or processing units discussed in this application may be any programmable microprocessor, microcomputer, or multiple processor chip or chips that may be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the paragraphs above and below in terms of example methods. Further example implementations may include: the example methods discussed in the above and below paragraphs implemented by a computing device including a processor configured (e.g., with processor-executable instructions) to perform operations of the methods of the above and below implementation examples; the example methods discussed in the above and below paragraphs implemented by a computing device including means for performing functions of the methods of the above and below implementation examples; and the example methods discussed in the above and below paragraphs may be implemented as a non-transitory processor-readable storage medium having stored thereon processor-executable instructions configured to cause a processor of a computing device to perform the operations of the methods of the following implementation examples.

Example 1: A method for orchestrating network operations in a virtual Edge Enhanced Computing (vEEC) system, including initializing the vEEC system by loading network configuration and identifying edge computing nodes (ECNs) and their capabilities, monitoring network resources that include computing, cloud services, storage, networking, and security resources, determine resource requirements for one or more software applications or tasks within the vEEC system, dynamically scaling network resources based on the determined requirements, resolving network congestion by redistributing tasks among ECNs based on network traffic analysis, implementing failover to cloud resources for ECNs that face resource limitations, offloading computational tasks from edge devices with limited resources to more powerful servers or ECNs, monitoring network performance and resource utilization for adjustments, and refining resource allocation models and system configuration based on feedback and performance metrics.

Example 2: The method of example 1, in which initializing the vEEC system further includes establishing communication links with cloud resources.

Example 3: The method of any of the examples 1 and 2, in which dynamically scaling network resources includes updating the resource allocations in real-time.

Example 4: The method of any of the examples 1-3, in which dynamically scaling network resources includes modifying specific parameters for capacity, bandwidth, and latency.

Example 5: The method of any of the examples 1-4, in which resolving network congestion by redistributing tasks among the ECNs based on the network traffic analysis further includes adjusting routing paths to alleviate traffic load.

Example 6: The method of any of the examples 1-5, in which implementing failover to cloud resources for ECNs that face resource limitations includes implementing failover protocols and reducing service disruptions by redirecting tasks.

Example 7: The method of any of the examples 1-6, in which offloading computational tasks from edge devices with limited resources to more powerful servers or ECNs further includes balancing computational workloads across the network to enhance application capabilities.

Example 8: The method of any of the examples 1-7, in which offloading computational tasks from edge devices with limited resources to more powerful servers or ECNs further includes migrating the computational tasks based on latency and performance characteristics.

Example 9: The method of any of the examples 1-8, further including implementing artificial intelligence or machine learning algorithms for predictive analysis and proactive system adjustments.

As used in this application, terminology such as "component," "module," "system," etc., is intended to encompass a computer-related entity. These entities may involve, among other possibilities, hardware, firmware, a blend of hardware and software, software alone, or software in an operational state. As examples, a component may encompass a running process on a processor, the processor itself, an object, an executable file, a thread of execution, a program, or a computing device. To illustrate further, both an application operating on a computing device and the computing device itself may be designated as a component. A component might be situated within a single process or thread of execution or could be distributed across multiple processors or cores. In addition, these components may operate based on various non-volatile computer-readable media that store diverse instructions and/or data structures. Communication between components may take place through local or remote processes, function or procedure calls, electronic signaling, data packet exchanges, memory interactions, among other known methods of network, computer, processor, or process-related communications.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/ types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in a computing device, system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for orchestrating network operations in a virtual Edge Enhanced Computing (vEEC) system, comprising:

initializing the vEEC system by loading network configuration and identifying edge computing nodes (ECNs) and their capabilities;

monitoring network resources that include computing, cloud services, storage, networking, and security resources;

determine resource requirements for one or more software applications or tasks within the vEEC system;

dynamically scaling the monitored network resources based on a result of the monitoring and the determined resource requirements;

resolving network congestion by redistributing tasks among ECNs based on network traffic analysis of the dynamically scaled monitored network resources;

implementing failover to cloud resources for ECNs identified in the result monitoring as facing resource limitations;

offloading computational tasks, based on the monitoring and the determined resource requirements, from edge devices with limited resources to more powerful servers or ECNs;

monitoring network performance and resource utilization for adjustments; and refining resource allocation models and system configuration based on feedback and performance metrics.

2. The method of claim 1, wherein initializing the vEEC system further comprises establishing communication links with cloud resources.

3. The method of claim 1, wherein dynamically scaling network resources comprises updating the resource allocations in real-time.

4. The method of claim 1, wherein dynamically scaling network resources comprises modifying specific parameters for capacity, bandwidth, and latency network resources based on the determined resource requirements.

5. The method of claim 1, wherein resolving network congestion by redistributing tasks among the ECNs based on the network traffic analysis further comprises adjusting routing paths to alleviate traffic load.

6. The method of claim 1, wherein implementing failover to cloud resources for ECNs that face resource limitations comprises implementing failover protocols and reducing service disruptions by redirecting tasks.

7. The method of claim 1, wherein offloading computational tasks from edge devices with limited resources to more powerful servers or ECNs further comprises balancing computational workloads across the network to enhance application capabilities.

8. The method of claim 1, wherein offloading computational tasks from edge devices with limited resources to more powerful servers or ECNs further comprises migrating the computational tasks based on latency and performance characteristics.

9. The method of claim 1, further comprising implementing artificial intelligence or machine learning algorithms for predictive analysis and proactive system adjustments.

10. An edge computing device, comprising:

a processor configured to:

initialize a virtual Edge Enhanced Computing (vEEC) system by loading network configuration and identifying edge computing nodes (ECNs) and their capabilities;

monitor network resources that include computing, cloud services, storage, networking, and security resources;

determine resource requirements for one or more software applications or tasks within the vEEC system;

dynamically scale the monitored network resources based on a result of the monitoring and the determined resource requirements;

resolve network congestion by redistributing tasks among ECNs based on network traffic analysis of the dynamically scaled monitored network resources;

implement failover to cloud resources for ECNs identified in the result monitoring as facing resource limitations;

offload computational tasks, based on the monitoring and the determined resource requirements, from edge devices with limited resources to more powerful servers or ECNs;

monitor network performance and resource utilization for adjustments; and refine resource allocation models and system configuration based on feedback and performance metrics.

11. The edge computing device of claim 10, wherein the processor is configured to initialize the vEEC system by establishing communication links with cloud resources.

12. The edge computing device of claim 10, wherein the processor is configured to dynamically scale network resources by updating the resource allocations in real-time.

13. The edge computing device of claim 10, wherein the processor is configured to dynamically scale network resources by modifying specific parameters for capacity, bandwidth, and latency of the network resources based on the determined resource requirements.

14. The edge computing device of claim 10, wherein the processor is configured to resolve network congestion by redistributing tasks among the ECNs based on the network traffic analysis by adjusting routing paths to alleviate traffic load.

15. The edge computing device of claim 10, wherein the processor is configured to implement failover to cloud resources for ECNs that face resource limitations by implementing failover protocols and reducing service disruptions by redirecting tasks.

16. The edge computing device of claim 10, wherein the processor is configured to offload computational tasks from edge devices with limited resources to more powerful servers or ECNs by balancing computational workloads across the network to enhance application capabilities.

17. The edge computing device of claim 10, wherein the processor is configured to offload computational tasks from edge devices with limited resources to more powerful servers or ECNs by migrating the computational tasks based on latency and performance characteristics.

18. The edge computing device of claim 10, wherein the processor is further configured to implement artificial intelligence or machine learning algorithms for predictive analysis and proactive system adjustments.

19. A non-transitory processor readable media having stored thereon processor-executable instructions configured to cause a processor in an edge computing device perform operations for orchestrating network operations in a virtual Edge Enhanced Computing (vEEC) system, the operations comprising:

initializing the vEEC system by loading network configuration and identifying edge computing nodes (ECNs) and their capabilities;

monitoring network resources that include computing, cloud services, storage, networking, and security resources;

determine resource requirements for one or more software applications or tasks within the vEEC system;

dynamically scaling the monitored network resources based on a result of the monitoring and the determined resource requirements;

resolving network congestion by redistributing tasks among ECNs based on network traffic analysis of the dynamically scaled monitored network resources;

implementing failover to cloud resources for ECNs identified in the result monitoring as facing resource limitations;

offloading computational tasks, based on the monitoring and the determined resource requirements, from edge devices with limited resources to more powerful servers or ECNs;

monitoring network performance and resource utilization for adjustments; and refining resource allocation models and system configuration based on feedback and performance metrics.

20. The non-transitory processor readable media of claim 19, wherein the stored processor-executable instructions are configured to cause the processor to perform operations further comprising:

initializing the vEEC system further comprises establishing communication links with cloud resources;

dynamically scaling network resources comprises modifying specific parameters for capacity, bandwidth, and latency network resources based on the determined resource requirements and updating the resource allocations in real-time;

resolving network congestion by redistributing tasks among the ECNs based on the network traffic analysis further comprises adjusting routing paths to alleviate traffic load;

implementing failover to cloud resources for ECNs that face resource limitations comprises implementing failover protocols and reducing service disruptions by redirecting tasks; and offloading computational tasks from edge devices with limited resources to more powerful servers or ECNs further comprises migrating the computational tasks based on latency and performance characteristics and balancing computational workloads across the network to enhance application capabilities.

* * * * *